(12) United States Patent
Yamamoto et al.

(10) Patent No.: US 7,959,725 B2
(45) Date of Patent: *Jun. 14, 2011

(54) INK SET, RECORDING METHOD, RECORDING DEVICE, RECORDING SYSTEM, AND RECORDED OBJECT

(75) Inventors: Yuko Yamamoto, Nagano-ken (JP);
Shuichi Kataoka, Nagano-ken (JP);
Takeshi Tanoue, Nagano-ken (JP);
Shinichi Kato, Nagano-ken (JP);
Tsuyoshi Sano, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 382 days.

This patent is subject to a terminal disclaimer.

(21) Appl. No.: 10/494,681

(22) PCT Filed: Nov. 4, 2003

(86) PCT No.: PCT/JP03/14068
§ 371 (c)(1),
(2), (4) Date: Oct. 12, 2004

(87) PCT Pub. No.: WO2004/039899
PCT Pub. Date: May 13, 2004

(65) Prior Publication Data
US 2005/0039632 A1  Feb. 24, 2005

(51) Int. Cl.
*C09D 11/02* (2006.01)
(52) U.S. Cl. .................. 106/31.6; 106/31.86; 106/31.75
(58) Field of Classification Search ............... 106/31.27, 106/31.6, 31.58, 31.86, 31.43, 31.75
See application file for complete search history.

(56) References Cited

U.S. PATENT DOCUMENTS

| 5,493,321 A | 2/1996 | Zwadlo |
| 5,597,856 A | 1/1997 | Yu et al. |

(Continued)

FOREIGN PATENT DOCUMENTS

EP  0933406 A1  8/1999

(Continued)

OTHER PUBLICATIONS

English language abstract of JP 2002-220557, dated Aug. 9, 2002.

(Continued)

*Primary Examiner* — Jerry Lorengo
*Assistant Examiner* — Veronica Faison Gee
(74) *Attorney, Agent, or Firm* — Ladas & Parry LLP

(57) ABSTRACT

It is an object of the present invention to provide an ink set which makes it possible to obtain recorded images that have a broad color reproduction range and a high saturation, as well as glossiness without conspicuous graininess caused by dot expression, and which in particular makes it possible to achieve an extreme suppression of graininess caused by dot expression in cases where the ink set is used on media that have a coating layer, and to obtain recorded images with extremely superior coloring characteristics in cases where the ink set is used on ordinary paper. The present invention provides an ink set comprising at least a yellow ink (Y), magenta ink (M), cyan ink (C) and red ink (R), wherein the L* values in the CIE-stipulated Lab display system of aqueous solutions of the respective inks diluted 1000 times by weight are in the following ranges: (Y): at least 89 but no more than 94, (M): at least 76 but no more than 93, (C): at least 74 and no more than 87, (R): at least 55 and no more than 74.

33 Claims, 14 Drawing Sheets

(1) DOTTED LINE: INK SET OF CONVENTIONAL CMY INKS
(2) ONE-DOT CHAIN LINE: INK SET OF CMY INKS USING Y INK WITH EFFECT IN REDUCING METAMERISM
(3) SOLID LINE: INK SET OF CMY INKS OF THE PRESENT INVENTION

L* = COLOR REPRODUCTION REGION IN THE VICINITY OF 70

U.S. PATENT DOCUMENTS

| | | | |
|---|---|---|---|
| 6,152,999 | A | 11/2000 | Erdtmann et al. |
| 6,221,150 | B1 | 4/2001 | Weber et al. |
| 6,290,762 | B1 | 9/2001 | Elwaril |
| 6,399,674 | B1 | 6/2002 | Kashiwazaki et al. |
| 6,419,733 | B1 | 7/2002 | Sano et al. |
| 6,517,630 | B1 | 2/2003 | Grandidier et al. |
| 6,648,954 | B2 | 11/2003 | Uemura et al. |
| 6,670,409 | B2 | 12/2003 | Yatake |
| 6,723,784 | B2 | 4/2004 | Ito et al. |
| 6,767,090 | B2 | 7/2004 | Yatake et al. |
| 6,843,840 | B2 * | 1/2005 | Kataoka et al. ............... 106/31.6 |
| 6,924,327 | B2 * | 8/2005 | Sano et al. ..................... 523/160 |
| 2002/0077384 | A1 | 6/2002 | Sano et al. |
| 2002/0143079 | A1 | 10/2002 | Yamanouchi et al. |
| 2002/0196303 | A1 | 12/2002 | Koitabashi et al. |
| 2003/0008938 | A1 * | 1/2003 | Sano et al. ..................... 523/160 |
| 2003/0035034 | A1 | 2/2003 | Fukumoto et al. |
| 2003/0097961 | A1 | 5/2003 | Yatake et al. |
| 2003/0116055 | A1 | 6/2003 | Kubota et al. |
| 2003/0226473 | A1 * | 12/2003 | Ishimoto ...................... 106/31.6 |
| 2003/0236321 | A1 | 12/2003 | Sano et al. |
| 2004/0024086 | A1 | 2/2004 | Segawa et al. |
| 2004/0237838 | A1 * | 12/2004 | Yatake et al. .............. 106/31.78 |
| 2005/0041082 | A1 * | 2/2005 | Kataoka ......................... 347/100 |
| 2006/0075925 | A1 * | 4/2006 | Stoffel et al. .............. 106/31.27 |

FOREIGN PATENT DOCUMENTS

| | | |
|---|---|---|
| EP | 0953613 | 11/1999 |
| EP | 1041816 A1 * | 10/2000 |
| EP | 1048702 A1 | 11/2000 |
| EP | 1146090 | 10/2001 |
| EP | 1153991 A1 | 11/2001 |
| EP | 1176177 A2 | 1/2002 |
| EP | 1188806 | 3/2002 |
| JP | H08-143803 A | 6/1996 |
| JP | H08-143804 A | 6/1996 |
| JP | 10-120956 | 5/1998 |
| JP | 11-048502 | 2/1999 |
| JP | 11-228888 | 8/1999 |
| JP | 11-320924 | 11/1999 |
| JP | 2000-117960 | 4/2000 |
| JP | 2000-351928 A | 12/2000 |
| JP | 2001-002962 A | 1/2001 |
| JP | 2001-354886 | 12/2001 |
| JP | 2002-3768 | 1/2002 |
| JP | 2002-012810 A | 1/2002 |
| JP | 2002-030235 | 1/2002 |
| JP | 2002-30237 | 1/2002 |
| JP | 2002-091261 A | 1/2002 |
| JP | 2002-060664 A | 2/2002 |
| JP | 2002-105352 | 4/2002 |
| JP | 2002-138234 A | 5/2002 |
| JP | 2002-201401 A | 7/2002 |
| JP | 2002-201428 | 7/2002 |
| JP | 2002-220557 | 8/2002 |
| JP | 2002-225317 | 8/2002 |
| JP | 2002-241638 A | 8/2002 |
| JP | 2002-249683 A | 9/2002 |
| JP | 2002-309118 | 10/2002 |
| JP | 2002-332440 | 11/2002 |
| JP | 2003-342503 | 12/2003 |
| WO | 99/05230 | 2/1999 |
| WO | 01-94482 | 12/2001 |

OTHER PUBLICATIONS

English language abstract of JP 2002-030235; dated Jan. 31, 2002.
English language abstract of JP 2000-117960, dated. Apr. 25, 2000.
English language abstract of JP 2003-342503, dated Dec. 3, 2003.
English language abstract of JP 2002-225317, dated Aug. 14, 2002.
English language abstract of JP 11-228888, dated Aug. 24, 1999.
English language abstract of JP 2001-354886, dated Nov. 24, 1999.
English language abstract of JP 11-048502, dated Feb. 23, 1999.
English language abstract of JP 10-120956, dated May 12, 1998.
English language abstract of JP 2002-332440, dated Nov. 22, 2002.
English language abstract of JP 11-320924, dated Nov. 24, 1999.
Patent Abstracts of Japan and JPO computer English translation of JP 2002-105352 dated Apr. 10, 2002.
Patent Abstracts of Japan and JPO computer English translation of JP 2002-309118 dated Oct. 23, 2002.
Developmental Technique of Inkjet Media Printer; Technical Information Institute Co., Ltd. (2001) $2^{nd}$ Edition, pp. 13-21, With Concise English Translation.
Office Action Dated Sep. 1, 2010 for U.S. Appl. No. 12/551,579.
Office Action Dated Sep. 1, 2010 for U.S. Appl. No. 12/551,580.
English Patent Abstract of Japanese Publication No. 2002-060664 A Published.
English Patent Abstract of Japanese Publication No. H08-143804 A Published.
English Patent Abstract of Japanese Publication No. H08-143803 A Published.
English Patent Abstract of Japanese Publication No. 2002-249683 A Published.
English Patent Abstract of Japanese Publication No. 2002-201401 A Published.
English Patent Abstract of Japanese Publication No. 2002-091261 A Published.
English Patent Abstract of Japanese Publication No. 2002-241638 A Published.
English Patent Abstract of Japanese Publication No. 2002-012810 A Published.
English Patent Abstract of Japanese Publication No. 2002-138234 A Published.
English Patent Abstract of Japanese Publication No. 2001-002962 A Published.

* cited by examiner

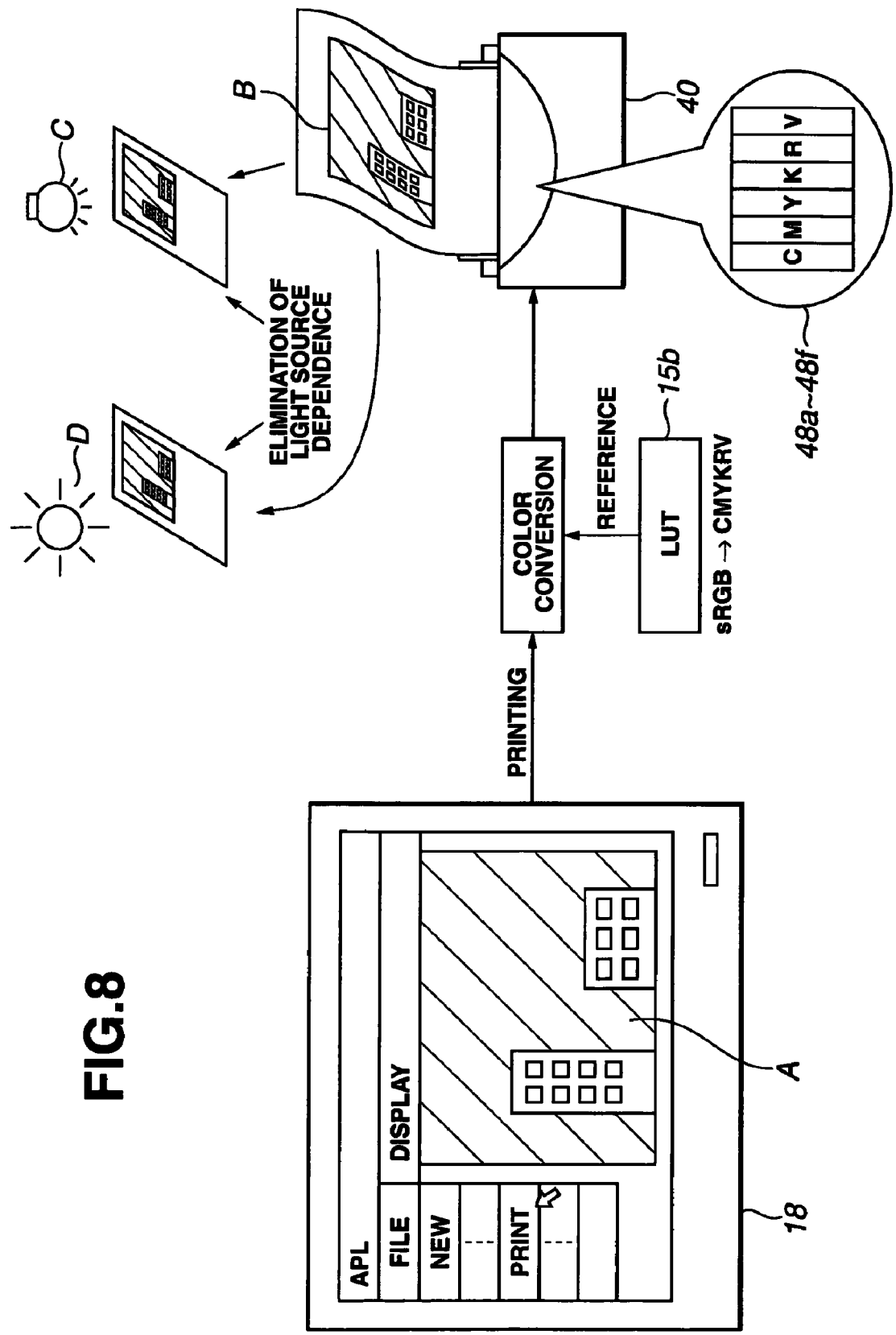

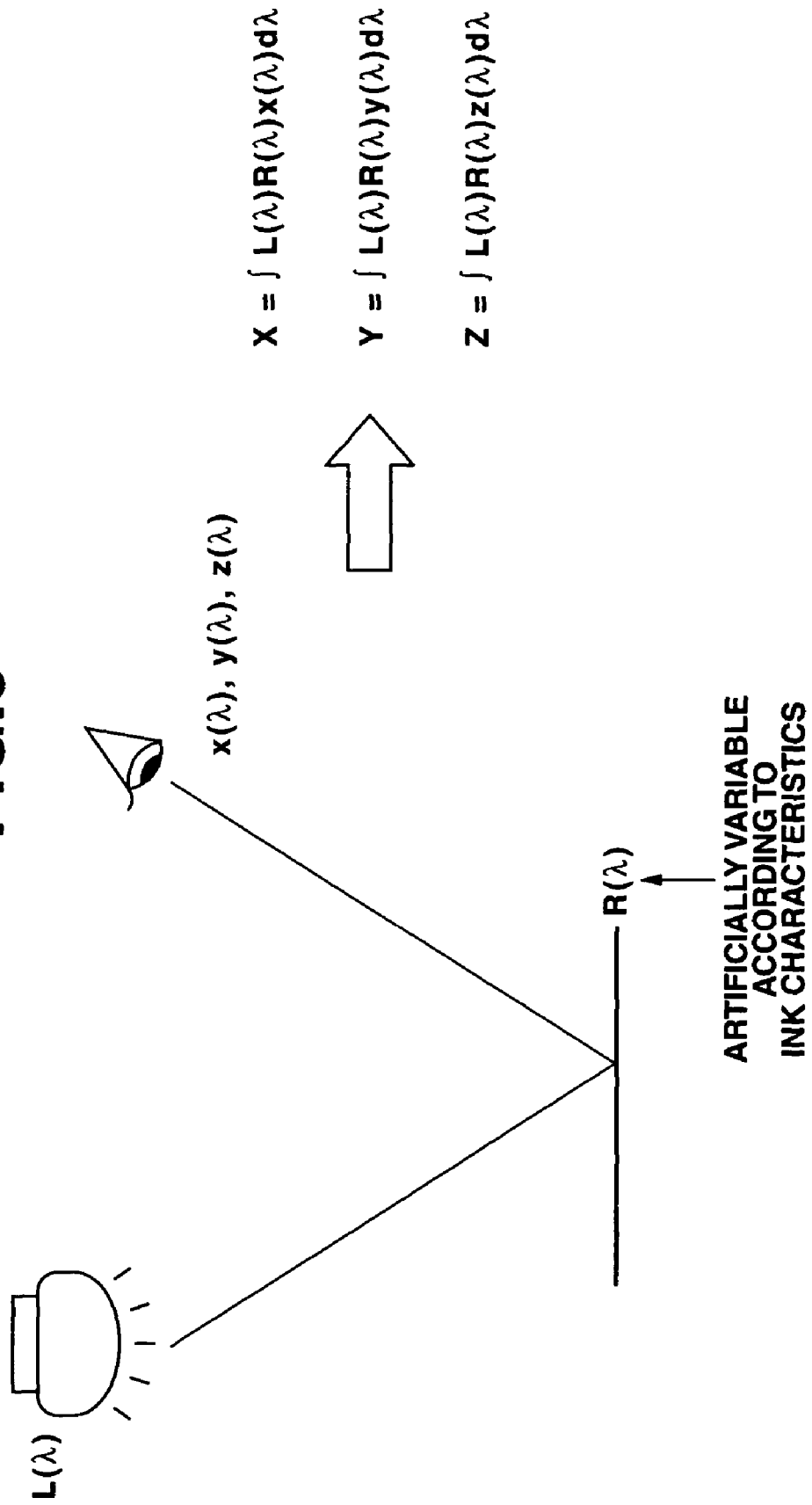

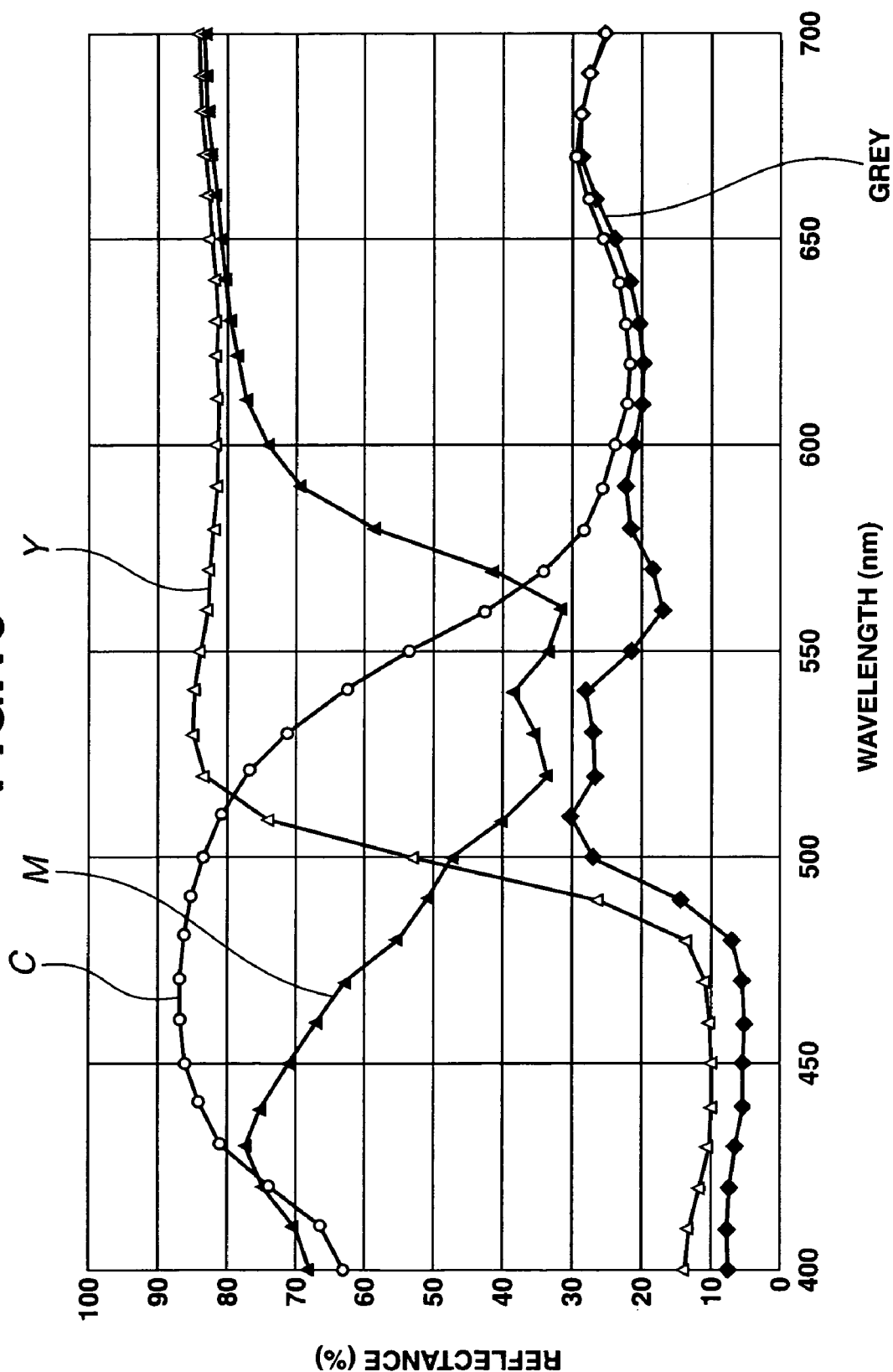

FIG.11

| | C | M (CONVENTIONAL) | Y | K | R | V | M (NEW) |
|---|---|---|---|---|---|---|---|
| COLORING MATERIAL | C.I. PIGMENT BLUE 15:3 | C.I. PIGMENT RED 202 | C.I. PIGMENT YELLOW 74 | C.I. PIGMENT BLACK 7 | C.I. PIGMENT RED 178 | C.I. PIGMENT VIOLET 23 | C.I. PIGMENT VIOLET 19 |
| AMOUNT OF COLORING MATERIAL | 1.5 | 1.5 | 3 | 1.5 | 2 | 2 | 2 |
| DISPERSING AGENT (STYRENE-ACRYLIC ACID COPOLYMER) | 0.5 | 0.5 | 1 | 1.5 | 0.7 | 0.7 | 0.7 |
| GLYCEROL | 15 | 15 | 15 | 15 | 15 | 15 | 15 |
| ETHYLENE GLYCOL | 5 | 5 | 5 | 5 | 5 | 5 | 5 |
| 2-PYRROLIDONE | 2 | 2 | 2 | 2 | 2 | 2 | 2 |
| 1,2-HEXANEDIOL | 5 | 5 | 5 | 5 | 5 | 5 | 5 |
| OLFIN E1010 | 0.5 | 0.5 | 0.5 | 0.5 | 0.5 | 0.5 | 0.5 |
| ION EXCHANGE WATER | BALANCE | BALANCE | BALANCE | BALANCE | BALANCE | BALANCE | BALANCE |
| TOTAL | 100 | 100 | 100 | 100 | 100 | 100 | 100 |

UNITS (WT%)

(1) DOTTED LINE: INK SET OF CONVENTIONAL CMY INKS (2) ONE-DOT CHAIN LINE: INK SET OF CMY INKS USING Y INK WITH EFFECT IN REDUCING METAMERISM (3) SOLID LINE: INK SET OF CMY INKS OF THE PRESENT INVENTION

L* = COLOR REPRODUCTION REGION IN THE VICINITY OF 70

(1) DOTTED LINE: INK SET OF CONVENTIONAL CMY INKS (2) ONE-DOT CHAIN LINE: INK SET OF CMY INKS USING Y INK WITH EFFECT IN REDUCING METAMERISM (3) SOLID LINE: INK SET OF CMY INKS OF THE PRESENT INVENTION

L* = COLOR REPRODUCTION REGION IN THE VICINITY OF 50

INK SET, RECORDING METHOD, RECORDING DEVICE, RECORDING SYSTEM, AND RECORDED OBJECT

CROSS-REFERENCES

The present invention relates to an ink set, recording method, recording apparatus, recording system and recorded matter which realize a superior color reproducibility and reduction in metamerism, and more particularly relates to an ink set which is superior in terms of the color reproducibility of recorded images, and which can reduce metamerism without any conspicuous graininess caused by dot expression, even if special inks other than yellow, magenta and cyan (YMC inks), such as red inks, violet inks or the like are not used, an ink set which is capable of high-quality output in both monochromatic and color images, which is superior in terms of the color reproducibility of recorded images, which can reduce metamerism without conspicuous graininess caused by dot expression, and which makes it possible to obtain a stable gray balance, and an ink set, recording method, recording apparatus, recording system and recorded matter which make it possible to alleviate metamerism by means of a simple construction without greatly reducing the region of color reproduction.

BACKGROUND

Ink jet recording methods are printing methods in which recording is performed by causing the jetting of small droplets of ink (ink composition), and causing these droplets to adhere to a recording medium such as paper or the like. Such methods are advantageous in that clear images with a high resolution can be printed at a high speed using a relatively simple apparatus. Ink sets used in such ink jet recording methods include ink sets comprising respective cyan (C), magenta (M) and yellow (Y) inks, ink sets in which a black (K) ink is added to these inks, and the like. For example, an ink set combining cyan, magenta and yellow inks which makes it possible to obtain good images, especially images with a good hue, in addition to possessing light resistance and water resistance, has been disclosed (Japanese Patent Application Laid-Open No. 10-120956).

In recent years, ink sets having light and dark inks which differ from each other in color density while being of the same color have been developed in order to realize both a broader range of color reproducibility and a suppression of conspicuous graininess when images are expressed by dots (a state in which the dots appear to be grainy when observed with the naked eye). For example, there are ink sets which have the four inks of C, M, Y and K as dark inks, and the four inks of light cyan (Lc), light magenta (Lm), light yellow (Ly) and light black (Lk) as light inks.

By performing recording while varying the amount of coloring material applied per unit area of the recording medium (i. e., varying the duty) using such an ink set comprising light and dark inks, it is possible to reduce the grainy sensation caused by the ink dots, and to obtain an output of color images with a high image quality comparable to that of silver salt photographs.

However, images in recorded matter formed using such conventional pigment ink sets suffer from the following problem: namely, a phenomenon in which the hue of the recorded images varies when the light source providing illumination varies, i. e., metamerism (light source dependence), occurs. For example, ink sets comprising a yellow ink containing C. I. pigment yellow 110, and ink sets for ink jet recording which provide clear, high-quality images and superior light resistance on special coated media, have been developed as techniques for reducing this metamerism. However, in cases where images are formed using such ink sets, the green color reproducibility is inadequate (Japanese Patent Application Laid-Open No. 2002-332440, Japanese Patent Application Laid-Open No. 11-228888).

Furthermore, ink sets comprising special color inks such as green inks, red inks, violet inks or the like besides yellow, magenta and cyan inks for the purpose of suppressing graininess caused by dot expression, improving the range of color reproducibility and reducing metamerism, have also been reported. For example, an ink set comprising a violet ink and red ink has been disclosed (Japanese Patent Application Laid-Open No. 2001-354886).

Such special color inks have a low lightness; however, in the case of a high resolution of 720×720 dpi or greater, since the radius of the dots applied to the media is small, graininess caused by dot expression is permissible even in cases where special color inks with a low lightness are deliberately printed in high lightness areas. However, at a low resolution such as 720×360 dpi, since the radius of the dots applied to the media is large, the graininess caused by dot expression becomes conspicuous in cases where special color inks with a low lightness are deliberately printed in high lightness areas, so that such printing cannot be allowed. Accordingly, it is difficult to achieve both a reduction in metamerism and a suppression of graininess in high lightness areas using ink sets comprising special color inks with a low lightness. In this case, it might be thought that both a reduction in metamerism and suppression of graininess in high lightness areas could be achieved by converting special color inks into high lightness inks; in such cases, however, the reproducibility of high-saturation low-lightness colors drops.

Furthermore, an increase in the image quality and stability of the gray balance are required in the printing of monochromatic images. A recording apparatus using two or three types of black inks with different pigment concentrations (Japanese Patent Application Laid-Open No. 11-48502), a recording apparatus which separately performs monochromatic output and color output with at least one type of color ink and concentration types greater than the number of colors (Japanese Patent Application Laid-Open No. 11-320924) and the like have also been proposed in order to increase the reproducibility of monochromatic images; however, these apparatuses cannot output both color images and monochromatic images in a favorable manner. Moreover, since ink jet printers use liquid inks, effects of changes in the external environment that cause the viscosity of the inks to vary may cause minute color variations. Accordingly, stability of the gray balance is required.

Conventionally, furthermore, ink sets of this type have included inks for alleviating metamerism that have colors equivalent to specified tertiary colors obtained by the mixing of the three types of primary color inks cyan, magenta and yellow (CMY), and that have a spectroscopic reflectance that is flatter than the spectroscopic reflectance of any specified tertiary color. Furthermore, at least one color in the color images is reproduced using a metamerism alleviating ink and at least one of the three types of primary color inks CMY; as a result, the colorless spectroscopic reflectance characteristics that are reproduced are made flatter than in the case of reproduction by the mixing of the three types of primary color inks CMY (for example, see Japanese Patent Application Laid-Open No. 2002-225317).

Since metamerism alleviating inks must be prepared in the conventional ink sets described above, the following problems are encountered: namely, the structure of the ink set is increased in size, and ink control also becomes more complicated. Furthermore, there is also a method in which metamerism is reduced by altering the Y ink in the combination of the CMY ink set; in this case, however, the following problem arises: namely, the color reproducibility in the green direction in high-lightness regions is greatly reduced.

Accordingly, it is an object of the present invention to provide an ink set which realizes superior color reproducibility and a reduction in metamerism.

Furthermore, it is another object of the present invention to provide an ink set, recording method and recording system that make it possible to obtain recorded images which are superior in terms of color reproducibility, and in which metamerism is reduced without any conspicuous graininess caused by dot expression, without using special color inks other than YMC inks, and in particular, an ink set which makes it possible to obtain recorded images that show no color variation caused by the application of pressure in addition to having the abovementioned superior performance values, and an ink set which is highly reliable as an ink set for use in ink jet recording, and further to provide recorded matter having superior recorded images that have good color reproducibility and reduced metamerism without conspicuous graininess caused by dot expression.

Furthermore, it is still another object of the present invention to provide an ink set and recording apparatus which can output both monochromatic and color images with a high quality, which make it possible to obtain recorded images that are superior in terms of color reproducibility and that have reduced metamerism without conspicuous graininess caused by dot expression, even without using special color inks other than YMC inks, and which make it possible to obtain a stable gray balance.

Furthermore, it is still another object of the present invention to provide an ink set, ink jet recording method and ink jet recording apparatus which make it possible to alleviate metamerism by means of a simple construction without any great reduction in the region of color reproduction.

SUMMARY

As a result of diligent research, the present inventor obtained the following first finding: namely, in an ink set comprising a yellow ink, magenta ink and cyan ink, even in cases where metamerism is reduced, the ink set becomes superior in terms of color reproducibility (i. e., the vector balance of the three colors becomes superior) as the yellow ink approaches the b* axis and as the magenta ink approaches the a* axis, as long as the hue angle of the cyan ink is in the vicinity of 225 degrees to 270 degrees.

Furthermore, when the present inventor conducted further research on the basis of this first finding, the inventor obtained the following second finding: namely, from the standpoint of reducing metamerism without causing a drop in color reproducibility, an ink set comprising YMC inks which uses a magenta ink having a specified color expression, more concretely a magenta ink in which the Z value in the XYZ display system stipulated by the CIE is small in cases where the Y value in the same system is 55 under specified conditions, makes it possible to achieve the abovementioned objects.

The present invention is based on the abovementioned second finding; this invention provides an ink set comprising a magenta ink (M) which is such that in a case where the Y value of this ink in the XYZ display system stipulated by the CIE is 55 (as calculated from the ultraviolet-visible transmission spectrum of a dilute aqueous solution of the ink with a coloring material concentration of 0.01 wt % or less), the Z value of this ink in the same system is 83 or less, and in which the L* value in the CIE-stipulated Lab display system of an aqueous solution of this ink diluted 1000 times by weight is 70 or less, a yellow ink (Y) in which the L* value in the CIE-stipulated Lab display system of an aqueous solution of this ink diluted 1000 times by weight is 95 or less, and a cyan ink (C) in which the L* value in the CIE-stipulated Lab display system of an aqueous solution of this ink diluted 1000 times by weight is 70 or less (below, this invention will be designated as the ink set of Embodiment A).

Since the ink set of the present invention comprises the abovementioned construction, this ink set makes it possible to obtain recorded images that are superior in terms of color reproducibility, and that have reduced metamerism without any conspicuous graininess caused by dot expression, even if no special color inks other than YMC inks are used.

Furthermore, the present invention provides a recording method for forming images using the abovementioned ink set. This recording method makes it possible to obtain recorded images that are superior in terms of color reproducibility, and that have reduced metamerism without any conspicuous graininess caused by dot expression, even if no special color inks other than YMC inks are used.

Furthermore, the present invention provides a recording system for forming images using the abovementioned ink set. This recording system makes it possible to obtain recorded images that are superior in terms of color reproducibility, and that have reduced metamerism without any conspicuous graininess caused by dot expression, even if no special color inks other than YMC inks are used.

Furthermore, the present invention provides recorded matter in which images are formed using the abovementioned ink set. This recorded matter has recorded images that have a high color reproducibility, and that have reduced metamerism without any conspicuous graininess caused by dot expression.

As a result of diligent research, the present inventor further discovered that the abovementioned problems can also be solved, and the abovementioned objects can also be achieved, by adopting the following constructions:

(1) An ink set comprising a plurality of inks containing pigments as coloring materials, wherein the plurality of inks comprise at least a yellow ink (Y), a magenta ink (M) and a cyan ink (C), the pigment in the yellow ink is C. I. pigment yellow 74, the pigment in the magenta ink is C. I. pigment violet 19, and the pigment in the cyan ink is C. I. pigment blue 15:3 (below, this invention will be designated as the ink set of Embodiment B).

(2) The ink set according to the abovementioned (1), wherein the pigment content contained in the abovementioned yellow ink is 4 to 7 wt %, the pigment content contained in the abovementioned magenta ink is 4 to 7 wt %, and the pigment content contained in the abovementioned cyan ink is 3 to 6 wt %.

(3) The ink set according to the abovementioned (1) or (2), wherein the ink set further contains a light magenta ink (Lm) and a light cyan ink (Lc) which contain the same pigments as the abovementioned magenta ink and cyan ink, but have different color densities, the pigment contained in the light magenta ink is C. I. pigment violet 19, and the pigment contained in the light cyan ink is C. I. pigment blue 15:3.

(4) The ink set according to the abovementioned (3), wherein the pigment content contained in the abovementioned light magenta ink is 0.5 to 2 wt %, and the pigment content contained in the abovementioned light cyan ink is 0.5 to 2 wt %.

(5) The ink set according to any of the abovementioned (1) through (4), which further contains three or more types of black inks with different pigment concentrations.

(6) The ink set according to the abovementioned (5), wherein the pigment contained in the abovementioned black inks is carbon black.

(7) The ink set according to the abovementioned (5) or (6), wherein the abovementioned three or more types of black inks with different pigment concentrations comprise a high-concentration black ink with a pigment concentration of 1.5 wt % or greater, a medium-concentration black ink with a pigment concentration of 0.4 wt % to 1.5 wt %, and a low-concentration black ink with a pigment concentration of 0.01 wt % to 0.4 wt %.

(8) An ink jet recording apparatus comprising the ink set according to any of the abovementioned (1) through (7).

In the present invention, furthermore, in order to solve at least some of the abovementioned problems, an ink set which is used in an ink jet printer, and which comprises at least a magenta ink, a yellow ink and a cyan ink is endowed with characteristics which are such that the spectroscopic reflectance in the spectroscopic reflectance characteristics of the magenta ink is 0.4 or less at least the wavelength where the spectroscopic reflectance of the yellow ink and the spectroscopic reflectance of the abovementioned cyan ink intersect (below, this invention will be designated as the ink of Embodiment C). Furthermore, in the present specification, the term "spectroscopic reflectance of the ink" refers to the spectroscopic reflectance of recorded images formed by the jetting of the ink onto a recording medium. At the wavelength where the spectroscopic reflectance values of the yellow ink and cyan ink intersect, the substantially colorless spectroscopic reflectance characteristics that are produced by the mixing of the cyan ink, magenta ink and yellow ink are greater than in other wavelength regions. Consequently, metamerism is greater. Accordingly, the present invention uses a magenta ink with characteristics which are such that the spectroscopic reflectance of this ink is 0.4 or less at this wavelength. In cases where a substantially colorless image is thus produced using a magenta ink whose spectroscopic reflectance at the abovementioned wavelength is 0.4 or less, the substantially colorless spectroscopic reflectance at this wavelength can be suppressed, so that these substantially colorless spectroscopic reflectance characteristics can be formed as substantially flat characteristics in the visible wavelength region as a whole.

Characteristics which form a wavelength region in which the spectroscopic reflectance is 0.4 or less in at least the range extending from the abovementioned intersection wavelength to a wavelength of 550 nm are conceivable as one example of even more desirable spectroscopic reflectance characteristics of the magenta ink. If the spectroscopic reflectance of the magenta ink is set at 0.4 or less at the wavelength at which the spectroscopic reflectance values of the cyan ink and yellow ink intersect as described above, the substantially colorless spectroscopic reflectance characteristics can be made substantially flat throughout the entire visible wavelength region; accordingly, such characteristics are ideal. The spectroscopic reflectance characteristics of the magenta ink used in the present invention as described above may be taken in terms of absolute values with respect to the spectroscopic reflectance values of the cyan ink and yellow ink.

On the other hand, such spectroscopic reflectance characteristics of the magenta ink may also be taken in terms of relative values with respect to the spectroscopic reflectance characteristics of the cyan ink and yellow ink. Accordingly, an ink set which is used in an ink jet printer, and which comprises at least a magenta ink, a yellow ink and a cyan ink, is endowed with characteristics which are such that in the spectroscopic reflectance characteristics of the magenta ink at the wavelength where the spectroscopic distributions of the yellow ink and the abovementioned cyan ink intersect, a spectroscopic reflectance is formed that is 0.4 or less relative to the spectroscopic reflectance values of the yellow ink and cyan ink at the same wavelength (below, this invention will be designated as the ink set of Embodiment D). As a result, an effect similar to that described above (an effect that makes it possible to make the substantially colorless spectroscopic reflectance characteristics substantially flat throughout the entire visible wavelength region) can be obtained.

Characteristics which are such that the spectroscopic reflectance forms a spectroscopic reflectance that is 0.4 or less relative to the spectroscopic reflectance of the abovementioned yellow ink in at least the range extending from the abovementioned intersection wavelength to a wavelength of 550 nm are conceivable as one example of even more desirable spectroscopic reflectance characteristics of the magenta ink in this case. Accordingly, as one example of a magenta ink composition which allows the realization of the abovementioned spectroscopic reflectance characteristics, the magenta ink is formed with a composition that contains a styrene-acrylic acid copolymer at the rate of at least 0.7 wt %, glycerol at the rate of at least 15 wt %, ethylene glycol at the rate of at least 5 wt %, 2-pyrrolidone at the rate of at least 2 wt %, 1,2-hexanediol at the rate of at least 5 wt %, and an acetylene glycol type compound at the rate of at least 0.5 wt %.

As one example of a magenta ink composition that allows the realization of spectroscopic reflectance characteristics similar to those described above, the magenta ink may contain one or more high-boiling-point compounds selected from among polyhydric alcohol type compounds and saccharides at the rate of 5% or greater. Furthermore, the magenta ink may contain one or more polar solvents selected from among glycol ether type compounds and alkyldiol type compounds at the rate of 1% or greater. Furthermore, the magenta ink may contain one or more surfactants selected from among acetylene glycol type compounds, acetylene alcohol type compounds and polysiloxane type compounds at the rate of 0.1% or greater.

Furthermore, the magenta ink may simultaneously contain one or more high-boiling-point compounds selected from among polyhydric alcohol type compounds and saccharides at the rate of 5% or greater, one or more polar solvents selected from among glycol ether type compounds and alkyldiol type compounds at the rate of 1% or greater, and one or more surfactants selected from among acetylene glycol type compounds, acetylene alcohol type compounds and polysiloxane type compounds at the rate of 0.1% or greater. Furthermore, the magenta ink may contain a resin at the rate of 0.1% or greater.

As examples of the compositions of yellow and cyan inks that are suitable for use in the ink set of the present invention, the yellow ink is formed with a composition containing at least a styrene-acrylic acid copolymer at the rate of 1 wt %, glycerol at the rate of 15 wt %, ethylene glycol at the rate of 5 wt %, 2-pyrrolidone at the rate of 2 wt %, 1,2-hexanediol at the rate of 5 wt %, and an acetylene glycol type compound at the rate of 0.5 wt %. Furthermore, the cyan ink is formed with a composition containing at least a styrene-acrylic acid copolymer at the rate of 0.5 wt %, glycerol at the rate of 15 wt %, ethylene glycol at the rate of 5 wt %, 2-pyrrolidone at the rate of 2 wt %, 1,2-hexanediol at the rate of at least 5 wt %, and an acetylene glycol type compound at the rate of at least 0.5 wt %.

Furthermore, as examples of coloring materials of the cyan ink, yellow ink and magenta ink that are suitable for use in the ink set of the present invention, the coloring material of the cyan ink is constructed from "C. I. pigment blue 15:3", and the coloring material of the yellow ink is constructed from "C. I. pigment yellow 74"; furthermore, the coloring material of the magenta ink is constructed from "C. I. pigment violet 19".

Furthermore, it goes without saying that the present invention is also established as an ink jet recording method for forming mixed-color portions by means of a magenta ink, yellow ink and cyan ink using the ink set described above, and an ink jet recording apparatus for realizing this ink jet recording method.

Furthermore, the present invention respectively provides a recording method for forming images using the abovementioned ink set, an ink jet recording method for forming mixed-color portions by means of the magenta ink, yellow ink and cyan ink in the abovementioned ink set, a recording apparatus for realizing the abovementioned recording method, an ink jet recording apparatus comprising the abovementioned ink set, a recording system for forming images using the abovementioned ink set, and recorded matter in which images are formed using the abovementioned ink set.

DESCRIPTION OF DRAWINGS

FIG. 8 is a schematic operating diagram which shows the operation that is performed when images are printed;

FIG. 9 is an explanatory diagram which illustrates the manner in which colors are viewed in the human eye;

FIG. 10 is a diagram which shows the spectroscopic reflectance of the CMY inks;

FIG. 11 is a chart which shows the ink compositions;

EXPLANATION OF SYMBOLS

Figure 1:
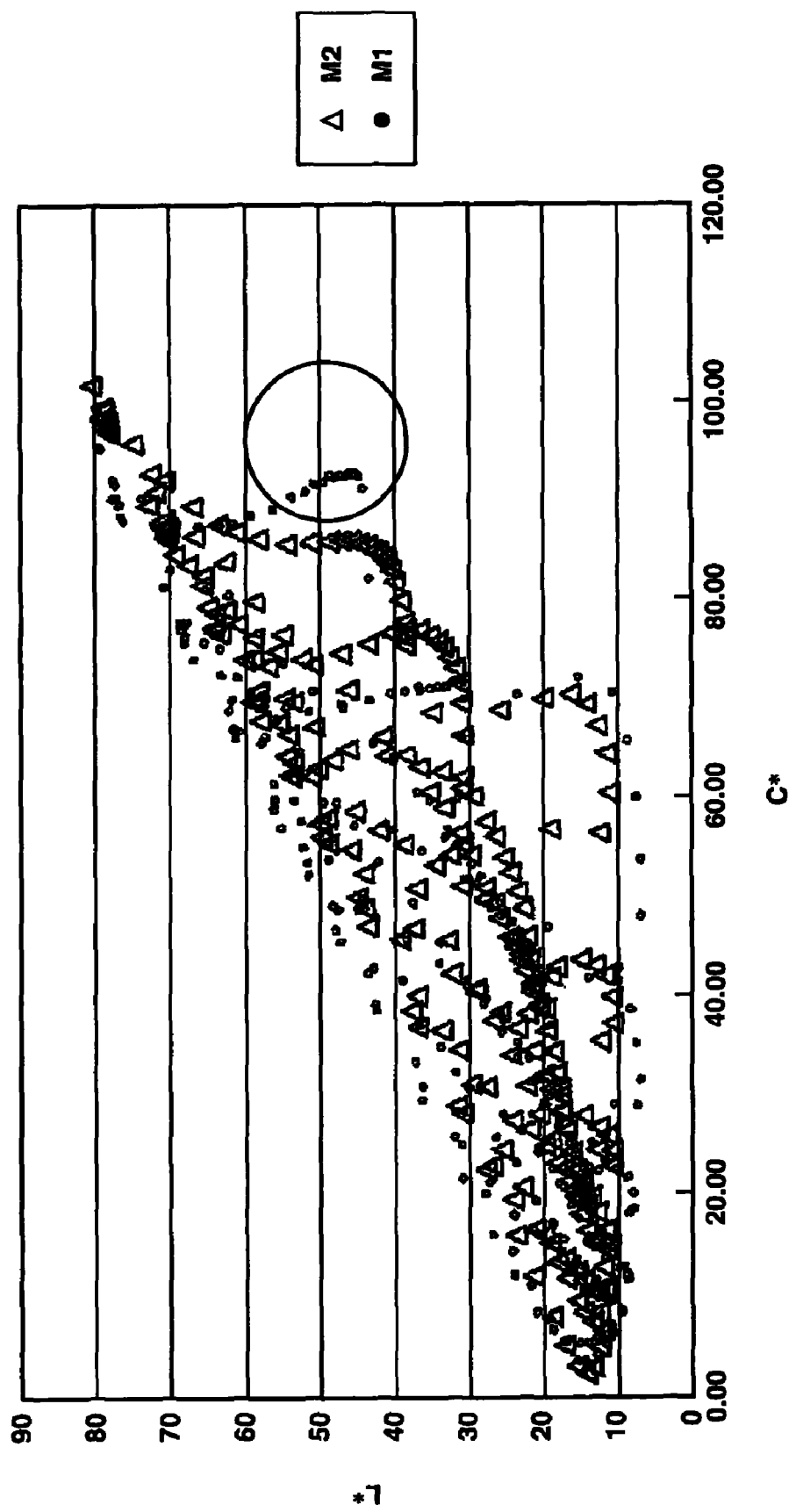
FIG. 1 is a graph which shows the relationship between $C^*$ and $L^*$ of recorded matter using dark magenta inks (M1 and M2) in order to evaluate the color reproducibility of the ink set.

10 Computer, 11, 41 CPU, 12 System bus, 13, 42 ROM, 14, 43, RAM, 15 HDD, 15a Image data, 15b LUT, 16 Flexible disk drive, 17 CD-ROM drive, 18 Display, 20 OS, 21 PRT-DRV, 21a Image data acquisition module, 21b Color conversion module, 21c Halftone processing module, 21d Printing data production module, 22 Input device DRV, 23 Display DRV, 25 Application program, 31 Keyboard, 32 Mouse, 40 Printer, 44 ASIC, 45 Control IC, 47a Carriage mechanism, 47b Paper feed mechanism, 48a through 48f Ink cartridges, 49 Head driving part.

DETAILED DESCRIPTION

The present invention will be described below in terms of preferred embodiments.

Embodiment A (Ink Set)

As was described above, the ink set of Embodiment A comprises three types of inks (YMC inks), i. e., a specified magenta ink (M), a specified yellow ink (Y) and a specified cyan ink (C), as essential constituent elements.

In the magenta ink (M) used in the present Embodiment A, in a case where the Y value [of this ink] in the XYZ display system stipulated by the CIE (Commission Internationale d'Eclairage) as calculated from the ultraviolet-visible transmission spectrum of a dilute aqueous solution of the ink with a coloring material concentration of 0.01 wt % or less is 55 (for example, under the condition at a visual field angle of 2 degrees with a D 65 light source), the Z value [of this ink] in the same display system is 83 or less. From the standpoint of improving the effect of the present invention, and especially from the standpoint of achieving a greater elimination of metamerism, an ink whose Z value in the same display system is 80 or less is desirable, and an ink whose Z value is 78 or less is even more desirable.

Here, for example, the abovementioned Z value can be obtained by measuring the transmissivity at a scanning speed of 600 nm/min, a measurement wavelength range of 380 to 800 nm and a slit width of 2.0 nm using a U3300 manufactured by Hitachi Seisakusho or the like, and calculating the value at a visual field angle of 2 degrees using a D65 light source (the same is true in the case of the light magenta inks described later).

Furthermore, in the case of the abovementioned magenta ink, the $L^*$ value in the CIE-stipulated Lab display system of an aqueous solution of the ink diluted 1000 times by weight as stipulated is 70 or less. From the standpoint of improving the effect of the present invention, and especially from the standpoints of improving the coloring characteristics, achieving a greater elimination of metamerism and reducing the conspicuousness of graininess caused by the dot expressions of images with an $L^*$ value of 70 to 80, an ink whose $L^*$ value in the same display system is 50 to 70 is desirable, and an ink whose $L^*$ value is 60 to 70 is even more desirable.

Here, for example, the abovementioned $L^*$ value can be measured by measuring the transmissivity at a scanning speed of 600 nm/min, a measurement wavelength range of 380 to 800 nm and a slit width of 2.0 nm using a U3300 manufactured by Hitachi Seisakusho or the like, and calculating the value at a visual field angle of 2 degrees using a D65 light source (the same is true in the case of other inks described below).

In the case of the yellow ink (Y) used in the present Embodiment A, the $L^*$ value in the CIE-stipulated Lab display system of an aqueous solution of the ink diluted 1000 times by weight is 95 or less. In particular, from the standpoint of being able to improve the effect of the present invention, and especially from the standpoint of color reproducibility, an ink whose $L^*$ value in the same display system is 70 to 95 is desirable, and an ink whose $L^*$ value is 85 to 95 is even more desirable.

In the case of the cyan ink (C) used in the present embodiment A, the $L^*$ value in the CIE-stipulated Lab display system of an aqueous solution of the ink diluted 1000 times by weight is 70 or less. In particular, from the standpoint of being able to improve the effect of the present invention, and especially from the standpoints of improving the coloring characteristics, achieving a greater elimination of metamerism and reducing the conspicuousness of graininess caused by the dot expressions of images with an $L^*$ value of 70 to 80, an ink whose $L^*$ value in the same display system is 50 to 70 is desirable, and an ink whose $L^*$ value is 60 to 70 is even more desirable.

From the standpoint of superior image fastness of the recorded matter and the like, pigments are desirable as the coloring materials (coloring agents) contained in the respective M, Y and C inks of the ink set of Embodiment A. Furthermore, both inorganic pigments and organic pigments can be used as such pigments, and these pigments may be used singly or in mixtures comprising a plurality of pigments. For example, besides titanium oxide and iron oxide, carbon black or the like manufactured by universally known methods such as the contact method, furnace method, thermal method or the like may be used as the abovementioned inorganic pigments. Furthermore, azo pigments (including azo lake, insoluble azo pigments, condensed azo pigments, chelate azo pigments and the like), polycyclic pigments (e. g., phthalocyanine pigments, perylene pigments, perinone pigments, anthraquinone pigments, quinacridone pigments, dioxazine pigments, thioindigo pigments, isoindolynone pigments, quinofuralone pigments and the like), dye chelates (e. g., basic dye type chelates, acidic dye type chelates and the like), nitro pigments, nitroso pigments, aniline black and the like may be used as the abovementioned organic pigments.

In concrete terms, desired pigments may be used in accordance with the inks of the respective colors as shown below.

There are no particular restrictions on the pigment of the magenta ink, as long as the magenta ink has the [abovementioned] specified Z value and specified $L^*$ value. For example, one or more pigments selected from among C. I. pigment red 5, 7, 12, 48 (Ca), 48 (Mn), 57 (Ca), 57:1, 112, 122, 123, 168, 184, 202, 207 and 209, C. I. pigment violet 19 and the like may be used. In particular, C. I. pigment violet 19 is especially desirable, since this pigment makes it possible to obtain high-quality images with greatly reduced metamerism and graininess.

Furthermore, there are no particular restrictions on the pigment of the yellow ink, as long as the yellow ink has the [abovementioned] specified $L^*$ value. For example, one or more pigments selected from among C. I. pigment yellow 1, 2, 3, 12, 13, 14, 16, 17, 73, 74, 75, 83, 93, 95, 97, 98, 109, 110, 114, 128, 129, 138, 139, 147, 150, 151, 154, 155, 180, 185 and the like may be used.

Furthermore, there are no particular restrictions on the pigment of the cyan ink, as long as the cyan ink has the [abovementioned] specified $L^*$ value. For example, one or more pigments selected from among C. I. pigment blue 1, 2, 3, 15:3, 15:4, 15; 34, 16, 22 and 60, C. I. vat blue 4, 60 and the like may be used.

In the case of the ink set of the present Embodiment A, in particular, a combination of YMC inks in which the pigment of the magenta ink is C. I. pigment violet 19, the pigment of the yellow ink is C. I. pigment yellow 74 and the pigment of the cyan ink is C. I. pigment blue 15:3 produces a much smoother visible absorption spectrum when mixed, and is therefore desirable.

It is desirable from the standpoint of improving the coloring characteristics and the prevention of clogging that the pigment content be no less than 3 wt % but no more than 10 wt % in each of the Y, M and C inks. In particular, from the standpoint of reducing the conspicuousness of graininess caused by the dot expression of images with a high resolution (720×720 dpi), especially desirable pigment contents are a content of 3 to 7 wt % in the magenta ink, a content of 3 to 7 wt % in the yellow ink, and a content of 3 to 7 wt % in the cyan ink.

The ink set of the present Embodiment A comprises at least the respective inks described above, i. e., magenta, yellow and cyan inks; however, especially from the standpoint of reducing the conspicuousness of graininess caused by the dot expression of images with a low resolution (360×360 dpi), it is desirable that this ink set further comprise a light magenta ink (Lm) in which the $L^*$ value in the CIE-stipulated Lab display system of an aqueous solution of the ink diluted 1000 times by weight exceeds 70.

From the standpoint of further increasing the abovementioned effect, it is even more desirable that the abovementioned $L^*$ value of the light magenta ink be greater than 70 but no greater than 90, and a value in the range of 80 to 90 is especially desirable.

In addition to having the abovementioned specified $L^*$ value, it is desirable (especially from the standpoint of improving the elimination of metamerism) that the light magenta ink have a Z value (in the XYZ display system stipulated by the CIE, as calculated form the ultraviolet-visible transmission spectrum of a dilute aqueous solution of the ink with a coloring material concentration of 0.01 wt % or less) of 83 or less, preferably 80 or less, and most preferably 78 or less, in a case where the Y value of the ink in the same display system is 55.

Furthermore, there are no particular restrictions on the coloring material of the light magenta ink, as long as the light magenta ink has the [abovementioned] specified $L^*$ value. For example, one or more of the pigments indicated as examples of pigments used in the abovementioned magenta ink (M) may be used.

Furthermore, in regard to the pigment content in the light magenta ink, it is desirable that this content be less than 3 wt % in the light magenta ink, and a content of 1 wt % or greater but less than 3 wt % is especially desirable.

It is especially desirable from the standpoint of reducing the conspicuousness of graininess caused by the dot expression of images with a low resolution that the ink set of the present Embodiment A further comprise a light cyan ink (Lc) in which the $L^*$ value in the CIE-stipulated Lab display system of an aqueous solution of the ink diluted 1000 times by weight exceeds 70.

From the standpoint of further increasing the abovementioned effect, it is even more desirable that the abovementioned $L^*$ value of the light cyan ink be greater than 70 but no greater than 90, and a value in the range of 80 to 90 is especially desirable.

Furthermore, there are no particular restrictions on the coloring material of the light cyan ink, as long as the light cyan ink has the [abovementioned] specified $L^*$ value. For example, one or more of the pigments indicated as examples of pigments used in the abovementioned cyan ink (C) may be used.

Furthermore, in regard to the pigment content in the light cyan ink, it is desirable that this content be less than 3 wt % in the cyan ink, and a content of 0.5 to 2.5 wt % is especially desirable.

If the ink set of the present Embodiment A further comprises an ink (A) in which the $L^*$ value in the CIE-stipulated Lab display system of an aqueous solution of the ink diluted 1000 times by weight is no less than 50 but no more than 80, the a* value of this aqueous solution is no less than 35 but no more than 85, and the b* value is no less than −5 but no more than 55, this makes it possible to reproduce colors with a lower lightness and higher saturation than in cases where images are formed by mixing the two colors of the magenta ink and yellow ink; accordingly, the inclusion of such an ink in the ink set is desirable from the standpoint of further enhancing the abovementioned effect.

From the standpoint of further enhancing the abovementioned effect, it is even more desirable that the abovementioned L* value of the ink (A) be in the range of 65 to 80. Especially from the standpoint of reducing the conspicuousness of graininess caused by the dot expression of images with an L* value of 70 to 80, it is desirable that the abovementioned L* value of the ink (A) be in the range of 65 to 75.

The type and content of the coloring material of the ink (A) are appropriately selected so that this ink has the abovementioned L*, a* and b* values.

For example, one or more types of coloring materials selected from among C. I. pigment orange 5, 43 and 62, C. I. pigment red 17, 49:2, 112, 149, 177, 178, 188, 255 and 264, and the like, may be used as the coloring material of the ink (A).

Furthermore, in regard to the content of the coloring material in the ink (A), it is desirable that this content be 1.5 to 5.5 wt %, and preferably 2.0 to 3.0 wt %, in the ink (A).

If the ink set of the present Embodiment A further comprises an ink (B) in which the L* value in the CIE-stipulated Lab display system of an aqueous solution of the ink diluted 1000 times by weight is 20 to 60, the a* value of this aqueous solution 50 to 90 and the b* value of this aqueous solution is −90 to −50, this makes it possible to reproduce colors with a lower lightness and a high saturation than in cases where images are formed by mixing the two colors of the magenta ink and cyan ink. Accordingly, the inclusion of such an ink (B) in the ink set is desirable from the standpoint of obtaining images with an even broader range of color reproduction.

From the standpoint of further enhancing the abovementioned effect, it is further desirable that the abovementioned L* value of the ink (B) be in the range of 30 to 50. Especially from the standpoint of reducing the conspicuousness of graininess caused by the dot expression of images with an L* value of 70 to 80, it is desirable that the L* value of the abovementioned ink (B) be in the range of 40 to 50.

The type and content of the coloring material of the ink (B) are appropriately selected so that this ink has the abovementioned L*, a* and b* values.

For example, one or more types of coloring materials selected from among C. I. pigment blue 60, C. I. pigment violet 3, 19, 23, 32, 36 and 38, and the like, may be used as the coloring material of the ink (B).

Furthermore, in regard to the content of the coloring material in the ink (B), it is desirable that this content be 1.0 to 7.0 wt %, and preferably 1.5 to 3.0 wt %, in the ink (B).

The ink set of the present Embodiment A may further comprise a black ink (K) if necessary.

Examples of coloring materials that can be used in such a black ink include inorganic pigments such as carbon black (C.I. pigment black 7), e. g., furnace black, lamp black, acetylene black, channel black or the like, iron oxide pigments or the like, and organic pigments such as aniline black (C. I. pigment black 1) or the like. Among these pigments, the use of carbon black is especially desirable. Desirable examples of carbon black include No. 2300, NO. 900, MCF88, No. 33, No. 40, No. 45, No. 52, MA7, MA8, MA100, No. 2200B and the like manufactured by Mitsubishi Kagaku, Raven5750, Raven5250, Raven5000, Raven3500, Raven1255, Raven700 and the like manufactured by Columbia Co., Regal 400R, Regal 1660R, Mogul L, Monarch 700, Monarch 800, Monarch 880, Monarch 900, Monarch 1000, Monarch 1100, Monarch 1300, Monarch 1400 and the like manufactured by Cabot Co., and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 and the like manufactured by Degussa Co.

The content of the pigment in the black ink is preferably 0.1 to 10.0 wt %, and is even more preferably 1.0 to 8.0 wt %.

Furthermore, in addition to the abovementioned inks, the ink set of the present Embodiment A may contain one or more other inks such as light black inks, transparent inks, white inks or the like.

It is desirable that the respective inks of the ink set of the present Embodiment A use pigments as coloring materials, and that these inks contain dispersing agents used to disperse the pigments. Dispersing agents similar to those used in [conventional] pigment inks of this type can be used without any particular restrictions as dispersing agents [in the present invention]. For example, cationic dispersing agents, anionic dispersing agents, nonionic dispersing agents or surfactants and the like may be used. Examples of anionic dispersing agents that can be used include polyacrylic acids, polymethacrylic acids, acrylic acid-acrylonitrile copolymers, vinyl acetate-acrylic acid ester copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methylstyrene-acrylic acid copolymers, styrene-α-methylstyrene-acrylic acid-acrylic acid alkyl ester copolymers, styrene-maleic copolymers, vinyinaphthalene-maleic acid copolymers, vinyl acetate-ethylene copolymers, vinyl acetate-fatty acid vinylethylene copolymers, vinyl acetate-maleic acid ester copolymers, vinyl acetate-crotonic acid copolymers, vinyl acetate-acrylic acid copolymers and the like. Furthermore, examples of anionic surfactants that can be used include sodium dodecylbenzenesulfonate, sodium laurate, ammonium salts of polyoxyethylene alkyl ether sulfates and the like, and examples of nonionic surfactants that can be used include polyoxyethylene alkyl ethers, polyoxyethylene alkyl esters, polyoxyethylene sorbitan fatty acid esters, polyoxyethylene alkyl phenyl ethers, polyoxyethylene alkylamines, polyoxyethylene alkylamides and the like. These compounds may be used singly or in combinations of two or more compounds. In particular, from the standpoint of increasing the dispersion stability of the pigments, it is desirable to use styrene-(meth)acrylic acid copolymers.

The abovementioned dispersing agents are ordinarily contained in the abovementioned respective inks at the rate of 140 wt % or less (calculated as solid content), with the weights of the abovementioned pigments as a standard.

Furthermore, in the abovementioned inks such as the magenta ink, yellow ink, cyan ink, light magenta ink, light cyan ink, ink (A), ink (B) and the like, the abovementioned dispersing agents are preferably contained in the inks at the rate of 10 to 140 wt % (more preferably at the rate of 10 to 100 wt %, and even more preferably at the rate of 20 to 40 wt %) calculated as solid content, with the weights of the abovementioned pigments as a standard.

Furthermore, the contents of the dispersing agents with respect to the amounts of the respective inks are preferably 0.1 to 10 wt %, and even more preferably 0.3 to 6 wt %, calculated as solid content.

Furthermore, in cases where the respective inks of the ink set of the present Embodiment A are used in ink jet recording, it is desirable from the standpoint of preventing clogging of the ink jet printer head (by preventing drying of the ink) that these inks contain a high-boiling-point organic solvent. Examples of high-boiling-point organic solvents that can be used include polyhydric alcohols such as ethylene glycol, diethylene glycol, triethylene glycol, polyethylene glycol, polypropylene glycol, propylene glycol, butylene glycol, 1,2, 6-hexanetriol, thioglycol, hexylene glycol, glycerol, trimethylolethane, trimethylolpropane and the like; alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether and the like; urea, 2-pyrrolidone, N-methyl-2-pyrrolidone, 1,3-dimethyl-2-imidazolinone, organic alkalies such as triethanolamine and the like, and saccharides such as sugar alcohols and the like. These solvents may be used singly or in combinations of two or more solvents. In particular, the addition of an organic alkali such as triethanolamine or the like together with glycerol improves the prevention of clogging, stabilizes the dispersibility of the coloring material, and improves the glossiness of recorded images, and is therefore desirable.

The abovementioned high-boiling-point organic solvents are preferably contained in the abovementioned respective inks at the rate of 0.1 to 30 wt %, and are even more preferably contained at the rate of 0.5 to 20 wt %.

Furthermore, among these high-boiling-point solvents, triethanolamine has the functions of a pH adjusting agent and dispersion stabilizing agent for the inks; accordingly, from the standpoint of achieving a favorable manifestation of these functions, it is desirable to use this triethanolamine in the range of 0.1 to 10 wt % in the respective inks.

Furthermore, from the standpoint of increasing the ink permeability by increasing the wettability on the recording medium, the respective inks of the ink set of the present Embodiment A may contain a permeation promoting agent. Examples of permeation promoting agents that can be used include alcohols such as methanol, ethanol, iso-propyl alcohol and the like; lower alkyl ethers of polyhydric alcohols such as ethylene glycol monomethyl ether, diethylene glycol monoethyl ether, diethylene glycol monobutyl ether, triethylene glycol monobutyl ether, propylene glycol monobutyl ether, dipropylene glycol monobutyl ether and the like; and diols such as 1,2-pentanediol, 1,2-hexanediol and the like. These compounds may be used singly or in combinations of two or more compounds. It is especially desirable to use diethylene glycol monobutyl ether, triethylene glycol monobutyl ether or 1,2-hexanediol.

The abovementioned permeation promoting agent is preferably contained in the abovementioned inks at the rate of 1 to 20 wt %, and is even more preferably contained at the rate of 1 to 10 wt %.

Furthermore, from the standpoint of increasing the ink permeability by increasing the wettability on the recording medium in the same manner as in the case of the abovementioned permeation promoting agents, the respective inks of the ink set of the present Embodiment A may also use various types of surfactants such as anionic surfactants, nonionic surfactants, cationic surfactants, amphoteric surfactants and the like. In particular, the use of acetylene glycol type compounds or silicone type compounds is especially desirable. Commercially marketed compounds may be used as these acetylene glycol type compounds. Examples of compounds that can be used include Olfin Y, Surfynol 82, 440, 465, 485, STG, E1010 (all commercial names of products manufactured by Air Products and Chemicals Inc.) and the like. These compounds may be used singly or in combinations of two or more compounds. In particular, it is especially desirable to use E1010 or Surfynol 465. Furthermore, in regard to commercially marketed products, polysiloxane type compounds such as BYK348 (manufactured by BYK-Chemie Japan) and the like can be used as the abovementioned silicone type compounds. The content of such acetylene glycol type compounds and/or the abovementioned silicone type compounds in the abovementioned inks is preferably 0.01 to 5 wt %, even more preferably 0.1 to 1.0 wt %, and most preferably 0.1 to 0.5 wt %.

Furthermore, from the standpoint of shortening the ink drying time, the respective inks of the ink set of the present Embodiment A may contain a low-boiling-point solvent. Examples of such low-boiling-point solvents that can be used include methanol, ethanol, n-propyl alcohol, iso-propyl alcohol, n-butanol, sec-butanol, tert-butanol, iso-butanol, n-pentanol and the like. These solvents may be used singly or in combinations of two or more solvents. Monohydric alcohols are especially desirable.

The respective inks of the ink set of the present Embodiment A contain components such as the abovementioned pigments, dispersing agents, high-boiling-point solvents, permeation promoting agents, acetylene glycol type compounds and/or silicone type compounds and the like, and ordinarily contain water as the balance. It is desirable to use pure water or ultra-pure water such as ion exchange water, ultra-filtered water, reverse osmosis water, distilled water or the like as this water. In particular, water produced by subjecting these types of water to a sterilization treatment using ultraviolet irradiation, addition of hydrogen peroxide or the like makes it possible to prevent the generation of mold and bacteria over a long period of time, and is therefore desirable. If necessary, the respective inks of the ink set of the present Embodiment A may also contain other additives, e. g., fixing agents such as water-soluble rosins or the like, anti-mold agents or preservatives such as sodium benzoate or the like, antioxidants or ultraviolet absorbing agents such as allophanates or the like, chelating agents, oxygen absorbing agents, pH adjusting agents and the like. These additives may be used singly or in combinations of two or more additives.

The respective inks of the ink set of the present Embodiment A can be prepared in the same manner as conventional pigment inks using a conventional universally known apparatus, e. g., a ball mill, sand mill, attriter, basket mill, roll mill or the like. In the preparation of these inks, it is desirable to remove coarse particles using a membrane filter, mesh filter or the like.

There are no particular restrictions on the use of the ink set of the present Embodiment A; however, it is desirable that this ink set be used in an ink jet recording method which is a recording method in which liquid droplets of ink are caused to jet from nozzles, and these liquid droplets are caused to adhere to a recording medium, so that images such as characters, figures or the like are formed, and it is especially desirable that this ink set be used in an on-demand type ink jet recording method. Examples of on-demand type ink jet recording methods include piezoelectric element recording methods in which recording is performed using piezoelectric elements that are disposed in a printer head, hot jet recording methods in which recording is performed using thermal energy created by heaters such a heat-generating resistance elements or the like disposed in a printer head, and other similar recording methods. The ink set of the present Embodiment A can be appropriately used in any of these ink jet recording methods.

Furthermore, in cases where the ink set of the present Embodiment A is used in an ink jet recording method as described above, the reliability of this ink set as an ink set for use in ink jet recording is high, and in particular, the reliability as an ink set for use in ink jet recording can be increased even further (in spite of the fact that the color reproducibility is broad) by setting the respective inks in the ink set at pigment concentrations that do not cause clogging of the nozzles of the ink jet printer or the like.

In regard to the recording medium used to form images, the ink set of the present Embodiment A can be used without restrictions on recording media that are ordinarily used in ink jet recording methods and the like; however, this ink set is ideally used on media that have a coating layer or on ordinary paper (recording media in which fibers are exposed at the surface on which recording is performed). In particular, if the ink set of the present Embodiment A is used on media that have a coating layer, a considerable suppression of the conspicuousness of graininess caused by dot expression when images are formed can be achieved.

In the present specification, the term "media that have a coating layer" refers to all media in which the surface on which images are formed (the surface on which recording is performed) using the abovementioned ink set is covered by at least a coating layer. Ordinarily, media that have an 85-degree luster of 120 or less are used as such media that have a coating layer. Here, the 85-degree luster is measured using a "PG1M" manufactured by Nippon Denshoku Kogyo K.K. or the like. Furthermore, in these measurements, the measuring apparatus is adjusted beforehand so that the 85-degree luster of a standard luster plate shows a value of 100.

Examples of media that have a coating layer include mirror surface tone media in which the 85-degree luster is 70 to 120, e. g., media which have a resin coating layer that allows naked-eye confirmation of the silhouette of a duplicate image of a fluorescent lamp in cases where light from such a fluorescent lamp is directed onto the medium from a distance of 1 m or greater (or the like). A typical example of such a medium is "PGPP (Premium Glossy Photo Paper)" manufactured by Seiko-Epson Co., which has an 85-degree luster of 81.

Furthermore, other examples of media that have a coating layer include semi-gloss tone media which have an 85-degree luster of 10 to 70, matte tone media which have an 85-degree luster of 10 or less, and the like.

Furthermore, the ink set of the present Embodiment A makes it possible to achieve an extreme suppression of graininess caused by dot expression even in the case of recording at a high resolution on relatively small-size media (preferably media that have a coating layer) such as L size or the like. Accordingly, the ink set of the present Embodiment A is especially useful on relatively small-size media such as L size or the like.

(Recording Method)

Next, the recording method of the present invention will be described.

The present invention can provide a recording method for forming images using the abovementioned ink set, i. e., an embodiment of a recording method for forming images using an ink set comprising at least a magenta ink (M) having the abovementioned specified Z value and L* value, a yellow ink (Y) having the abovementioned specified L* value, and a cyan ink (C) having the abovementioned specified L* value; in particular, a recording method using the ink set of the abovementioned embodiment is especially suitable. Furthermore, in all respects other than the use of the abovementioned ink set, the recording method of the present invention can be performed in the same manner as an ordinary ink jet recording method.

In particular, an ink jet recording method in which liquid droplets of the abovementioned inks of a plurality of colors are respectively caused to jet, and which is devised so that in cases where one color (monochrome) among the abovementioned YMC is formed on the recording medium, an image is formed by the ink corresponding to this color, and so that in cases where mixed color portions of secondary colors or greater (colors that cannot be formed using YMC inks singly), these mixed color portions are formed by at least two types of inks among the YMC inks, can be suitably provided. Furthermore, images with a greatly improved color reproducibility can be obtained by an ink jet recording method in which such mixed color portions are formed by at least two types of inks among the YMC inks, and the [abovementioned] Lm ink, Lc ink, ink (A) and/or ink (B). Furthermore, an ink jet recording method in which such mixed color portions are formed by a black ink (K) in addition to the abovementioned inks can be provided.

In the recording method of the present embodiment, it is desirable that images be formed so that the ink weight at a duty of 100% is 7 to 13 mg/inch$^2$.

Furthermore, in the case of mixed colors, it is desirable that images be formed so that the ink weight at a duty of 120% is 8 to 16 mg/inch$^2$.

Furthermore, in the present specification, the term "duty" refers to units of the value D defined and calculated by the following equation:

$$D=[\text{actual number of printed dots}/(\text{vertical resolution}\times \text{horizontal resolution})]\times 100$$

Furthermore, the term "duty of 100%" refers to the maximum ink weight for a single color per pixel.

(Recording System)

The present invention can provide an embodiment of a recording system for forming images using the abovementioned ink set. In particular, a recording apparatus such as an ink jet printer or the like (or some other recording system) using the ink set of the abovementioned embodiment is especially suitable.

(Recorded Matter)

The present invention can provide an embodiment of recorded matter in which images are formed using the abovementioned ink set. In particular, recorded matter using the ink set of the abovementioned embodiment is especially suitable.

Embodiment B

As was described above, the ink set of Embodiment B comprises three types of inks (YMC inks), i. e., a specified yellow ink (Y), a specified magenta ink (M) and a specified cyan ink (C), as essential constituent elements.

The abovementioned ink set makes it possible to obtain high-quality images in which metamerism is reduced by means of a combination of YMC in which the pigment in the yellow ink is C. I. pigment yellow 74, the pigment in the magenta ink is C. I. pigment violet 19, and the pigment in the cyan ink is C. I. pigment 15:3.

From the standpoint of coloring characteristics and the permissible level of graininess at a high resolution, it is desirable that the contents of the pigments in the abovementioned inks be 3 wt % or greater in the respective Y, M and C inks. Especially desirable pigment contents are 4 to 7 wt % in the yellow ink, 4 to 7 wt % in the magenta ink, and 3 to 6 wt % in the cyan ink.

Furthermore, in regard to the pigment contents in the abovementioned ink set, it is desirable from the standpoint of allowing images with an improved hue to be obtained that the content of the abovementioned cyan pigment in the cyan ink be smaller than the respective contents of the abovementioned yellow pigment and magenta pigment in the yellow ink and magenta ink.

The ink set of the present Embodiment B comprises the abovementioned respective inks, i. e., the abovementioned yellow, magenta and cyan inks; however, it is desirable from the standpoint of alleviating graininess at a low resolution that this ink set further comprise a light magenta ink (Lm).

From the standpoints of reducing graininess and metamerism at a low resolution, C. I. pigment violet 19 is desirable as the coloring material of this light magenta ink.

Furthermore, it is desirable that the content of the pigment in the light magenta ink be less than 3 wt %, and a content of 0.5 to 2 wt % is especially desirable.

It is desirable from the standpoint of alleviating graininess at a low resolution that the ink set of the present Embodiment B further comprise a light cyan ink (Lc).

From the standpoints of reducing graininess and metamerism at a low resolution, C. I. pigment blue 15:3 is desirable as the coloring material of this light cyan ink.

Furthermore, it is desirable that the content of the pigment in the light cyan ink be less than 3 wt %, and a content of 0.5 to 2 wt % is especially desirable.

Furthermore, it is desirable from the standpoints of improving the quality of monochromatic images, improving the halftone properties of portions with a low lightness, and stabilizing the gray balance so that variation in this balance is reduced, that the ink set of the present Embodiment B further comprise two or more, and preferably three or more, black inks with different pigment concentrations.

In a case where the abovementioned black inks with different pigment concentrations are divided into three groups, i. e., high-concentration black inks with a carbon black concentration of 1.5 wt % or greater, medium-concentration black inks with a carbon black concentration of 0.4 wt % or greater but less than 1.5 wt %, and low-concentration black inks with a carbon black concentration of 0.01 wt % or greater but less than 0.4 wt %, it is desirable that the black inks be equally selected from the different groups.

For example, carbon black manufactured by universally known methods such as the contact method, furnace method, thermal method or the like can be used as the carbon black contained in the black inks. In concrete terms, carbon black similar to that cited as examples of the carbon black desirable for use in the abovementioned ink set of Embodiment A, i. e., various types of carbon black including No. 2300 or the like manufactured by Mitsubishi Kagaku, can be used.

In the same ink set, the carbon black contained in the respective black inks may be the same or different types of carbon black.

Furthermore, in addition to the abovementioned inks, the ink set of the present Embodiment B may also comprise one or more other inks such as transparent inks, white inks or the like.

It is desirable that the respective inks of the present Embodiment B use pigments as coloring materials, and that these inks contain dispersing agents used to disperse these pigments. The types and contents of the dispersing agents are similar to those used in the abovementioned Embodiment A.

In particular, in the inks of the present Embodiment B, it is desirable that the abovementioned dispersing agents be contained at the rate of 20 to 80 wt %, preferably 25 to 60 wt % (calculated as solid content), with the weights of the abovementioned pigments as a standard.

Furthermore, for the same reasons as in Embodiment A, it is desirable that the respective inks of the ink set of the present Embodiment B contain a high-boiling-point solvent. The types and contents of such high-boiling-point solvents are similar to those used in the abovementioned Embodiment A.

Furthermore, for the same reasons as in Embodiment A, the respective inks of the ink set of the present Embodiment B may contain permeation promoting agents, various types of surfactants, low-boiling-point solvents, water, other additives and the like. The types and contents of these additives are similar to those used in the abovementioned Embodiment A.

In particular, examples of acetylene glycol type compounds that may be used as surfactants include Olfin E1010, STG, Y (all commercial names of products manufactured by Nisshin Kagaku K.K.), Surfynol 82, 104, 440, 465, 485 (all commercial names of products manufactured by Air Products and Chemicals Inc.) and the like. These compounds may be used singly or in combinations of two or more compounds. In particular, the use of E1010 or Surfynol 465 is especially desirable. Furthermore, in regard to the abovementioned silicone type compounds, compounds expressed by the following general formula (1) or the like may be used as commercially marketed products.

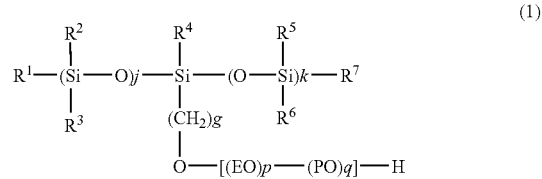

In the above formula, $R^1$ through $R^7$ each independently indicate a $C_{1-6}$ alkyl group, preferably a methyl group, and j, k and g each independently indicate an integer of 1 or greater, preferably 1 to 5, more preferably 1 to 4, and even more preferably 1 or 2. EO indicates an ethyleneoxy group, and PO indicates a propyleneoxy group. p and q indicate integers of 0 or greater, preferably 1 to 5, with p+q indicating an integer of 1 or greater, preferably 2 to 4. Within the brackets, EO and PO may be in any order, and may be random or in blocks.

In a desirable aspect of the present Embodiment B, a compound that satisfies the condition j=k=g=1 to 3 (preferably 1 or 2) is desirable as the compound of formula (1).

Furthermore, in another desirable aspect of the present Embodiment B, a compound in which $R^1$ through $R^7$ are all methyl groups, j=k=g=1, p is an integer of 1 or greater (preferably 1 to 5), and q indicates 0, is desirable as the compound of formula (1).

Compounds expressed by general formula (1) are commercially marketed, and such [commercially marketed] compounds may be used. For example, the silicone type surfactants BYK-345, BYK-346, BYK-347, BYK-348 and the like of BYK-Chemie Japan are desirable.

The abovementioned acetylene glycol type compounds and/or the abovementioned silicone type compounds are preferably contained in the abovementioned inks at the rate of 0.01 to 5 wt %, and a content of 0.1 to 1.0 wt % is even more desirable.

Furthermore, the inks of the present Embodiment B may also contain fine polymer particles (i. e., a resin emulsion). Moreover, the term "emulsion" refers to an aqueous dispersion of such fine polymer particles in which the dispersion medium is water and the dispersed substance comprises fine polymer particles.

From the standpoint of improving luster and improving the stability of the recorded images, it is desirable that the inks of the present Embodiment B contain three types of emulsions, i. e., (i) a polymer containing sulfonic acid groups (sol type resin), (ii) a modified polypropylene emulsion, and (iii) an alkali-soluble emulsion.

(i) Resin Emulsion (1)

It is desirable that the abovementioned polymer containing sulfonic acid groups be a diene type sulfonic-acid-group-containing polymer and/or a non-diene type sulfonic-acid-group-containing polymer.

The abovementioned polymer containing sulfonic acid groups is a polymer obtained by subjecting a polymer or copolymer obtained by the homopolymerization or copolymerization of the monomers shown below to a sulfonation treatment (Japanese Patent Application Laid-Open No. 11-217525), or a polymer obtained by the homopolymerization or copolymerization of sulfonated monomers. Such polymers include diene type sulfonic-acid-group-containing polymers in which diene type monomers are essential components, and non-diene type sulfonic-acid-group-containing monomers in which diene type monomers are not essential components.

Monomers that can be used in order to obtain the abovementioned diene type sulfonic-acid-group-containing polymers include diene type monomers and other monomers that can be used in combination with diene type monomers.

Examples of diene type monomers include diene type compounds with 4 to 10 carbon atoms, e. g., 1,3-butadiene, 1,2-butadiene, 1,3-pentadiene, 1,2-pentadiene, 2,3-pentadiene, isoprene, 1,2-hexadiene, 1,3-hexadiene, 1,4-hexadiene, 1,5-hexadiene, 2,3-hexadiene, 2,4-hexadiene, 2,3-dimethyl-1,3-butadiene, 2-ethyl-1,3-butadiene, 1,2-heptadiene, 1,3-heptadiene, 1,4-heptadiene, 1,5-heptadiene, 1,6-heptadiene, 2,3-heptadiene, 2,5-heptadiene, 3,4-heptadiene, 3,5-heptadiene, cyclopentadiene and the like. These diene type monomers can be used singly or in combinations of two or more monomers.

Examples of other monomers that can be used in combination with diene type monomers include aromatic monomers such as styrene, α-methylstyrene, o-methylstyrene, p-methylstyrene, m-methylstyrene, vinyinaphthalene and the like, (meth)acrylic acid alkyl esters such as methyl (meth)acrylate, ethyl (meth)acrylate, butyl (meth)acrylate and the like, mono- or dicarboxylic acids or dicarboxylic acid anhydrides such as (meth)acrylic acid, crotonic acid, maleic acid, itaconic acid or the like, vinylcyan compounds such as (meth)acrylonitrile and the like, and unsaturated compounds such as vinyl chloride, vinylidene chloride, vinyl methyl ethyl ketone, vinyl acetate, (meth)acrylamide, glycidyl (meth)acrylate and the like. These other monomers may be used single or in combinations of two or more monomers. In cases where these other monomers are used in combination, the amount of diene type monomers used is preferably 0.5 wt % or greater, more preferably 1 wt % or greater, and even more preferably 5 wt % or greater.

The diene type copolymers obtained by copolymerizing the abovementioned diene type monomers or other monomers that can be used in combination with diene type monomers may be copolymers of any type, including random copolymers and block copolymers.

Examples of desirable polymers include isoprene homopolymers, butadiene homopolymers, isoprene-styrene random copolymers, isoprene-styrene block copolymers, styrene-isoprene-styrene tertiary block copolymers, butadiene-styrene random copolymers, butadiene-styrene block copolymers, styrene-butadiene-styrene block copolymers, styrene-butadiene-styrene tertiary block copolymers, ethylene-propylene-diene tertiary block copolymers and the like. Examples of even more desirable copolymers isoprene-styrene block copolymers, styrene-isoprene-styrene tertiary block copolymers, butadiene-styrene block copolymers, styrene-butadiene-styrene block copolymers, styrene-butadiene-styrene tertiary block copolymers and the like.

The diene type sulfonic-acid-group-containing polymers used in the present Embodiment B may be polymers in which the abovementioned diene type polymers and/or polymers obtained by partially or completely hydrogenating the residual double bonds based on precursor monomers of the same are sulfonated by a universally known sulfonation method, e. g., one of the methods described in Nippon Kagakukai (ed.), Shin-Jikken Kagaku Koza [New Experimental Chemistry Lectures] (Vol. 14, 111. p. 1773), Japanese Patent Application Laid-Open No. 2-227403 or the like.

Examples of sulfonating agents that can be used include sulfuric anhydride, sulfuric acid, chlorosulfonic acid, fuming sulfuric acid, hydrogensulfites (salts of Li, Na, K, Rb, Cs or the like) or the like. The amount of sulfonating agent used is preferably 0.005 to 1.5 moles, and even more preferably 0.01 to 1.0 moles, per mole of the abovementioned polymers (calculated as sulfuric anhydride).

Next, it is desirable that the abovementioned diene type sulfonic-acid-group-containing polymers be used in a state obtained by causing water and/or a basic compound to act on the product obtained by sulfonation as described above. examples of basic compounds that can be used include alkali metal hydroxides, alkali metal alkoxides, alkali metal carbonates, aqueous ammonia, organo-metallic compounds, amines and the like. Such basic compounds may be used singly or in combinations of two or more compounds. The amount of such basic compounds used is 2 moles or less, preferably 1.3 moles or less, per mole of sulfonating agent used.

Examples of monomers that can be used to obtain non-diene type sulfonic-acid-group-containing polymers include monomers that have sulfonyl groups, e. g., vinyl monomers such as allylsulfonic acid, vinylsulfonic acid or methacrylsulfonic acid obtained by reacting isobutylene and sulfur trioxide, styrene type monomers such as sodium p-styrenesulfonate or the like (e. g., Spiromer manufactured by Toyo Soda K.K.), or methacrylic acid ester type monomers expressed by the general formula $CH_2=C(CH_3)-COO(AO)_nSO_3Na$ (A: lower alkylene group) (e. g., Eleminol RS-30 manufactured by San'yo Kasei K.K.), and sodium salts, potassium salts or lithium salts of the abovementioned monomers or the like.

Such non-diene type sulfonic-acid-group-containing polymers can also be obtained by copolymerizing monomers that do not contain sulfonic acid groups with the abovementioned monomers that have sulfonic acid groups.

Examples of other copolymerizable monomers include aromatic monovinyl compounds such as styrene, ethylvinylbenzene, α-methylstyrene, fluorostyrene, vinylpyrine and the like, acrylic acid ester monomers such as butyl acrylate, 2-ethylhexyl acrylate, β-methacryloyloxyethylhydrodiene phthalate, N,N'-dimethylaminoethyl acrylate and the like, methacrylic acid ester monomers such as 2-ethylhexyl methacrylate, methoxydiethylene glycol methacrylate, methoxypolyethylene glycol methacrylate, methyl methacrylate, ethyl methacrylate, butyl methacrylate, N,N'-dimethylaminoethyl methacrylate, glycidyl methacrylate and the like, vinyl cyanide compounds such as acrylonitrile, methacrylonitrile and the like, silicone-modified monomers, macromonomers and the like. Furthermore, conjugate double-bond compounds such a butadiene, isoprene and the like, vinyl ester compounds such as vinyl acetate and the like, and 4-methyl-1-pentene and other α-olefin compounds may also be cited. Among these copolymerizable monomers, styrene, methyl methacrylate and acrylonitrile are especially desirable. The amount of such copolymerizable monomers used is ordinarily 1 to 93 wt %, and preferably 5 to 80 wt %, of the polymerizable monomer(s) used.

Such non-diene type sulfonic-acid-group-containing polymers can be polymerized by subjecting the abovementioned sulfonic-acid-group-containing monomers or sulfonic-acid-group-containing monomers and other copolymerizable monomers to radical polymerization using a radical polymerization initiator, chain transfer agent or the like in a solvent used for polymerization such as water, an organic solvent or the like.

The abovementioned non-diene type sulfonic-acid-group-containing polymers obtained by copolymerizing the abovementioned non-diene type monomers may be copolymers of any type including random copolymers and block copolymers. In particular, acrylic type sulfonic-acid-group-containing polymers are especially desirable as non-diene type sulfonic-acid-group containing polymers.

From the standpoints of improving luster and improving the stability of the recorded images, it is desirable that the abovementioned fine polymer particles have an acid value of 100 or greater.

From the standpoints of improving luster and improving the stability of the recorded images, it is desirable that the abovementioned fine polymer particles have a weight average molecular weight (Mw) of no less than 8,000 but no more than 20,000, and a glass transition temperature (Tg; measured according to JIS K6900) of no less than 5° C. but not more than 50° C.

From the standpoints of improving luster and improving the stability of the recorded images, it is desirable that the minimum film forming temperature (MFT) of the abovementioned fine polymer particles be 20° C. or less.

It is desirable that the particle size of the abovementioned fine polymer particles be 70 nm or less. Even more preferably, this particle size is no less than 20 nm but no more than 70 nm. If the size of the fine polymer particles is within this range, the fine polymer particles can easily form an emulsion in water, so that inks with a high stability are obtained, and high-quality recorded images are obtained.

(ii) Resin Emulsion (2)

From the standpoints of improving luster and improving the stability of the recorded images, it is desirable that the abovementioned polypropylene emulsion be an emulsion obtained by modifying a polypropylene with a weight average molecular weight (Mw) of no less than 1,000 but no more than 50,000 with an unsaturated carboxylic acid or anhydride of the same, and then dispersing this modified polypropylene in water in the presence of a basic compound and an emulsifier.

It is desirable that the abovementioned unsaturated carboxylic acid be maleic acid and/or maleic anhydride.

Examples of modified polypropylene emulsions that can be used in the present Embodiment B include emulsions obtained by modifying a low-molecular-weight polypropylene by a universally known method using a heated reaction or an organic peroxide. For example, such an emulsion is obtained as follows: namely, in an inert gas atmosphere, a low-molecular-weight polypropylene is heated and dissolved in the presence of an aromatic solvent or a chlorine type solvent, or in the presence of a peroxide radical generating catalyst, and is modified by grafting an unsaturated carboxylic acid or an anhydride of the same.

For example, AQUACER593 (commercial name of a product manufactured by BYK-Chemie Japan) or the like can be used as such a modified polypropylene emulsion.

(iii) Resin Emulsion (3)

From the standpoints of improving luster and improving the stability of the recorded images, it is desirable that the abovementioned alkali-soluble emulsion be an emulsion that is formed by the colloidal dispersion of an acrylic resin in the ink.

It is desirable that this acrylic resin be a copolymer obtained by polymerizing an ethylenic unsaturated carboxylic acid monomer and another monomer that is copolymerizable with this monomer in the presence of a water-soluble macromolecular compound containing alcoholic hydroxy groups or a copolymerizable surfactant.

Examples of the abovementioned ethylenic unsaturated carboxylic acid monomers include ethylenic unsaturated monocarboxylic acid monomers such as acrylic acid, methacrylic acid and the like; ethylenic unsaturated polyhydric carboxylic acid monomers such as itaconic acid, maleic acid, fumaric acid, butenetricarboxylic acid and the like; ethylenic unsaturated polyhydric carboxylic acid partial ester monomers such as monobutyl fumarate, monobutyl maleate, mono-2-hydroxypropyl maleate and the like; and polyhydric carboxylic acid anhydrides such as maleic anhydride, citraconic anhydride and the like.

Examples of other monomers that can be copolymerized with the abovementioned ethylenic unsaturated carboxylic acid monomers include aromatic vinyl monomers such as styrene, α-methylstyrene, vinyltoluene, chlorostyrene and the like; (meth)acrylic acid ester monomers such as methyl (meth)acrylate, ethyl (meth)acrylate, propyl (meth)acrylate, n-amyl (meth)acrylate, isoamyl (meth)acrylate, hexyl (meth)acrylate, ethylhexyl (meth)acrylate, octyl (meth)acrylate, hydroxyethyl (meth)acrylate, hydroxypropyl (meth)acrylate, glycidyl (meth)acrylate and the like; cyano-group-containing ethylenic unsaturated monomers such as (meth)acrylonitrile and the like; ethylenic unsaturated glycidyl ether monomers such as allyl glycidyl ether and the like; ethylenic unsaturated amide monomers such as (meth)acrylamide, N-methylol (meth)acrylamide, N-butoxymethyl(meth)acrylamide and the like; conjugate diene monomers such as 1,3-butadiene, isoprene, 2,3-dimethyl-1,3-butadiene, 1,3-pentadiene and the like; and carboxylic acid vinyl ester monomers such as vinyl acetate and the like.

Water-soluble macromolecular compounds containing 5 to 25 alcoholic hydroxy groups per 1000 units of molecular weight are desirable as the abovementioned water-soluble macromolecular compounds containing alcoholic hydroxy groups; examples of such macromolecular compounds include vinyl alcohol type polymers such as polyvinyl alcohols, various types of modified polyvinyl alcohols and the like; saponified copolymers of vinyl acetate with acrylic acid, methacrylic acid or maleic anhydride; cellulose derivatives such as alkylcelluloses, hydroxyalkylcelluloses, alkylhydroxyalkylcelluloses and the like; starch derivatives such as alkyl starches, carboxymethyl starches and the like; and other compounds such as gum arabic, traganth gum, polyalkylene glycols and the like.

The abovementioned copolymerizable surfactants are surfactants that have one or more polymerizable vinyl groups per molecule; examples of such surfactants include anionic polymerizable surfactants such as sodium propenyl-2-ethylhexylsulfosuccinic acid ester, (meth)acrylic acid polyoxyethylene sulfuric acid ester, polyoxyethylene alkylpropenyl ether sulfuric acid ester ammonium salts, (meth)acrylic acid polyoxyethylene ester phosphoric acid esters and the like; and anionic polymerizable surfactants such as polyoxyethylene alkylbenzene ether (meth)acrylic acid esters, polyoxyethylene alkyl ether (meth)acrylic acid esters and the like.

From the standpoints of improving luster and improving the stability of the recorded images, the weight average molecular weight (Mw) of the alkali-soluble resin in the abovementioned alkali-soluble emulsion is preferably no less than 8,000 but no more than 20,000, and is even more preferably no less than 9,000 but no more than 10,000.

From the standpoints of improving luster and improving the stability of the recorded images, the acid value of the alkali-soluble resin in the abovementioned alkali-soluble emulsion is preferably 40 mg KOH/G or less.

From the standpoints of improving luster and improving the stability of the recorded images, it is desirable that the abovementioned alkali-soluble resin be caused to form an emulsion by colloidal dispersion in the ink after the pH has been adjusted to a value of 8 to 11 (preferably a pH value of 9 to 10) by means of an inorganic base such as an alkali metal hydroxide, alkaline earth metal hydroxide or the like.

From the standpoints of improving luster and improving the stability of the recorded images, it is desirable that the content of the abovementioned fine polymer particles in the respective inks be no less than 0.05 wt % but no more than 10.0 wt %. This content is more preferably no less than 0.1 wt % but no more than 5.0 wt %, and is even more preferably no less than 0.1 wt % but no more than 2.0 wt %. Furthermore, the weight of the fine polymer particles referred to here is the weight calculated in terms of the solid content.

A single type of fine polymer particles may be added, or two or more types of such particles may be mixed and added. In cases where such particles are mixed and added, the total content of the particles in the ink is preferably no less than 0.05 wt % but no more than 10.0 wt %, more preferably no less than 0.1 wt % but no more than 5.0 wt % (and even more preferably no less than 0.1 wt % but no more than 2.0 wt %).

The respective inks of the ink set of the present Embodiment B can be prepared in the same manner as conventional pigment inks using a conventional universally known apparatus, e. g., a ball mill, sand mill, aftriter, basket mill, roll mill or the like. In the preparation of these inks, it is desirable to remove coarse particles using a membrane filter, mesh filter or the like.

It is desirable that the ink set of the present Embodiment B be used in an ink jet recording method which is a recording method in which liquid droplets of ink are caused to jet from nozzles, and these liquid droplets are caused to adhere to a recording medium, so that characters and/or images are formed, and it is especially desirable that this ink set be used in an on-demand type ink jet recording method. Examples of on-demand type ink jet recording methods include piezoelectric element recording methods in which recording is performed using piezoelectric elements that are disposed in a printer head, hot jet recording methods in which recording is performed using thermal energy created by heaters such a heat-generating resistance elements or the like disposed in a printer head, and other similar recording methods. The ink set of the present Embodiment B can be appropriately used in any of these ink jet recording methods.

The present invention can provide a recording apparatus comprising the ink set of the abovementioned Embodiment B without any particular restrictions; preferably, this is a recording apparatus using the ink jet recording system described above.

Besides inks of the three primary colors of subtraction color mixing, i. e., yellow, magenta and cyan, the ink set of the present Embodiment B also comprises a light magenta ink, a light cyan ink and two or more black inks with different pigment concentrations. Accordingly, the color reproduction range is broad, the graininess caused by dot expression is favorably [reduced], and metamerism can be reduced by using specified pigment types. Furthermore, both monochromatic and color images can be stably output with high image quality, and the output tends not to be affected by conditions of the output environment such as temperature and the like; as a result, a stable gray balance is obtained.

Ink jet printers are designed so that the same output can be obtained any time at any place; however, since liquid inks are used, there is a possibility that the output may be affected by changes in the external environment (such as temperature and the like) that cause a variation in the viscosity of the inks. The reason for this is that in the case of an ink jet printer that causes ink to jet from a head under pressure, the discharge amount varies if the viscosity of the ink varies. In order to reduce this effect, the head driving comprises a function that compensates for the temperature at the time of output; in actuality, however, there is a possibility that the output will be subject to minute effects. Furthermore, besides temperature, the output is also affected by the humidity, the recording medium used (ink jet medium) and the like, which may cause minute color variations.

In the present Embodiment B, variation in the colors that are output according to the environment can be suppressed by outputting as much black (a non-color) as possible, and outputting a light black in the images.

Embodiments C and D

Figure 4:
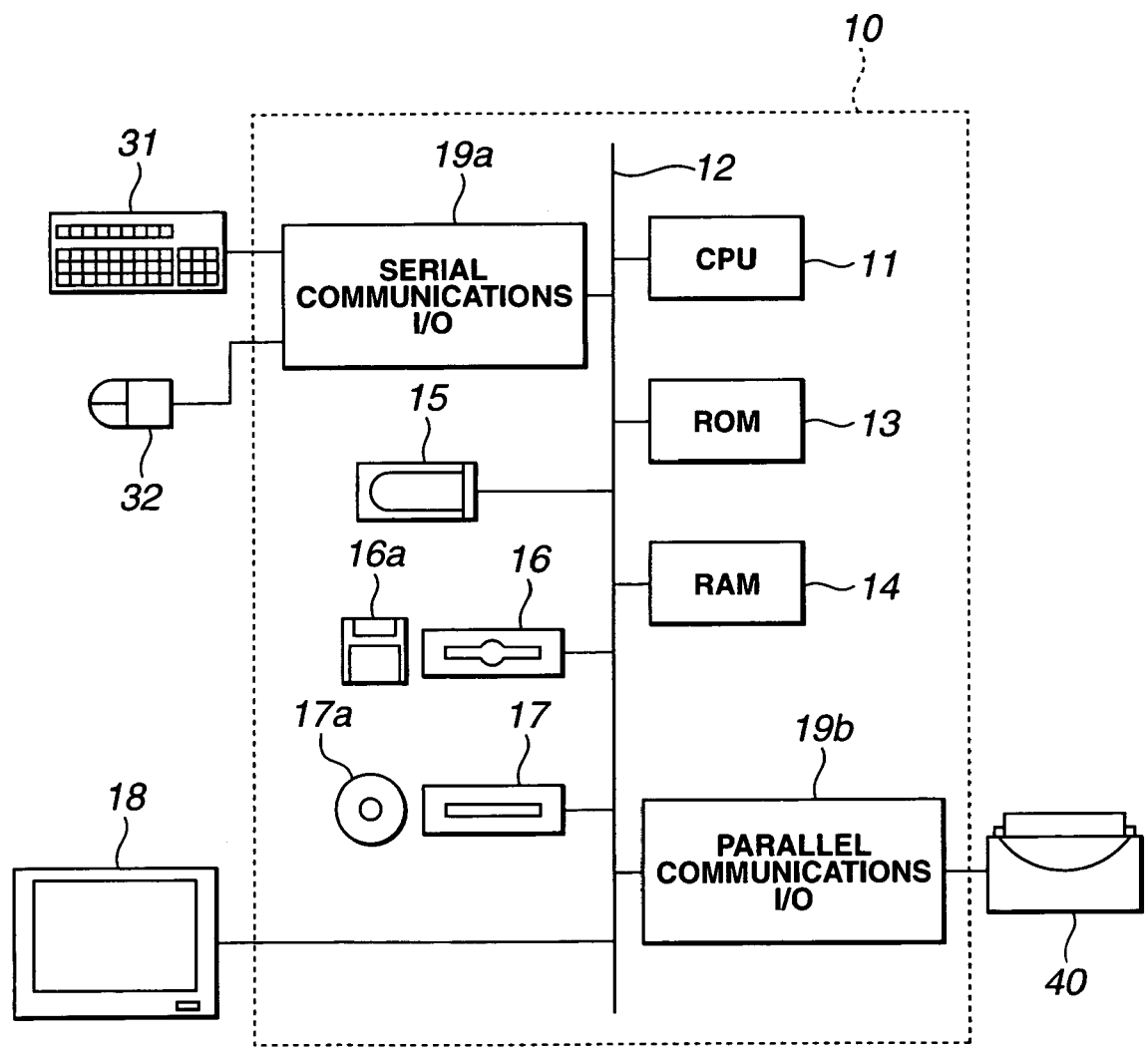
FIG. 4 is a diagram which shows the schematic hardware construction of the system constituting the printing apparatus.
Figure 5:
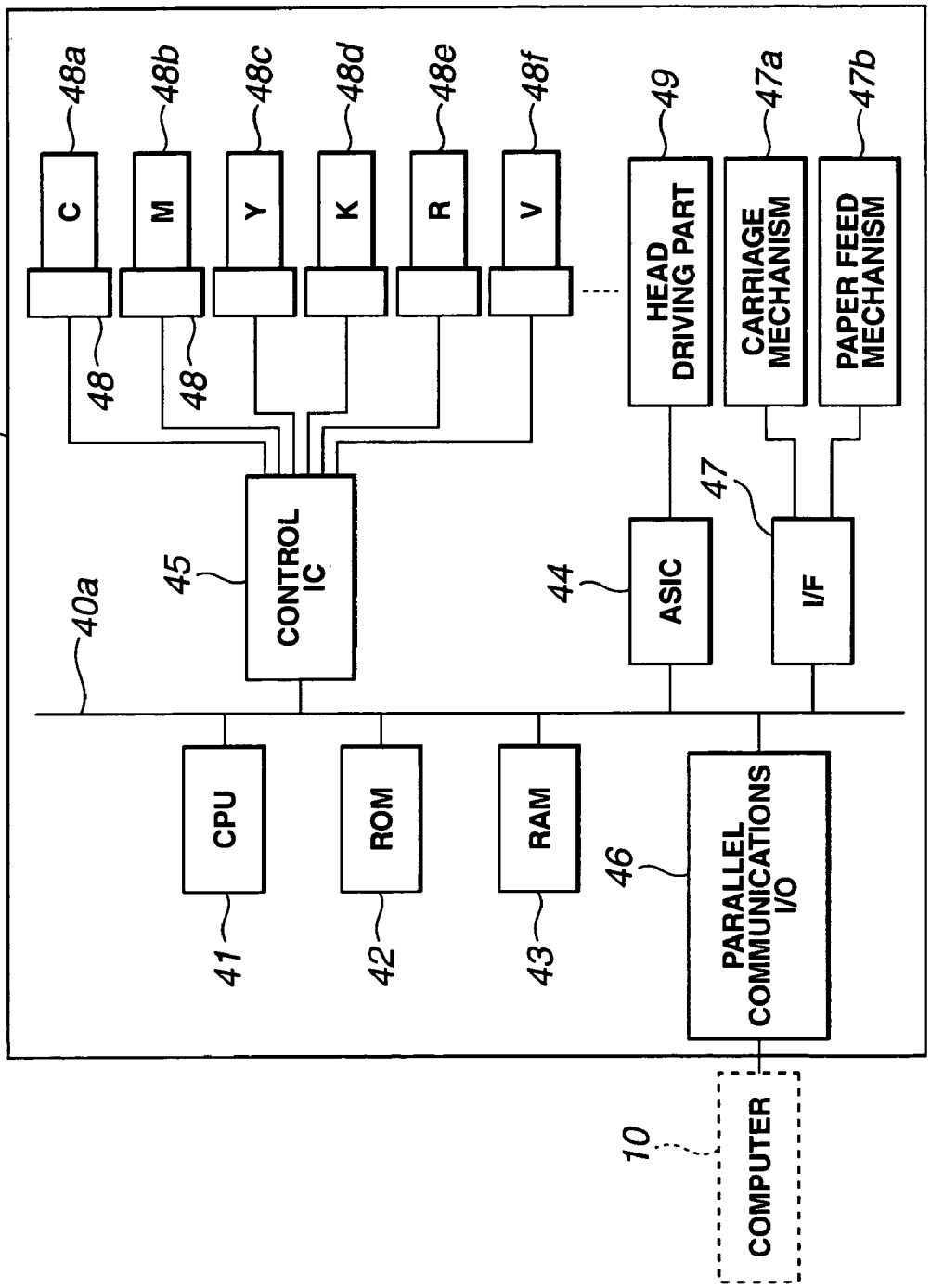
FIG. 5 is a diagram which shows the schematic hardware construction of the printer.
Figure 6:
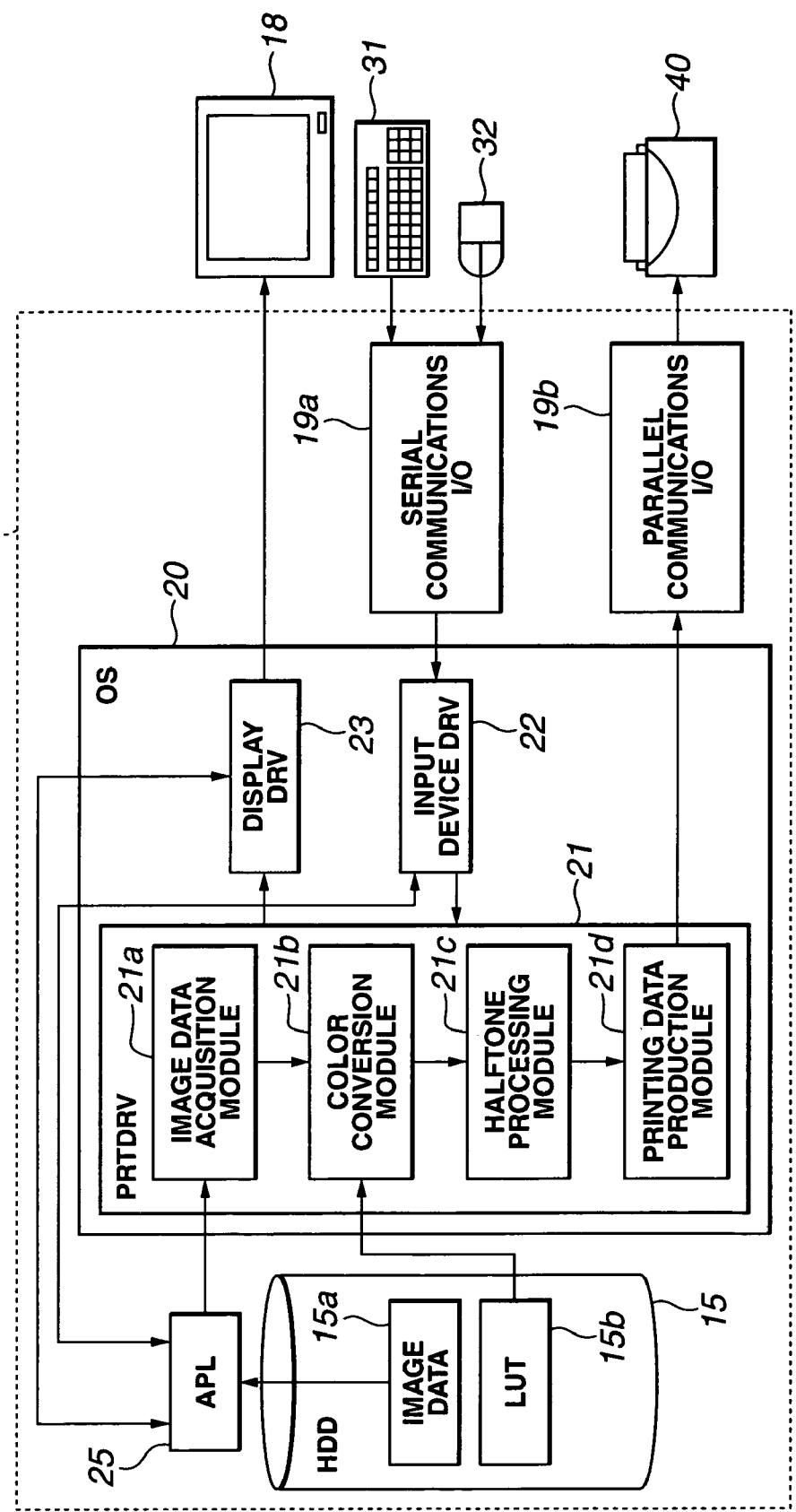
FIG. 6 is a schematic structural diagram of the main control system of the printing apparatus realized by a computer.

Here, the present Embodiments C and D will be described in the following order.
(1) Construction of the printing system using the ink sets of Embodiments C and D
(2) Printing processing
(3) Printing of images
(4) Light source dependence (metamerism)
(5) Summary (1) Construction of the Printing System Using the Ink Sets of Embodiments C and D:

FIG. 4 shows the schematic hardware construction of a printing system using the inks sets of the present Embodiments C and D. Furthermore, FIG. 5 shows the schematic hardware construction of the printer, and FIG. 6 is a schematic structural diagram of the main control system of the printing apparatus realized by means of a computer. In the figures, the computer 10 comprises a CPU 11, and this CPU 11 can access a ROM 13 and RAM 14 (in which the BIOS and the like are described) via a system bus 12.

Furthermore, a hard disk drive (HDD) 15, a flexible disk drive 16 and a CD-ROM drive 17 used as external memory devices are connected to the system bus 12, and an OS 20, application program (APL) 25 and the like stored in the HDD 15 are transferred to the RAM 14, so that the CPU 11 executes software by appropriately accessing the ROM 13 and RAM 14. Specifically, various programs are executed using the RAM 14 as a temporary work area.

Operating input devices such as a keyboard 31, mouse 32 and the like are connected to the computer 10 via a serial communications I/O 19a, and a display 18 used for display purposes is also connected via a video board not shown in the figures. Furthermore, a connection with the printer 40 is possible via a parallel communications I/O 19*b*. Moreover, the construction of the present computer 10 is shown in simplified terms; however, a computer having a common construction (as a personal computer) can be used. Of course, the computer in which the present Embodiments C and D are used is not limited to a personal computer. This embodiment is a so-called desktop type computer; however, a notebook type computer or a computer capable of mobile operation may also be used. Likewise the connection between the computer 10 and the printer 40 is not necessarily limited to the connection described above. Various types of connection functions such as a serial interface, an SCSI or USB connection or the like may also be used, and the same is true regarding any type of connection configuration that may be developed in the future.

In this example, various types of programs are stored in the HDD 15; however, the storage medium is not limited to this. For example, a flexible disk 16*a* or CD-ROM 17*a* may also be used. The programs recorded in these storage media are read into the computer 10 via the flexible disk drive 16 or CD-ROM drive 17, and are installed in the HDD 15. Furthermore, the computer is controlled by reading these programs into the RAM 14 via the HDD 15. Moreover, the recording medium is not limited to this; an optical-magnetic disk or the like may also be used. In regard to semiconductor devices, nonvolatile memories such as flash cards or the like may also be used, and in cases where an external file save is accessed and downloading is performed via a modem or communications circuit, the present Embodiments C and D are utilized with the communications circuit as a transfer medium.

Meanwhile, as is shown in FIG. 5, a CPU 41, ROM 42, RAM 43, ASIC 44, control IC 45, parallel communications I/O 46, interface (I/F) 47 (used to transmit image data, driving signals and the like) and the like are connected to a bus 40*a* installed inside the printer 40. Furthermore, the CPU 41 controls various parts according to programs written into the ROM 42 while utilizing the RAM 43 as a work area. The ASIC 44 is an IC that is customized in order to drive a printing head not shown in the figures; this ASIC 44 performs processing that is used to drive the printing head while exchanging specified signals with the CPU 41. Furthermore, this part outputs printing voltage data to the head driving part 49.

The head driving part 49 is a circuit comprising a dedicated IC, driving transistors and the like. This same head driving part 49 produces a printing voltage pattern in the piezoelectric elements contained in the printing head on the basis of the printing voltage data that is input from the ASIC 44. In regard to the ink sets of the present Embodiments C and D, cartridge holders 48 that can mount ink cartridges 48*a* through 48*f* filled with pigment type inks of six colors are connected to the printing head via tubes for each ink, so that the printing head is supplied with the respective inks.

Furthermore, ink is discharged by the driving of piezoelectric elements in ink compartments that communicate between the tubes and discharge ports. Furthermore, in the present embodiment, a construction in which all-purpose CMYK inks and RV inks are used is employed. Moreover, the effect of the present Embodiments C and D is more conspicuously manifested in the case of pigment type inks; however, dye type inks may also be used.

Six sets of nozzle rows that discharge the respective inks of six colors are formed so that these nozzles are lined up in the main scan direction of the printing head on the ink discharge surface of the printing head. In each of the nozzle rows, a plurality of nozzles (e. g., 48 nozzles) are disposed at fixed intervals in the sub-scan direction.

The cartridge holders 48 comprise ink supply needles, and these ink supply needles form ink supply passages by contacting ink supply ports (not shown in the figures) formed in the ink cartridges 48*a* through 48*f*, so that the inks inside the ink cartridges are supplied to the printing head via tubes. The control IC 45 is an IC that is mounted in order to control cartridge memories constituting nonvolatile memories that are mount in the respective ink cartridges 48*a* through 48*f*. The apparatus is devised so that when the ink cartridges are mounted in the cartridge holders 48, the cartridge memories are electrically connected to the control IC 45. The CPU 41 exchanges specified signals with the control IC 45, and performs the read-out of information concerning colors and residual amounts of inks stored in the cartridge memories, alteration of information concerning the residual amounts of inks and the like.

The parallel communications I/O 46 is connected with the parallel communications I/O 19*b* of the computer 10, and the printer 40 receives information that is transmitted from the computer 10, e. g., printing jobs comprising data designating CMYKRV dot formation densities, page description language and the like, via the parallel communications I/O 46. Furthermore, when various types of requests are received from the computer 10, the communications I/O outputs information indicating the ink colors and mounting conditions from the control IC 45 to the computer 10. A carriage mechanism 47*a* and paper feed mechanism 47*b* are connected to the I/F 47. The paper feed mechanism 47*b* comprises a paper feed motor, paper feed rollers and the like, and performs a sub-scan by successively feeding a printing recording medium such as printing paper or the like. The carriage mechanism 47*a* comprises a carriage on which the printing head is mounted, a carriage motor which causes this carriage to move via a timing belt and the like, and causes the printing head to perform a main scan. In the printing head in which a plurality of nozzles are disposed in the sub-scan direction, the piezoelectric elements are driven by driving signals output by the head driving part 49 on the basis of head data comprising rows of bits, so that ink droplets are discharged from the respective nozzles in dot units.

This printer 40 performs printing under the control of a printer driver installed in the computer 10. In the computer 10 of the present embodiment, as is shown in FIG. 6, a printer driver (PRTDRV) 21, an input device driver (DRV) 22 and a display driver (DRV) 23 are built into the OS 20. The display DRV 23 is a driver which controls the display of image data and the like in the display 18, and the input device DRV 22 is a driver which receives code signals from the abovementioned keyboard 31 or mouse 32 that are input via the serial communications I/O 19*a*, and thus receives various input operations. The APL 25 is an application program that allows the execution of color image retouching and the like; the user can cause these color images to be printed by the printer 40 by operating the abovementioned operating input devices while this APL 25 is executed. Specifically, the APL 25 reads out the image data 15*a* recorded in the HDD 15 according to the instructions of the user to the RAM 14, and causes images based on this image data 15*a* to be displayed on the display 18 via the display DRV 23. When the user operates the abovementioned input devices, the content of the operations is acquired via the input device DRV 22, and this content is interpreted; the APL 25 performs various types of processing such as printing instructions, retouching and the like in accordance with this operation content.

When printing instructions are issued by the APL 25, the abovementioned PRTDRV 21 is driven, and the PRTDRV 21 feeds out data to the display DRV 23, so that UI (not shown in the figures) used to input information required for printing is displayed. Using this UI (not shown in the figures), the user can set various parameters such as the number of printing parts, number of pages and the like, and the PRTDRV 21 receives these parameters via the input device DRV 22. When the PRTDRV 21 receives these parameters, printing data is prepared while the abovementioned image data 15$a$ designating colors by sRGB is color-converted into respective CMYKRV color data with reference to an LUT 15$b$ (described later), and printing is performed by sending out this printing data to the abovementioned printer 40.

Figure 7:
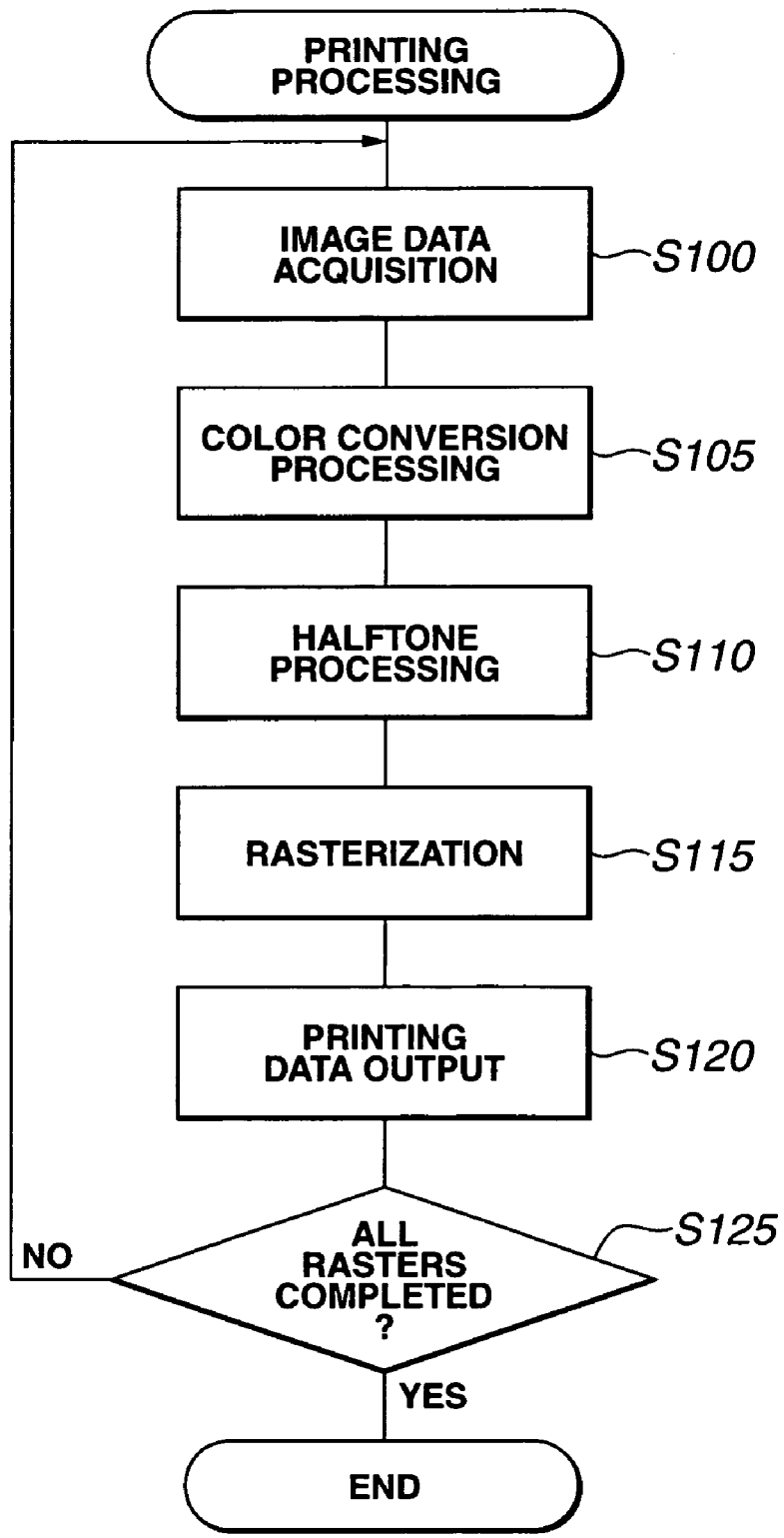
FIG. 7 is a flow chart of the printing processing.

(2) Printing Processing:

In the present embodiment, the abovementioned PRTDRV 21 causes the printer 40 to perform printing while performing a color conversion using the LUT 15$b$. In order to perform printing, this PRTDRV 21 comprises the image data acquisition module 21$a$, color conversion module 21$b$, halftone processing module 21$c$ and printing data production module 21$d$ shown in FIG. 6. When the user gives instructions for printing to be executed by the PRTDRV 21 using the abovementioned APL 25, printing processing is executed according to the flow chart shown in FIG. 7. When printing processing is initiated, the abovementioned image data acquisition module 21$a$ acquires the image data 15$a$ stored in the abovementioned RAM 14 in step S100.

Then, the image data acquisition module 21$a$ starts the abovementioned color conversion module 21$b$ in step S105. The color conversion module 21$b$ is a module that converts RGB halftone values into CMYKRV halftone values; this color conversion module 21$b$ converts the respective dot data of the abovementioned image data 15$a$ into CMYKRV dot data in the same step S105. When CMYKRV halftone data is produced as a result of such a color conversion being performed by the color conversion module 21$b$, the abovementioned halftone processing module 21$c$ is started by the same color conversion module 21$b$ in step S110, and the CMYKRV halftone data is transferred to the abovementioned halftone processing module 21$c$.

The halftone processing module 21$c$ is a module which performs halftone processing that is used to convert the CMYKRV halftone values of the respective dots and express these values as the recording density of ink droplets; in the same step S110, this halftone processing module 21$c$ produces head driving data that is used to cause ink to adhere [to the recording medium] at the recording density obtained following conversion. The printing data production module 21$d$ receives this head driving data, and rearranges the data into the order used by the printer 40 in step S115. Specifically, a discharge nozzle array (not shown in the figures) used as an ink discharge device is mounted in the printer 40, and a plurality of nozzles are lined up in the sub-scan direction in this nozzle array; accordingly, data separated into a number of dots in the sub-scan direction is simultaneously used.

Then, the printing data production module 21$d$ performs a rasterization that rearranges the order so that the data that is to be simultaneously used (among the data that is lined up in the main scan direction) is simultaneously buffered by the printer 40. Following this rasterization, printing data is produced by adding specified information such as the image resolution and the like, and the printing data production module 21$d$ outputs this data to the printer 40 via the abovementioned parallel communications I/O 19$b$ in step S120. In the printer 40, the images displayed on the abovementioned display 18 are printed on the basis of this printing data. In this printer 40, inks of respective CMYKRV colors are caused to adhere to the printing medium on the basis of CMYKRV halftone data as described above. The abovementioned processing is executed for all rasters (step S125).

Here, the abovementioned LUT 15$b$ is a table in which sRGB data and CMYKRV data are caused to correspond; in step S105, a correspondence is established between arbitrary RGB halftone values and CMYKRV halftone values by performing interpolation calculations on the basis of these reference points; here, various universally known techniques may be used as the method of interpolation calculations. For example, linear interpolation calculations, spline interpolation calculations or the like may be used. Furthermore, the system may also be constructed so that the reference points provided in the LUT 15$b$ are developed into a larger number of reference points by interpolation calculations, and so that the developed reference points are buffered in the RAM 14, and further interpolation calculations are performed with reference to the reference points inside this RAM 14. Of course, besides a construction in which color conversion is performed using a color conversion table, it would also be possible to perform color conversion using a profile or the like in which a color conversion matrix is defined beforehand.

(3) Printing of Images:

Next, the operation that is performed when images are printed in the abovementioned construction will be described with reference to the operating schematic diagram shown in FIG. 8. In this figure, the display screen of the display 18 shows the abovementioned APL 25 execution screen; when image data 15$a$ is read out by the APL 25, this image data 15$a$ is stored in the RAM 14, and an image A is displayed on the display 18 on the basis of the image data 15$a$ by the processing of the display DRV 23. Since the effect of the present Embodiments C and D is especially conspicuous in the case of low-saturation substantially colorless images, an image A which has a dark background and contains considerable substantially colorless areas will be described as an example. In the APL 25, various types of retouching and the like can be performed on the image A displayed on the display 18, and printing execution instructions for this image A can be issued. The execution screen in the same figures is a screen in a state in which printing execution instructions are issued by reading out image data 15$a$ stored in the HDD 15; printing execution instructions can be issued by selecting the printing tab in the file menu by operating the mouse 32.

Ideally, in the substantially colorless areas contained in the image A, the spectroscopic reflectance for all wavelengths of visible light is substantially constant; however, variations in coloring that occur in substantially colorless areas are easily recognized by the human eye, and if wavelength regions in which the spectroscopic reflectance is not constant are present, variations in the energy of the reflected light become more prominent when the light source varies so that energy at specified wavelengths becomes stronger, thus resulting in a tinge of a specified color (so-called metamerism). However, if the combination of the spectroscopic reflectance values of the CMY inks is appropriately adjusted, the spectroscopic reflectance of substantially colorless areas can be made constant over all wavelengths of visible light, i. e., can be caused to approach a substantially flat value, so that the system becomes less susceptible to the effects of variations in the light source.

In the present embodiment, sRGB data is converted into CMYKRV data by the LUT15$b$, and ink cartridges 48$a$ through 48$f$ filled with CMYKRV inks are mounted in the printer 40. Furthermore, by mounting an M ink (described later) having a spectroscopic reflectance of a specified nature with respect to variations in the spectroscopic reflectance values of the C and Y inks in the [M] ink cartridge, an effect is obtained which is such that regardless of whether the image B obtained by printing in the printer 40 is viewed under the light source C (indoor lighting) or light source D (sunlight), there is little variation in color according to the light source, and no color tinge is generated in the substantially colorless areas.

(4) Reduction of Light Source Dependence (Metamerism):

Below, the device whereby the light source dependence of color is reduced using such a construction in the present embodiment will be described. First, the manner in which colors are viewed by the human eye will be described. FIG. 9 is an explanatory diagram illustrating the manner in which colors are viewed in the human eye. Since the human eye distinguishes differences in color according to the wavelength of light, the manner of viewing colors can be regulated by regulating how the human eye reacts to certain wavelengths of light.

The wavelengths of light that are incident on the human eye from printed matter are regulated by the distribution of wavelengths contained in the light source, i. e., the spectroscopic distribution $L(\lambda)$ of the light source, and the distribution of wavelengths contained in the reflected light that is reflected from the printed matter, i. e., the spectroscopic reflectance $R(\lambda)$ of the printed matter. The reaction of the human eye to wavelengths of light is regulated by the isochromatic functions $x(\lambda)$, $y(\lambda)$, $z(\lambda)$. Here, $x(\lambda)$ indicates the sensitivity to the red component, $y(\lambda)$ indicates the sensitivity to the green component, and $z(\lambda)$ indicates the sensitivity to the blue component. Furthermore, the respective isochromatic functions are ordinarily indicated as x bar and the like by adding a "horizontal line" above the letter of the function; in the present specification, however, the "horizontal line" is omitted for the sake of simplicity. Furthermore, in an ink jet printer such as the printer 40 in the present embodiment, the spectroscopic reflectance $R(\lambda)$ is produced by superimposing the spectroscopic reflectance of the printing paper in the portions where the printing paper is exposed and the spectroscopic reflectance of the ink (linear coupling with the area ratio as a coefficient).

In these formulae, the abovementioned $\lambda$ is the wavelength of the light.

The manner of viewing colors is calculated as three stimulus values XYZ is calculated by multiplying the abovementioned spectroscopic distribution $L(\lambda)$ of the light source, spectroscopic reflectance $R(\lambda)$ and isochromatic functions $x(\lambda)$, $y(\lambda)$ and $z(\lambda)$, and integrating this product by the wavelength. Specifically, the three stimulus values XYZ are calculated by the following Equation (1).

$$X=\int L(\lambda)R(\lambda)x(\lambda)d\lambda$$

$$Y=\int L(\lambda)R(\lambda)y(\lambda)d\lambda \quad (1)$$

$$Z=\int L(\lambda)R(\lambda)z(\lambda)d\lambda$$

The manner in which colors are viewed by the human eye is regulated by these three stimulus values XYZ. Specifically, colors are definitively determined by combinations of the three stimulus values XYZ. Among the factors that determine these three stimulus values, the abovementioned isochromatic functions $x(\lambda)$, $y(\lambda)$ and $z(\lambda)$ are mean values of characteristics of the human eye, and cannot be artificially varied, while the abovementioned spectroscopic distribution $L(\lambda)$ of the light source naturally fluctuates according to variations in the light source. The present Embodiments C and D that reduce light source dependence are embodiments that take countermeasures when this spectroscopic distribution $L(\lambda)$ of the light source fluctuates. Among the factors that determine the three stimulus values, the major portion of the abovementioned spectroscopic reflectance $R(\lambda)$ depends on the spectroscopic reflectance of the inks; accordingly, this spectroscopic reflectance can be artificially varied by varying the amounts of the inks and the number of colors of inks. Therefore, the present embodiments C and D employ an M ink which has specified properties with respect to the spectroscopic reflectance characteristics of the C and Y inks in order to convert this spectroscopic reflectance $R(\lambda)$ into a desirable distribution.

The device used to reduce the light source dependence by employing such an M ink will be described below. Colorless areas in which the effect of the present Embodiments C and D is most conspicuously manifested will be described as an example. FIG. 10 shows the spectroscopic reflectance values of the CMY inks used in the present embodiment (C ink: curve connected by O, M ink: curve connected by solid triangles, Y ink: curve connected by Δ, and the spectroscopic reflectance values of the colorless gray (curve connected by solid diamonds) formed by mixing these CMY inks. In the same figures, the vertical axis indicates the spectroscopic reflectance (%), and the horizontal axis indicates the wavelength (nm). The spectroscopic reflectance values of these C and Y inks have characteristics similar to those in a conventional printer. As is shown in the same figure, the spectroscopic reflectance of the C ink rises with an increase in wavelength from a wavelength of 400 nm, trends at approximately 85% at wavelengths of approximately 450 nm to 500 nm, drops with an increase in wavelength from approximately 500 nm to 600 nm, and trends between 20% and 30% at wavelengths of 600 nm to 700 nm.

The spectroscopic reflectance of the Y ink rises abruptly with an increase in wavelength from a wavelength of approximately 450 nm, and trends at approximately 85% at wavelengths of 500 nm to 700 nm. Here, the spectroscopic reflectance of the C ink and the spectroscopic reflectance of the Y ink cross at a wavelength that is biased toward 500 nm from the intermediate point between 500 nm and 550 nm. Furthermore, the spectroscopic reflectance of the M ink first rises with an increase in the wavelength from a wavelength of 400 nm, then reaches a maximum and drops between wavelengths of 400 nm and 450 nm, and forms a curve with a downward protruding shape between wavelengths of 450 nm and 550 nm. This spectroscopic reflectance then rises with an increase in wavelength from wavelengths beyond 550 nm, and trends at approximately 80% at wavelengths of 600 nm or greater. In cases where a substantially colorless area is formed by these CMY inks, all of these CMY inks are discharged onto the printing paper.

Here, the characterizing features of the shape of the spectroscopic reflectance of the M ink in the present embodiments described above will be described.

Characterizing Features of Embodiment C:

(1) The embodiment has characteristics which are such that the spectroscopic reflectance is 0.4 or less at least at the wavelength where the spectroscopic reflectance of the Y ink and the spectroscopic reflectance of the C ink intersect.

(2) The embodiment has characteristics which are such that a wavelength region in which the spectroscopic reflectance is 0.4 or less is formed in at least the range extending from the wavelength where the spectroscopic reflectance values of the C and Y inks intersect to a wavelength of 550 nm.

Characterizing Features of Embodiment D:

(1) The embodiment has characteristics which are such that at the wavelength where the spectroscopic reflectance values of the C and Y inks intersect, the spectroscopic reflectance values of the C and Y inks at the same wavelength are 0.4 or less.

(2) The embodiment has characteristics which are such that a wavelength region in which the spectroscopic reflectance is 0.4 or less relative to the spectroscopic reflectance value of the Y ink is formed in at least the range extending from the wavelength where the spectroscopic reflectance values of the C and Y inks intersect to a wavelength of 550 nm.

"Gray" in FIG. 10 indicates the superimposed spectroscopic reflectance $R(\lambda)$ in a case where all of the CMY inks that form such spectroscopic reflectance curves are discharged onto the printing paper. This colorless spectroscopic reflectance $R(\lambda)$ is ideally constant over all wavelengths, i. e., is ideal as the gray in FIG. 10 approaches a straight line that is parallel to the horizontal axis. In the present embodiment, irregularities in the colorless spectroscopic reflectance $R(\lambda)$ can be reduced by using an M ink that has the spectroscopic reflectance described above, so that this spectroscopic reflectance $R(\lambda)$ can be caused to approach more closely to a substantially flat curve.

Here, examples of the ink compositions of the CMYKRV inks used in the present embodiments (applicable to both Embodiments C and D) are shown in FIG. 11. In the same figure, the C ink uses "C. I. pigment blue 15:3" as a coloring material, and has a construction comprising 0.5 wt % styrene-acrylic acid copolymer, 15 wt % glycerol, 5 wt % ethylene glycol, 2 wt % 2-pyrrolidone, 5 wt % 1,2-hexanediol, and 0.5 wt % Olfin E1010. The balance in wt % is ion exchange water. The amount of coloring material is 1.5 wt %. The Y ink uses "C. I. pigment yellow 74" as a coloring material, and has a construction comprising 1 wt % styrene-acrylic acid copolymer, 15 wt % glycerol, 5 wt % ethylene glycol, 2 wt % 2-pyrrolidone, 5 wt % 1,2-hexanediol, and 0.5 wt % Olfin E1010. The balance in wt % is ion exchange water. The amount of coloring material is 3 wt %.

The K ink uses "C. I. pigment black 7" as a coloring material, and has a construction comprising 1.5 wt % styrene-acrylic acid copolymer, 15 wt % glycerol, 5 wt % ethylene glycol, 2 wt % 2-pyrrolidone, 5 wt % 1,2-hexanediol, and 0.5 wt % Olfin E1010. The balance in wt % is ion exchange water. The amount of coloring material is 1.5 wt %. The R ink uses "C. I. pigment red 178" as a coloring material, and has a construction comprising 0.7 wt % styrene-acrylic acid copolymer, 15 wt % glycerol, 5 wt % ethylene glycol, 2 wt % 2-pyrrolidone, 5 wt % 1,2-hexanediol, and 0.5 wt % Olfin E1010. The balance in wt % is ion exchange water. The amount of coloring material is 2 wt %.

The V ink uses "C. I. pigment violet 23" as a coloring material, and has a construction comprising 0.7 wt % styrene-acrylic acid copolymer, 15 wt % glycerol, 5 wt % ethylene glycol, 2 wt % 2-pyrrolidone, 5 wt % 1,2-hexanediol, and 0.5 wt % Olfin E1010. The balance in wt % is ion exchange water. The amount of coloring material is 2 wt %. Furthermore, the M ink used in the present embodiment uses "C. I. pigment violet 19" as a coloring material, and has a construction comprising 0.7 wt % styrene-acrylic acid copolymer, 15 wt % glycerol, 5 wt % ethylene glycol, 2 wt % 2-pyrrolidone, 5 wt % 1,2-hexanediol, and 0.5 wt % Olfin E1010. The balance in wt % is ion exchange water.

The amount of coloring material in the M ink is 2 wt %. Conventionally, on the other hand, an M ink has been employed in which the coloring material is "C. I. pigment red 202", and the ink has a construction comprising 0.5 wt % styrene-acrylic acid copolymer, 15 wt % glycerol, 5 wt % ethylene glycol, 2 wt % 2-pyrrolidone, 5 wt % 1,2-hexanediol, and 0.5 wt % Olfin E1010, with the balance in wt % being ion exchange water and the amount of coloring material being set at 1.5 wt %.

Other desirable M ink compositions that can be used in the present embodiments are shown below.

(1) A composition containing one or more high-boiling-point compounds selected from among polyhydric alcohol type compounds and saccharides at the rate of 5% or greater.

(2) A composition containing one or more polar solvents selected from among glycol ether type compounds and alkyldiol type compounds at the rate of 1% or greater.

(3) A composition containing one or more surfactants selected from among acetylene glycol type compounds and acetylene alcohol type compounds at the rate of 0.1% or greater.

(4) A composition containing one or more high-boiling-point compounds selected from among polyhydric alcohol type compounds and saccharides at the rate of 5% or greater, one or more polar solvents selected from among glycol ether type compounds and alkyldiol type compounds at the rate of 1% or greater, and one or more surfactants selected from among acetylene glycol type compounds and acetylene alcohol type compounds at the rate of 0.1% or greater.

(5) A composition containing a resin at the rate of 0.1% or greater.

Figure 12:
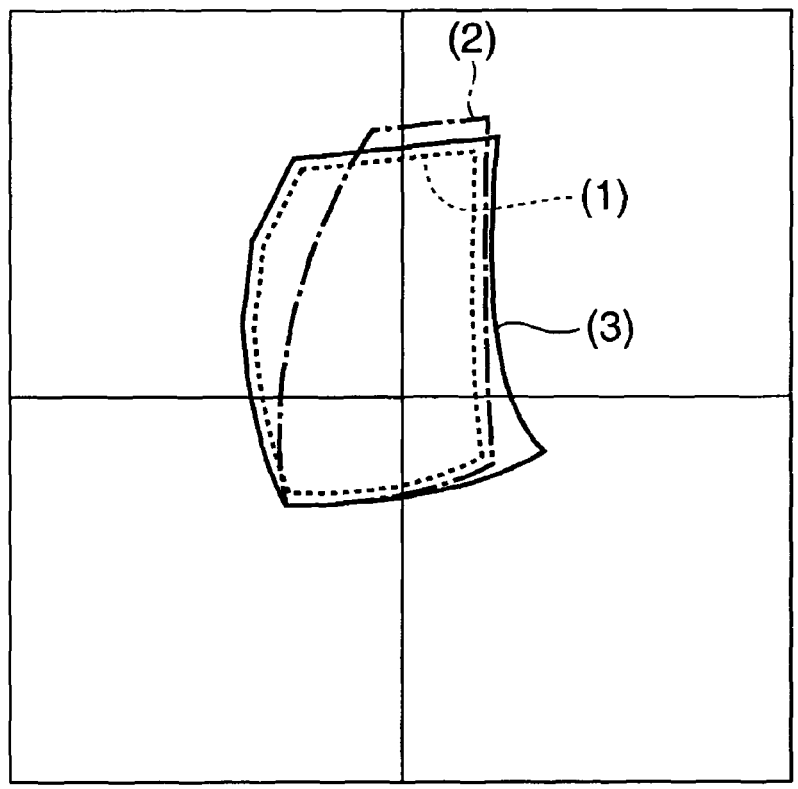
FIG. 12 is a diagram which shows the region of color reproduction in the vicinity of $L^*=70$.
Figure 13:
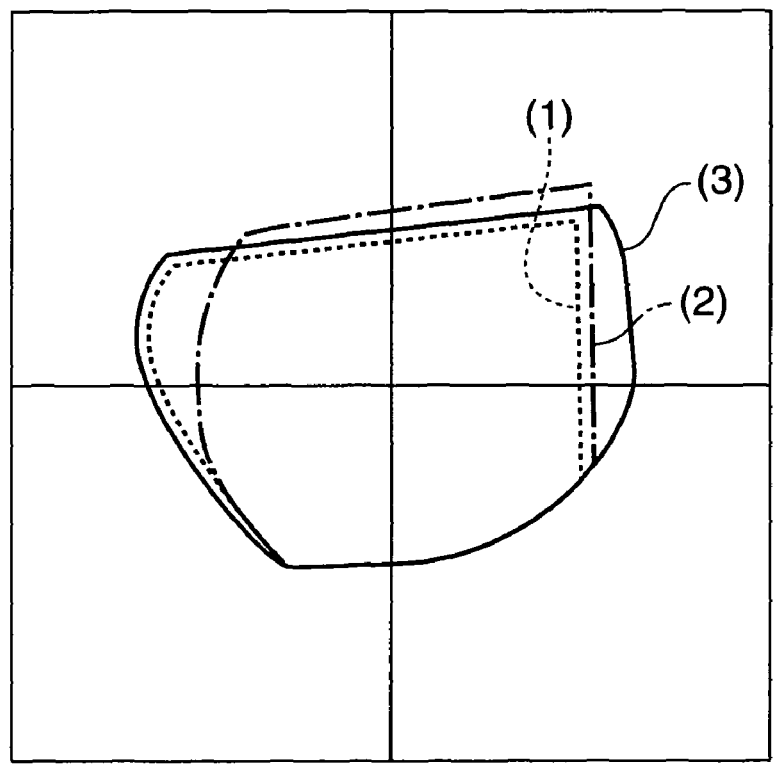
FIG. 13 is a diagram which shows the region of color reproduction in the vicinity of $L^*=50$.

Here, the color reproduction regions of the ink sets of the present Embodiments C and D are shown in FIGS. 12 and 13.

In the figures, the upward direction is the Y direction, the leftward direction is the G direction, and the rightward direction is the R direction. Furthermore, the color reproduction region indicated by the dotted line is the color reproduction region of a conventional ink set of CMY inks, and the color reproduction region indicated by the one-dot chain line is the color reproduction region of an ink set of CMY inks using a Y ink that has an effect in reducing metamerism. Moreover, the color reproduction region indicated by the solid line is the color reproduction region of the ink sets of CMY inks in the present Embodiments C and D. Thus, in the case of the ink set of CMY inks using a Y ink that has an effect in reducing metamerism, the color reproduction region in the G direction is conspicuously narrowed (it can be seen that although the region is broadened with respect to the Y direction, the region as a whole is narrow).

On the other hand, in the case of the ink sets of CMY inks in the present Embodiments C and D, the color reproduction region is broad in the G and Y directions and in the R direction, as in the conventional ink set of CMY inks.

Accordingly, it can be seen that the color reproduction region is broadened on the whole compared to the color reproduction region of the abovementioned ink set of CMY inks using a Y ink that has an effect in reducing metamerism. Moreover, the color reproduction region in the R direction is broader than that in the conventional ink set of CMY inks. Specifically, the ink set of CMY inks provided by the present invention can broaden the color reproduction region compared to that of a conventional ink set of CMY inks, in addition to reducing metamerism. In this case, it is seen that the color reproduction region in the GY direction is especially broadened at a high lightness such as L*=70. G at this lightness is an important color for reproducing the colors of grass and new foliage; the ink sets of the present Embodiments C and D are also very superior in terms of allowing the accurate reproduction of this important color in particular. Thus, particularly as a result of using an M ink formed by a novel composition, the ink sets of CMY inks in the present Embodiments C and D can reduce the light source dependence of substantially colorless areas, and also make it possible to obtain the effect of allowing an expansion of the color reproduction region.

Here, in the present embodiments, in cases where a printer 40 with a detachable ink set is used, there may be cases in which printing is performed with the abovementioned ink set having a conventional reproduction region mounted, and cases in which printing is performed with the ink set having the color reproduction region of the present invention mounted. In such cases, it is desirable that it be possible to alter the LUT 15b used in the color conversion processing performed by the color conversion module 21b in accordance with the color reproduction region of the ink set mounted in the printer 40.

Accordingly, an LUT which is desirable for use in color conversion in cases where a conventional ink set is mounted in the printer 40, and an LUT which is desirable for use in cases where the ink set of the present Embodiment C or D is mounted in the printer 40, are prepared as LUTs 15b.

Figure 14:
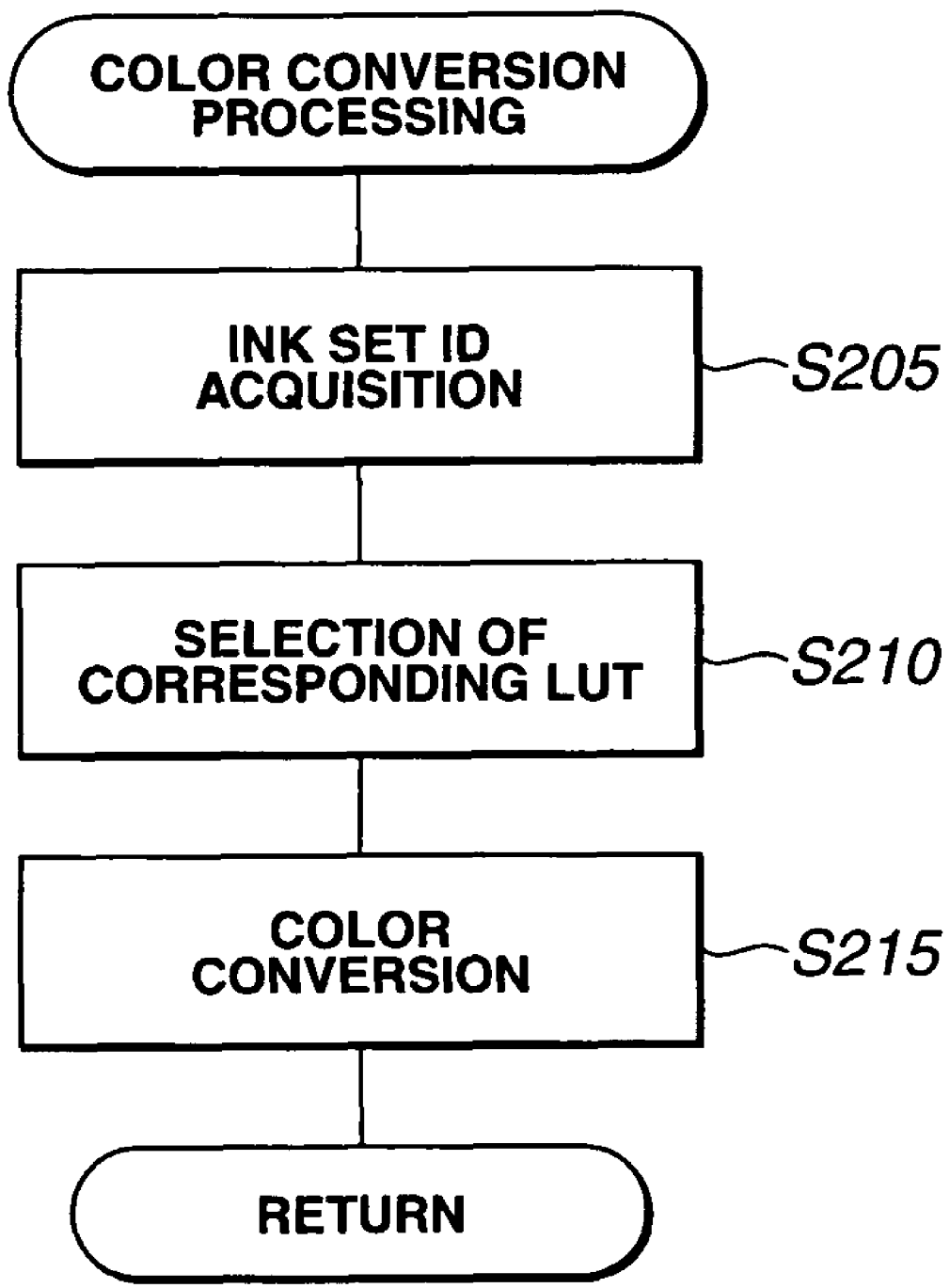
FIG. 14 is a flow chart which shows the processing content of the color conversion processing.

Furthermore, in such cases, it is advisable to devise the system so that an ID that indicates the type of the ink set (type allowing differences in the color reproduction region to be distinguished) is incorporated into the status that can be transmitted and received by two-way communications between the printer 40 and the PRTDRV 21, and so that the PRTDRV 21 acquires this status from the side of the printer 40 at the time of printing, and alters the LUT 15b used in color conversion. Here, a schematic flow chart of the color conversion processing that is performed by the color conversion module 21b in a case where this method is used is shown in FIG. 14.

In the same figure, the status is acquired by two-way communications with the printer 40, and the ID of the ink set stored in the printer 40 is acquired (step S205). Then, on the basis of this ID, the optimal LUT is selected (step S210), and a color conversion from sRGB data to CMYKRV data is performed using this selected LUT (step S215). As result, color conversion processing suited to the color reproduction characteristics of the ink set can be performed. In the abovementioned embodiment, a construction was described in which the LUT used in color conversion processing was switched on the basis of two ink sets. However, the present invention is of course not limited to such a construction; it goes without saying that it would also be possible to devise the system so that the LUT used for appropriate color conversion is switched based on the ID for two or more ink sets.

(5) Summary:

Thus, by constructing the spectroscopic reflectance characteristics of the M ink so that the spectroscopic reflectance of this ink is 0.4 or less at least at the wavelength at which the spectroscopic reflectance of the Y ink and the spectroscopic reflectance of the C ink intersect (Embodiment C), or by constructing these characteristics so that the spectroscopic reflectance of this ink is 0.4 or less relative to the spectroscopic reflectance values of the Y ink and C ink at least at the wavelength at which the spectroscopic distributions of the Y ink and C ink intersect (Embodiment D), it is possible to make the gray spectroscopic reflectance characteristics substantially flat throughout the entire visible wavelength region, so that the light source dependence (metamerism) of this gray can be reduced.

Embodiment E

The present invention can also provide an ink set in which both halftone properties of the recorded images and a suppression of graininess are achieved, e. g., an ink set comprising a yellow ink (Y), magenta ink (M), light magenta ink (Lm), cyan ink (C), light cyan ink (Lc), two types of black inks (K) (high-concentration black inks) and two types of light black inks (Lk) (medium-concentration black ink and low-concentration black ink)(this invention is referred to as Embodiment E hereinbelow).

A concrete example of the ink set of the present Embodiment E is as follows:

-Y ink:

| | |
|---|---|
| C.I. pigment yellow 74 | 5.0 wt % |
| Dispersing agent (styrene - acrylic acid copolymer) | 1.5 wt % |
| Glycerol | 16.0 wt % |
| 1,2-Hexanediol | 5.0 wt % |
| Triethanolamine | 0.9 wt % |
| BYK348 | 0.5 wt % |
| Ion exchange water | balance |
| total | 100.0 wt % |

-M ink:

| | |
|---|---|
| C.I. pigment violet 19 | 6.0 wt % |
| Dispersing agent (styrene - acrylic acid copolymer) | 1.8 wt % |
| Glycerol | 10.0 wt % |
| 1,2-Hexanediol | 5.0 wt % |
| Triethanolamine | 0.9 wt % |
| BYK348 | 0.5 wt % |
| Ion exchange water | balance |
| total | 100.0 wt % |

-Lm ink:

| | |
|---|---|
| C.I. pigment violet 19 | 1.0 wt % |
| Dispersing agent (styrene - acrylic acid copolymer) | 0.3 wt % |
| Glycerol | 26.0 wt % |
| 1,2-Hexanediol | 5.0 wt % |
| Triethanolamine | 0.9 wt % |
| BYK348 | 0.5 wt % |
| Ion exchange water | balance |
| total | 100.0 wt % |

-C ink:

| | |
|---|---|
| C.I. pigment blue 15:3 | 4.0 wt % |
| Dispersing agent (styrene - acrylic acid copolymer) | 1.2 wt % |
| Glycerol | 11.0 wt % |
| 1,2-Hexanediol | 5.0 wt % |
| Triethanolamine | 0.9 wt % |
| BYK348 | 0.5 wt % |
| Ion exchange water | balance |
| total | 100.0 wt % |

-Lc ink:

| | |
|---|---|
| C.I. pigment blue 15:3 | 1.0 wt % |
| Dispersing agent (styrene - acrylic acid copolymer) | 0.3 wt % |
| Glycerol | 24.0 wt % |
| 1,2-Hexanediol | 5.0 wt % |
| Triethanolamine | 0.9 wt % |
| BYK348 | 0.5 wt % |
| Ion exchange water | balance |
| total | 100.0 wt % |

-K ink (MK: matte black ink):

| | |
|---|---|
| Carbon black | 6.0 wt % |
| Glycerol | 12.0 wt % |
| 1,2-Hexanediol | 5.0 wt % |
| Triethanolamine | 0.9 wt % |
| BYK348 | 1.0 wt % |
| Ion exchange water | balance |
| total | 100.0 wt % |

-K ink (PK: photo black ink):

| | |
|---|---|
| Carbon black | 1.5 wt % |
| Dispersing agent (styrene - acrylic acid copolymer) | 1.5 wt % |
| Glycerol | 20.0 wt % |

-continued

| | |
|---|---|
| 1,2-Hexanediol | 5.0 wt % |
| Triethanolamine | 0.9 wt % |
| BYK348 | 0.5 wt % |
| Ion exchange water | balance |
| total | 100.0 wt % |

-Lk ink (medium-concentration black ink):

| | |
|---|---|
| Carbon black | 0.76 wt % |
| Dispersing agent (styrene - acrylic acid copolymer) | 0.76 wt % |
| Glycerol | 22.0 wt % |
| 1,2-Hexanediol | 5.0 wt % |
| Triethanolamine | 0.9 wt % |
| BYK348 | 0.5 wt % |
| Ion exchange water | balance |
| total | 100.0 wt % |

-Lk ink (low-concentration black ink):

| | |
|---|---|
| Carbon black | 0.24 wt % |
| Dispersing agent (styrene - acrylic acid copolymer) | 0.24 wt % |
| Glycerol | 22.0 wt % |
| 1,2-Hexanediol | 5.0 wt % |
| Triethanolamine | 0.9 wt % |
| BYK348 | 0.5 wt % |
| Ion exchange water | balance |
| total | 100.0 wt % |

Such an ink set of Embodiment E can improve the halftone properties and effect in suppressing graininess even further than an ink set that comprises special color inks such as a red ink, violet ink or the like in addition to YMC inks.

In the ink set of the present Embodiment E, C. I. pigment violet 19 is desirable for use as the coloring material of the magenta ink in that the use of such a coloring material not only makes it possible to realize a high saturation and a superior graininess suppressing effect in high a* regions, but also to suppress metamerism.

Furthermore, in the ink set of the present Embodiment E, it is desirable that the ink set contain inks with a low coloring material concentration (light inks). Relative to the amounts of coloring material in the dark inks, the amounts of coloring material in these light inks (weight standard) are preferably 0.12 to 0.3, and are even more preferably 0.16 to 0.26. By using such proportions, it is possible to perform recording without sacrificing the graininess suppressing effect at intermediate lightness values (in the vicinity of L* 60 to 70) even if the coloring material concentration in the light inks is set at 3 wt % to 8 wt %.

Furthermore, in cases where both a graininess suppressing effect and a metamerism suppressing effect are obtained by controlling the lightness in high-saturation portions, it is desirable to simultaneously use a light black ink which has a coloring material concentration (pigment solid content) of less than 1.5 wt %, and which has substantially no spectroscopic reflectance peaks, as in the abovementioned example in the present Embodiment E. It is desirable that the coloring material concentration in this light black ink be 1 wt % or less. Furthermore, it is even more desirable to use two types of inks, i. e., a medium-concentration black ink with a coloring material concentration of 0.5 wt % or greater but less than 1.0 wt %, and a low-concentration black ink with a coloring material concentration of less than 0.5 wt %, as light black inks.

Modified Embodiments

The present invention preferably provides the respective embodiments described above. However, the present invention is not limited to these embodiments; various modifications are possible within limits that involve no departure from the spirit of the present invention.

EXAMPLES

The present invention will be concretely described below in terms of examples of the present invention and comparative examples. However, the present invention is not limited in any way by these examples.

Example A (Preparation of Ink Sets)

Yellow inks (Y1) and (Y2), magenta inks (M1) and (M2), a cyan ink (C1), light magenta inks (Lm1) and (Lm2), a light cyan ink (Lc1), an ink A (A1) and an ink B (B1) provided in the respective ink sets of the examples and comparative examples shown in Table 1 were respectively prepared by ordinary methods. Specifically, the coloring material components were dispersed together with the dispersing agent components, and inks were then prepared by adding and mixing the other components, and filtering out insoluble components exceeding a fixed size. The respective inks thus obtained were combined to form the ink sets of the respective examples and comparative examples.

<Yellow ink (Y1)>

| | |
|---|---|
| C.I. pigment yellow 74 | 5.0 wt % |
| Dispersing agent (styrene - acrylic acid copolymer) | 1.5 wt % |
| Glycerol | 15.0 wt % |
| 1,2-Hexanediol | 5.0 wt % |
| Triethanolamine | 0.5 wt % |
| Olfin E1010 | 0.5 wt % |
| Ion exchange water | balance |
| total | 100.0 wt % |

<Yellow ink (Y2)>

| | |
|---|---|
| C.I. pigment yellow 74 | 3.0 wt % |
| Dispersing agent (styrene - acrylic acid copolymer) | 0.9 wt % |
| Glycerol | 15.0 wt % |
| 1,2-Hexanediol | 5.0 wt % |
| Triethanolamine | 0.5 wt % |
| Olfin E1010 | 0.5 wt % |
| Ion exchange water | balance |
| total | 100.0 wt % |

<Magenta ink (M1)>

| | |
|---|---|
| C.I. pigment violet 19 | 6.0 wt % |
| Dispersing agent (styrene - acrylic acid copolymer) | 1.8 wt % |
| Glycerol | 15.0 wt % |
| 1,2-Hexanediol | 5.0 wt % |
| Triethanolamine | 0.5 wt % |
| Olfin E1010 | 0.5 wt % |
| Ion exchange water | balance |
| total | 100.0 wt % |

<Magenta ink (M2)>

| | |
|---|---|
| C.I. pigment red 202 | 6.0 wt % |
| Dispersing agent (styrene - acrylic acid copolymer) | 1.8 wt % |
| Glycerol | 15.0 wt % |
| 1,2-Hexanediol | 5.0 wt % |
| Triethanolamine | 0.5 wt % |
| Olfin E1010 | 0.5 wt % |
| Ion exchange water | balance |
| total | 100.0 wt % |

<Cyan ink (C1)>

| | |
|---|---|
| C.I. pigment blue 15:3 | 4.0 wt % |
| Dispersing agent (styrene - acrylic acid copolymer) | 1.2 wt % |
| Glycerol | 15.0 wt % |

-continued

| | |
|---|---|
| 1,2-Hexanediol | 5.0 wt % |
| Triethanolamine | 0.5 wt % |
| Olfin E1010 | 0.5 wt % |
| Ion exchange water | balance |
| total | 100.0 wt % |

<Light magenta ink (Lm1)>

| | |
|---|---|
| C.I. pigment violet 19 | 2.0 wt % |
| Dispersing agent (styrene - acrylic acid copolymer) | 0.6 wt % |
| Glycerol | 15.0 wt % |
| 1,2-Hexanediol | 5.0 wt % |
| Olfin E1010 | 0.5 wt % |
| Ion exchange water | balance |
| total | 100.0 wt % |

-continued

| | |
|---|---|
| Glycerol | 15.0 wt % |
| 1,2-Hexanediol | 5.0 wt % |
| Triethanolamine | 0.5 wt % |
| Olfin E1010 | 0.5 wt % |
| Ion exchange water | balance |
| total | 100.0 wt % |

The inks used in the ink sets of the examples and comparative examples, and the types and contents (wt %) of the pigments used in the respective inks are shown in Table 1.

TABLE 1

Ink sets used.

| | Y | M | C | Lm | Lc | R | V |
|---|---|---|---|---|---|---|---|
| Example (1) | Y1 | M1 | C1 | — | — | — | — |
| Example (2) | Y1 | M1 | C1 | Lm1 | Lc1 | — | — |
| Example (3) | Y2 | M1 | C1 | Lm1 | Lc1 | A1 | B1 |
| Comparative Example (1) | Y1 | M2 | C1 | — | — | — | — |
| Comparative Example (2) | Y1 | M2 | C1 | Lm2 | Lc1 | — | — |
| Comparative Example (3) | Y2 | M2 | C1 | Lm2 | Lc1 | A1 | B1 |
| Pigment types and amounts | Y | M | C | Lm | Lc | R | V |
| Example (1) | PY74-5% | PV19-6% | PB15:3-4% | — | — | — | — |
| Example (2) | PY74-5% | PV19-6% | PB15:3-4% | PV19-2% | PB15:3-1.5% | — | — |
| Example (3) | PY74-3% | PV19-6% | PB15:3-4% | PV19-2% | PB15:3-1.5% | PR177-2.5% | PV23-2% |
| Comparative Example (1) | PY74-5% | PR202-6% | PB15:3-4% | — | — | — | — |
| Comparative Example (2) | PY74-5% | PR202-6% | PB15:3-4% | PR202-2% | PB15:3-1.5% | — | — |
| Comparative Example (3) | PY74-3% | PR202-6% | PB15:3-4% | PR202-2% | PB15:3-1.5% | PR177-2.5% | PV23-2% |

-continued

| | |
|---|---|
| Olfin E1010 | 0.5 wt % |
| Ion exchange water | balance |
| total | 100.0 wt % |

<Light magenta ink (Lm2)>

| | |
|---|---|
| C.I. pigment red 202 | 2.0 wt % |
| Dispersing agent (styrene - acrylic acid copolymer) | 0.6 wt % |
| Glycerol | 15.0 wt % |
| 1,2-Hexanediol | 5.0 wt % |
| Triethanolamine | 0.5 wt % |
| Olfin E1010 | 0.5 wt % |
| Ion exchange water | balance |
| total | 100.0 wt % |

<Light cyan ink (Lc1)>

| | |
|---|---|
| C.I. pigment blue 15:3 | 1.5 wt % |
| Dispersing agent (styrene - acrylic acid copolymer) | 0.5 wt % |
| Glycerol | 15.0 wt % |
| 1,2-Hexanediol | 5.0 wt % |
| Triethanolamine | 0.5 wt % |
| Olfin E1010 | 0.5 wt % |
| Ion exchange water | balance |
| total | 100.0 wt % |

<Ink A (A1)>

| | |
|---|---|
| C.I. pigment red 177 | 2.5 wt % |
| Dispersing agent (styrene - acrylic acid copolymer) | 0.6 wt % |
| Glycerol | 15.0 wt % |
| 1,2-Hexanediol | 5.0 wt % |
| Triethanolamine | 0.5 wt % |
| Olfin E1010 | 0.5 wt % |
| Ion exchange water | balance |
| total | 100.0 wt % |

<Ink B (B1)>

| | |
|---|---|
| C.I. pigment violet 23 | 2.0 wt % |
| Dispersing agent (styrene - acrylic acid copolymer) | 0.6 wt % |

(Measurement of L* Values of Aqueous Solutions of Inks Diluted 1000 Times by Weight)

The L* values (as stipulated by the Lab display system of the CIE) of aqueous solutions (diluted 1000 times by weight) of the respective color inks used in the respective ink sets of the examples and comparative examples were measured as follows using a U3300 manufactured by Hitachi Seisakusho.

Specifically, two quartz cells with dimensions of 1 cm (length)×1 cm (width)×4 cm (height) and a volume of 4 mL were prepared, and these cells were respectively used as a sample side cell and a reference side cell. Pure water was added to both cells, and a base line was measured and set. The reference side cell was left as is, and the pure water in the sample side cell was replaced with an aqueous solution of the sample ink diluted 1000 times by weight. The aqueous solution of ink diluted 1000 times by weight was prepared by transferring 1.00 g of each ink in each ink set of the examples and comparative examples to a 1-L beaker, and further adding pure water to produce a total of 1000.00 g of solution.

Then, the sample side cell and reference side cell were set in the measurement part, and the ultraviolet-visible transmission spectrum was measured in the range of 380 to 800 nm at a photomultiplier voltage of 200 V with the light source lamp set as a D2 lamp and WI lamp switched at 340 nm, the lamp slit width set at 2.0 mm, the scanning speed of the measurement interval set at 600 nm/min, and the transmissivity set at 0.0 to 100.0% T. The L* values of aqueous solutions of the respective inks diluted 1000 times by weight calculated in this way are shown below. Furthermore, the a* values and b* values were similarly calculated for the inks (A) and (B), and these values are also shown below.

L* values (Y1): 88, (M1): 63, (C1): 65, (Lm1): 81, (Lc1): 80, (Y2): 91, (A1): 68, (B1): 49, (M2): 58, (Lm2): 80.

a* values (A1): 52, (B1): 67.

b* values (A1): −2, (B1): −66.

The pigment contents are determined in accordance with the selected pigment types by thus setting the L* values in the CIE-stipulated Lab display system of aqueous solutions of the inks diluted 1000 times by weight.

(Abovementioned Y Values and Z Values in the Magenta and Light Magenta Inks)

Dilute aqueous solutions with a pigment solid concentration of 0.01 wt % or less were prepared by dilution with pure water so that the Y value (in the XYZ display system stipulated by the CIE, as calculated from the ultraviolet-visible transmission spectrum) of the magenta inks used in the respective ink sets of the examples and comparative examples was 55.

In actuality, dilute solutions with pigment contents of 0.0010 wt %, 0.0015 wt %, 0.0020 wt %, 0.0025 wt % and 0.0030 wt % were prepared. To describe the preparation method used in the case of Lm1 in concrete terms, 0.5 g, 0.75 g, 1.00 g, 1.25 g and 1.50 g samples of Lm1 were respectively placed in 1-liter beakers, and samples were prepared by immediately adjusting the amount to 1000.00 g. Samples were also similarly prepared in the case of Lm2. Furthermore, to describe the preparation method used in the case of M1 in concrete terms, 0.167 g, 0.250 g, 0.333 g, 0.417 g and 0.500 g samples of M1 were respectively placed in 1-liter beakers, and samples were prepared by immediately adjusting the amount to 1000.00 g. Samples were also similarly prepared in the case of M2.

These respective aqueous solutions were measured as follows using a U3300 manufactured by Hitachi Seisakusho. Specifically, two quartz cells with dimensions of 1 cm (length)×1 cm (width)×4 cm (height) and a volume of 4 mL were prepared, and these cells were respectively used as a sample side cell and a reference side cell. Pure water was added to both cells, these cells were set in the measurement part, and a base line was measured and set. In regard to the measurement conditions, the ultraviolet-visible transmission spectrum was measured in the range of 380 to 800 nm at a photomultiplier voltage of 200 V with the light source lamp set as a D2 lamp and WI lamp switched at 340 nm, the lamp slit width set at 2 mm, the scanning speed of the measurement interval set at 600 nm/min, and the transmissivity set at 0.0 to 100.0% T.

Next, the reference side cell was left as is, and the pure water in the sample side cell was replaced with the respective aqueous solutions. The ultraviolet-visible transmission spectra were respectively measured, and the Y and Z values in the XYZ display system stipulated by the CIE were measured on the basis of a D65 light source and a visual field angle of 2 degrees.

These values were plotted in a graph with the Y value on the horizontal axis and the Z value on the vertical axis, and were connected by curves, thus producing curve Lm1, curve Lm2, curve M1 and curve M2. The respective Z values in the case of a Y value of 55 were determined from these curves, and are shown below.

| (M1) Z value: 77 | (Lm1) Z value: 77 |
|---|---|
| (M2) Z value: 84 | (Lm2) Z value: 84 |

The corresponding pigment types are thus determined by setting the Z value when the Y value of the ink is 55.

(Evaluation of Graininess)

The respective inks used in the examples and comparative examples were selected as shown below, and printed matter was obtained by printing on PM photographic paper (one example of a medium with a coating layer) using a PM900C ink jet printer (manufactured by Seiko-Epson Co.) according to the Ink Weight Tables 2, 3 and 4 shown in Tables 2 through 4 for both a resolution of 720×720 and a resolution of 720×360. This recording matter was visually evaluated according to the criteria shown below (graininess (I)).

Similarly, furthermore, recorded matter was obtained by printing ISO/JIS-SCID N1A portrait images stipulated by the ISO on PM photographic paper for both a resolution of 720×720 dots and a resolution of 720×360 dots. The flesh-colored portions of this recorded matter were judged as shown below by visual inspection (graininess (II)).

| | (Name of ink combination) |
|---|---|
| Selection from Example 1 → | M1, C1 and Y1 (Example (1)) |
| Selection from Example 2 → | Lm1, Lc1 and Y1 (Example (2)-1) |
| Selection from Example 3 → | Lm1, Lc1 and Y2 (Example (3)-1) |
| | Lm1, Lc1 and B1 (Example (3)-2) |
| | Lm1, Y2 and A1 (Example (3)-3) |
| Selection from Comparative Example 1 → | M2, C1 and Y1 (Comparative Example (1)) |
| Selection from Comparative Example 2 → | Lm2, Lc1 and Y1 (Comparative Example (2)-1) |
| Selection from Comparative Example 3 → | Lm2, Lc1 and Y2 (Comparative Example (3)-1) |
| | Lm2, Lc1 and B1 (Comparative Example (3)-2) |
| | Lm2, Y2 and A1 (Comparative Example (3)-3) |

Ink Weight Table 2 (this table is a matrix in which the respective cells stipulate the locations where printing was performed.)

Magenta ink or light magenta ink

| | | | | | | | | | | |
|---|---|---|---|---|---|---|---|---|---|---|
| 0.65 | 0.65 | 0.60 | 0.55 | 0.50 | 0.40 | 0.30 | 0.25 | 0.15 | 0.05 | 0.00 |
| 0.60 | 0.55 | 0.55 | 0.50 | 0.45 | 0.35 | 0.30 | 0.20 | 0.15 | 0.05 | 0.00 |
| 0.50 | 0.50 | 0.50 | 0.45 | 0.40 | 0.30 | 0.25 | 0.20 | 0.10 | 0.05 | 0.00 |
| 0.45 | 0.45 | 0.40 | 0.40 | 0.35 | 0.30 | 0.20 | 0.15 | 0.10 | 0.05 | 0.00 |
| 0.40 | 0.40 | 0.35 | 0.35 | 0.30 | 0.25 | 0.20 | 0.15 | 0.10 | 0.05 | 0.00 |
| 0.35 | 0.30 | 0.30 | 0.30 | 0.25 | 0.20 | 0.15 | 0.10 | 0.05 | 0.05 | 0.00 |
| 0.25 | 0.25 | 0.25 | 0.20 | 0.20 | 0.15 | 0.15 | 0.10 | 0.05 | 0.05 | 0.00 |
| 0.15 | 0.15 | 0.10 | 0.10 | 0.10 | 0.10 | 0.05 | 0.05 | 0.05 | 0.00 | 0.00 |

Magenta ink or light magenta ink

| | | | | | | | | | | |
|---|---|---|---|---|---|---|---|---|---|---|
| 0.00 | 0.05 | 0.15 | 0.25 | 0.30 | 0.40 | 0.50 | 0.55 | 0.60 | 0.65 | 0.65 |
| 0.00 | 0.05 | 0.15 | 0.20 | 0.30 | 0.35 | 0.45 | 0.50 | 0.55 | 0.55 | 0.60 |
| 0.00 | 0.05 | 0.10 | 0.20 | 0.25 | 0.30 | 0.40 | 0.45 | 0.50 | 0.50 | 0.50 |
| 0.00 | 0.05 | 0.10 | 0.15 | 0.20 | 0.30 | 0.35 | 0.40 | 0.40 | 0.45 | 0.45 |
| 0.00 | 0.05 | 0.10 | 0.15 | 0.20 | 0.25 | 0.30 | 0.35 | 0.35 | 0.40 | 0.40 |

|  |  | Ink Weight Table 2 (this table is a matrix in which the respective cells stipulate the locations where printing was performed.) | | | | | | | | |
|---|---|---|---|---|---|---|---|---|---|---|
| 0.00 | 0.05 | 0.05 | 0.10 | 0.15 | 0.20 | 0.25 | 0.30 | 0.30 | 0.30 | 0.35 |
| 0.00 | 0.05 | 0.05 | 0.10 | 0.15 | 0.15 | 0.20 | 0.20 | 0.25 | 0.25 | 0.25 |
| 0.00 | 0.00 | 0.05 | 0.05 | 0.05 | 0.10 | 0.10 | 0.10 | 0.10 | 0.15 | 0.15 |

Yellow ink

| | | | | | | | | | | |
|---|---|---|---|---|---|---|---|---|---|---|
| 0.00 | 0.00 | 0.00 | 0.00 | 0.00 | 0.00 | 0.00 | 0.00 | 0.00 | 0.00 | 0.00 |
| 0.05 | 0.05 | 0.05 | 0.10 | 0.10 | 0.10 | 0.10 | 0.10 | 0.05 | 0.05 | 0.05 |
| 0.15 | 0.15 | 0.15 | 0.15 | 0.15 | 0.15 | 0.15 | 0.15 | 0.15 | 0.15 | 0.15 |
| 0.20 | 0.20 | 0.20 | 0.25 | 0.25 | 0.25 | 0.25 | 0.25 | 0.20 | 0.20 | 0.20 |
| 0.25 | 0.30 | 0.30 | 0.30 | 0.30 | 0.30 | 0.30 | 0.30 | 0.30 | 0.30 | 0.25 |
| 0.35 | 0.35 | 0.35 | 0.40 | 0.40 | 0.40 | 0.40 | 0.40 | 0.35 | 0.35 | 0.35 |
| 0.40 | 0.40 | 0.45 | 0.50 | 0.50 | 0.50 | 0.50 | 0.50 | 0.45 | 0.40 | 0.40 |
| 0.50 | 0.55 | 0.60 | 0.65 | 0.65 | 0.65 | 0.65 | 0.65 | 0.60 | 0.55 | 0.50 |

| | | Ink Weight Table 3 (this table is a matrix in which the respective cells stipulate the locations where printing was performed.) | | | | | | | | |
|---|---|---|---|---|---|---|---|---|---|---|

Light magenta ink

| | | | | | | | | | | |
|---|---|---|---|---|---|---|---|---|---|---|
| 0.65 | 0.65 | 0.60 | 0.55 | 0.50 | 0.40 | 0.30 | 0.25 | 0.15 | 0.05 | 0.00 |
| 0.60 | 0.55 | 0.55 | 0.50 | 0.45 | 0.35 | 0.30 | 0.20 | 0.15 | 0.05 | 0.00 |
| 0.50 | 0.50 | 0.50 | 0.45 | 0.40 | 0.30 | 0.25 | 0.20 | 0.10 | 0.05 | 0.00 |
| 0.45 | 0.45 | 0.40 | 0.40 | 0.35 | 0.30 | 0.20 | 0.15 | 0.10 | 0.05 | 0.00 |
| 0.40 | 0.40 | 0.35 | 0.35 | 0.30 | 0.25 | 0.20 | 0.15 | 0.10 | 0.05 | 0.00 |
| 0.35 | 0.30 | 0.30 | 0.30 | 0.25 | 0.20 | 0.15 | 0.10 | 0.05 | 0.05 | 0.00 |
| 0.25 | 0.25 | 0.25 | 0.20 | 0.20 | 0.15 | 0.15 | 0.10 | 0.05 | 0.05 | 0.00 |
| 0.15 | 0.15 | 0.10 | 0.10 | 0.10 | 0.10 | 0.05 | 0.05 | 0.05 | 0.00 | 0.00 |

Light cyan ink

| | | | | | | | | | | |
|---|---|---|---|---|---|---|---|---|---|---|
| 0.00 | 0.05 | 0.15 | 0.25 | 0.30 | 0.40 | 0.50 | 0.55 | 0.60 | 0.65 | 0.65 |
| 0.00 | 0.05 | 0.15 | 0.20 | 0.30 | 0.35 | 0.45 | 0.50 | 0.55 | 0.55 | 0.60 |
| 0.00 | 0.05 | 0.10 | 0.20 | 0.25 | 0.30 | 0.40 | 0.45 | 0.50 | 0.50 | 0.50 |
| 0.00 | 0.05 | 0.10 | 0.15 | 0.20 | 0.30 | 0.35 | 0.40 | 0.40 | 0.45 | 0.45 |
| 0.00 | 0.05 | 0.10 | 0.15 | 0.20 | 0.25 | 0.30 | 0.35 | 0.35 | 0.40 | 0.40 |
| 0.00 | 0.05 | 0.05 | 0.10 | 0.15 | 0.20 | 0.25 | 0.30 | 0.30 | 0.30 | 0.35 |
| 0.00 | 0.05 | 0.05 | 0.10 | 0.15 | 0.15 | 0.20 | 0.20 | 0.25 | 0.25 | 0.25 |
| 0.00 | 0.00 | 0.05 | 0.05 | 0.05 | 0.10 | 0.10 | 0.10 | 0.10 | 0.15 | 0.15 |

B1 ink

| | | | | | | | | | | |
|---|---|---|---|---|---|---|---|---|---|---|
| 0.00 | 0.00 | 0.00 | 0.00 | 0.00 | 0.00 | 0.00 | 0.00 | 0.00 | 0.00 | 0.00 |
| 0.05 | 0.05 | 0.05 | 0.10 | 0.10 | 0.10 | 0.10 | 0.10 | 0.05 | 0.05 | 0.05 |
| 0.15 | 0.15 | 0.15 | 0.15 | 0.15 | 0.15 | 0.15 | 0.15 | 0.15 | 0.15 | 0.15 |
| 0.20 | 0.20 | 0.20 | 0.25 | 0.25 | 0.25 | 0.25 | 0.25 | 0.20 | 0.20 | 0.20 |
| 0.25 | 0.30 | 0.30 | 0.30 | 0.30 | 0.30 | 0.30 | 0.30 | 0.30 | 0.30 | 0.25 |
| 0.35 | 0.35 | 0.35 | 0.40 | 0.40 | 0.40 | 0.40 | 0.40 | 0.35 | 0.35 | 0.35 |
| 0.40 | 0.40 | 0.45 | 0.50 | 0.50 | 0.50 | 0.50 | 0.50 | 0.45 | 0.40 | 0.40 |
| 0.50 | 0.55 | 0.60 | 0.65 | 0.65 | 0.65 | 0.65 | 0.65 | 0.60 | 0.55 | 0.50 |

| | | Ink Weight Table 4 (this table is a matrix in which the respective cells stipulate the locations where printing was performed.) | | | | | | | | |
|---|---|---|---|---|---|---|---|---|---|---|

Light magenta ink

| | | | | | | | | | | |
|---|---|---|---|---|---|---|---|---|---|---|
| 0.65 | 0.65 | 0.60 | 0.55 | 0.50 | 0.40 | 0.30 | 0.25 | 0.15 | 0.05 | 0.00 |
| 0.60 | 0.55 | 0.55 | 0.50 | 0.45 | 0.35 | 0.30 | 0.20 | 0.15 | 0.05 | 0.00 |
| 0.50 | 0.50 | 0.50 | 0.45 | 0.40 | 0.30 | 0.25 | 0.20 | 0.10 | 0.05 | 0.00 |
| 0.45 | 0.45 | 0.40 | 0.40 | 0.35 | 0.30 | 0.20 | 0.15 | 0.10 | 0.05 | 0.00 |
| 0.40 | 0.40 | 0.35 | 0.35 | 0.30 | 0.25 | 0.20 | 0.15 | 0.10 | 0.05 | 0.00 |
| 0.35 | 0.30 | 0.30 | 0.30 | 0.25 | 0.20 | 0.15 | 0.10 | 0.05 | 0.05 | 0.00 |
| 0.25 | 0.25 | 0.25 | 0.20 | 0.20 | 0.15 | 0.15 | 0.10 | 0.05 | 0.05 | 0.00 |
| 0.15 | 0.15 | 0.10 | 0.10 | 0.10 | 0.10 | 0.05 | 0.05 | 0.05 | 0.00 | 0.00 |

-continued

Ink Weight Table 4 (this table is a matrix in which the respective cells stipulate the locations where printing was performed.)

A1 ink

| 0.00 | 0.05 | 0.15 | 0.25 | 0.30 | 0.40 | 0.50 | 0.55 | 0.60 | 0.65 | 0.65 |
|------|------|------|------|------|------|------|------|------|------|------|
| 0.00 | 0.05 | 0.15 | 0.20 | 0.30 | 0.35 | 0.45 | 0.50 | 0.55 | 0.55 | 0.60 |
| 0.00 | 0.05 | 0.10 | 0.20 | 0.25 | 0.30 | 0.40 | 0.45 | 0.50 | 0.50 | 0.50 |
| 0.00 | 0.05 | 0.10 | 0.15 | 0.20 | 0.30 | 0.35 | 0.40 | 0.40 | 0.45 | 0.45 |
| 0.00 | 0.05 | 0.10 | 0.15 | 0.20 | 0.25 | 0.30 | 0.35 | 0.35 | 0.40 | 0.40 |
| 0.00 | 0.05 | 0.05 | 0.10 | 0.15 | 0.20 | 0.25 | 0.30 | 0.30 | 0.30 | 0.35 |
| 0.00 | 0.05 | 0.05 | 0.10 | 0.15 | 0.15 | 0.20 | 0.20 | 0.25 | 0.25 | 0.25 |
| 0.00 | 0.00 | 0.05 | 0.05 | 0.05 | 0.10 | 0.10 | 0.10 | 0.10 | 0.15 | 0.15 |

Yellow ink

| 0.00 | 0.00 | 0.00 | 0.00 | 0.00 | 0.00 | 0.00 | 0.00 | 0.00 | 0.00 | 0.00 |
|------|------|------|------|------|------|------|------|------|------|------|
| 0.05 | 0.05 | 0.05 | 0.10 | 0.10 | 0.10 | 0.10 | 0.10 | 0.05 | 0.05 | 0.05 |
| 0.15 | 0.15 | 0.15 | 0.15 | 0.15 | 0.15 | 0.15 | 0.15 | 0.15 | 0.15 | 0.15 |
| 0.20 | 0.20 | 0.20 | 0.25 | 0.25 | 0.25 | 0.25 | 0.25 | 0.20 | 0.20 | 0.20 |
| 0.25 | 0.30 | 0.30 | 0.30 | 0.30 | 0.30 | 0.30 | 0.30 | 0.30 | 0.30 | 0.25 |
| 0.35 | 0.35 | 0.35 | 0.40 | 0.40 | 0.40 | 0.40 | 0.40 | 0.35 | 0.35 | 0.35 |
| 0.40 | 0.40 | 0.45 | 0.50 | 0.50 | 0.50 | 0.50 | 0.50 | 0.45 | 0.40 | 0.40 |
| 0.50 | 0.55 | 0.60 | 0.65 | 0.65 | 0.65 | 0.65 | 0.65 | 0.60 | 0.55 | 0.50 |

(Evaluation Criteria for Graininess (I))

A: Recorded matter with a resolution of 720×360 dpi shows no deterioration in terms of graininess compared to recorded matter with a resolution of 720×720 dpi.

B: Recorded matter with a resolution of 720×360 dpi shows some deterioration in terms of graininess compared to recorded matter with a resolution of 720×720 dpi.

C: Recorded matter with a resolution of 720×360 dpi shows conspicuous deterioration in terms of graininess compared to recorded matter with a resolution of 720×720 dpi.

(Evaluation Results for Graininess (I))

(Examples) (1): C, (2)-1: A, (3)-1: A, (3)-2: B, (3)-3: B.
(Comparative Examples) (1): C, (2)-1: B, (3)-1: B, (3)-2: C, (3)-3: C.

As is shown in the above evaluation results, in cases where no light inks were used, the evaluation was B when M1 was used, while the evaluation was C when M2 was used. When neither the ink A nor the ink B was used, the deterioration in terms of graininess was less than when these inks were used. Furthermore, in cases where Lm1 was used, the deterioration in terms of graininess was less than in cases where Lm2 was used. This appears to be attributable to the fact that the L* value (when the same portions are measured under a D50 light source at a visual field angle of 2 degrees using Gretag Macbeth SPM50 manufactured by Gretag Co.) in the case of printing at 2.5 mg/inch² on PM photographic paper (which is one example of a medium with a coating layer) is 75 in the case of Lm1, and 70 in the case of Lm2.

(Evaluation Criteria for Graininess (II))

A: Recorded matter with a resolution of 720×360 dpi shows no deterioration in terms of graininess of flesh-colored portions compared to recorded matter with a resolution of 720×720 dpi.

B: Recorded matter with a resolution of 720×360 dpi shows some deterioration in terms of graininess of flesh-colored portions compared to recorded matter with a resolution of 720×720 dpi.

C: Recorded matter with a resolution of 720×360 dpi shows conspicuous deterioration in terms of graininess of flesh-colored portions compared to recorded matter with a resolution of 720×720 dpi.

(Evaluation Results for Graininess (II))

(Examples) (1): B, (2)-1: A, (3)-1: A, (3)-2: B, (3)-3: B.
(Comparative Examples) (1): C, (2)-1: B, (3)-1: B, (3)-2: C, (3)-3: C.

Thus, in flesh-colored portions, where metamerism and graininess are most problematical, there was less deterioration in terms of graininess in cases where M1 and Lm1 were used than in cases where M2 and Lm2 were used.

(Evaluation of Metamerism)

Respective inks used in the examples and comparative examples were selected as shown below, and recording matter was obtained by printing on PM photographic paper (which is one example of a medium with a coating layer) according to Ink Weight Table 5 shown in Table 5 at a resolution of 720×720 using a PM900C ink jet printer. The Lab values stipulated by the CIE were obtained by measuring the same portions under a D50 light source and an A light source at a visual field angle of 2 degrees using a Gretag Macbeth SPM50 manufactured by Gretag Co. Next, ΔL*, Δa* and Δb* of the same portions were determined using the equations shown below. ΔE* was determined from these values using the equation shown below, and the results were judged as shown below.

$\Delta L^* = L^*$ in the case of the A light source $- L^*$ in the case of the D50 light source $\Delta a^* = a^*$ in the case of the A light source $- a^*$ in the case of the D50 light source $\Delta b^* = b^*$ in the case of the A light source $- b^*$ in the case of the D50 light source $\Delta E^* = (\Delta L^{*2} + \Delta a^{*2} + \Delta b^{*2})^{1/2}$

| | (Name of ink combination) |
|---|---|
| Selection from Example 1 → | M1, C1 and Y1 (Example (1)) |
| Selection from Example 2 → | Lm1, Lc1 and Y1 (Example (2)-1) |
| Selection from Example 3 → | Lm1, Lc1 and Y2 (Example (3)-1) |
| Selection from Comparative Example 1 → | M2, C1 and Y1 (Comparative Example (1)) |
| Selection from Comparative Example 2 → | Lm2, Lc1 and Y1 (Comparative Example (2)-1) |
| Selection from Comparative Example 3 → | Lm2, Lc1 and Y2 (Comparative Example (3)-4) |

Ink Weight Table 5 (this table is a matrix in which the respective cells stipulate the locations where printing was performed.)

| Ink Weight Table 5 (this table is a matrix in which the respective cells stipulate the locations where printing was performed.) | | | | | | | | | | |
|---|---|---|---|---|---|---|---|---|---|---|
| Magenta ink or light magenta ink | | | | | | | | | | |
| 13 | 13 | 12 | 11 | 10 | 8 | 6 | 5 | 3 | 1 | 0 |
| 12 | 11 | 11 | 10 | 9 | 7 | 6 | 4 | 3 | 1 | 0 |
| 10 | 10 | 10 | 9 | 8 | 6 | 5 | 4 | 2 | 1 | 0 |
| 9 | 9 | 8 | 8 | 7 | 6 | 4 | 3 | 2 | 1 | 0 |
| 8 | 8 | 7 | 7 | 6 | 5 | 4 | 3 | 2 | 1 | 0 |
| 7 | 6 | 6 | 6 | 5 | 4 | 3 | 2 | 1 | 1 | 0 |
| 5 | 5 | 5 | 4 | 4 | 3 | 3 | 2 | 1 | 1 | 0 |
| 3 | 3 | 2 | 2 | 2 | 2 | 1 | 1 | 1 | 0 | 0 |
| Light cyan ink | | | | | | | | | | |
| 0 | 1 | 3 | 5 | 6 | 8 | 10 | 11 | 12 | 13 | 13 |
| 0 | 1 | 3 | 4 | 6 | 7 | 9 | 10 | 11 | 11 | 12 |
| 0 | 1 | 2 | 4 | 5 | 6 | 8 | 9 | 10 | 10 | 10 |
| 0 | 1 | 2 | 3 | 4 | 6 | 7 | 8 | 8 | 9 | 9 |
| 0 | 1 | 2 | 3 | 4 | 5 | 6 | 7 | 7 | 8 | 8 |
| 0 | 1 | 1 | 2 | 3 | 4 | 5 | 6 | 6 | 6 | 7 |
| 0 | 1 | 1 | 2 | 3 | 3 | 4 | 4 | 5 | 5 | 5 |
| 0 | 0 | 1 | 1 | 1 | 2 | 2 | 2 | 2 | 3 | 3 |
| Yellow ink | | | | | | | | | | |
| 0 | 0 | 0 | 0 | 0 | 0 | 0 | 0 | 0 | 0 | 0 |
| 1 | 1 | 1 | 2 | 2 | 2 | 2 | 2 | 1 | 1 | 1 |
| 3 | 3 | 3 | 3 | 3 | 3 | 3 | 3 | 3 | 3 | 3 |
| 4 | 4 | 4 | 5 | 5 | 5 | 5 | 5 | 4 | 4 | 4 |
| 5 | 6 | 6 | 6 | 6 | 6 | 6 | 6 | 6 | 6 | 5 |
| 7 | 7 | 7 | 8 | 8 | 8 | 8 | 8 | 7 | 7 | 7 |
| 8 | 8 | 9 | 10 | 10 | 10 | 10 | 10 | 9 | 8 | 8 |
| 10 | 11 | 12 | 13 | 13 | 13 | 13 | 13 | 12 | 11 | 10 |

(Judgement Criteria for Metamerism)
A: $\Delta E^*$ is 7.0 or less.
B: $\Delta E^*$ is greater than 7.0 but no greater than 8.0.
C: $\Delta E^*$ is greater than 8.0 but no greater than 10.0.
D: $\Delta E^*$ is greater than 10.0.

(Evaluation Results for Metamerism)

The evaluation results for metamerism according to the abovementioned judgement criteria are shown in Table 6.

TABLE 6

| | Metamerism | |
|---|---|---|
| | $\Delta E^*$ | Judgement |
| Example (1) | 6.9 | A |
| Example (2)-1 | 7.3 | B |
| Example (3)-1 | 8.6 | C |
| Comparative Example (1) | 7.8 | B |
| Comparative Example (2)-1 | 8.4 | C |
| Comparative Example (3)-1 | 10.3 | D |

As is shown in the above evaluation results, metamerism showed better results when M1 was used than when M2 was used. This is thought to be due to the fact that the relative intensity difference between the A light source and the D50 light source at 350 to 500 nm coincide with the intensity distribution of the Z value. Furthermore, metamerism showed better results when Lm1 was used than when Lm2 was used. The fact that $\Delta E^*$ is larger in the case of the light inks than in the case of the dark inks is thought to be attributable to the fact that coloring on PM photographic paper (which is one type of medium with a coating layer) is low, so the projections in the spectroscopic reflectance spectrum of the recorded matter are severe.

(Evaluation of Color Reproducibility)

The evaluation of color reproducibility was accomplished by judging the size of the gamut volume and the reproduction of low-lightness high-saturation color images.

(Gamut Volume)

Respective samples of recorded matter were obtained by printing the respective ink sets of the examples and comparative examples on PM photographic paper (which is one example of a medium with a coating layer) at a resolution of 720×720 using a PM900C ink jet printer. In this case, the monochromatic duty of 100% was set at 13 mg/inch$^2$, and the mixed color duty was set at 120%, 16 mg/inch$^2$. These respective duty values were taken as the maximum duty values, and the reproducible colors of the respective ink sets were all printed by varying the duty values 3% at a time within a duty range of 0% to 100% for the respective monochromatic inks, and combining all of the respective inks, so that respective samples of recorded matter were obtained.

The respective colors of these respective samples of recorded matter were measured under a D50 light source at a visual field angle of 2 degrees using a Gretag Macbeth SPM50 manufactured by Gretag Co., and the Lab values stipulated by the CIE were obtained.

The gamut volume (=color reproducibility) was determined from the values thus obtained, with the gamut volume in a case where the Lab values stipulated by the CIE were all 1 taken as a gamut volume of 1. A judgement was performed as shown below on the basis of these values.

(Evaluation Criteria for Gamut Volume)
A: Gamut volume greater than 730.000.
B: Gamut volume greater than 700.000 but no greater than 730.000.
C: Gamut volume greater than 680.000 but no greater than 700.000.
D: Gamut volume 680.000 or less.

<Evaluation of Low-Lightness High-Saturation Colors>

Furthermore, the respective inks used in the examples and comparative examples were selected as shown below, and recorded matter was obtained by printing on PM photographic paper (which is one example of a medium with a coating layer) in accordance with Ink Weight Table 5 shown in the abovementioned Table 5 at a resolution of 720×720 using a PM900C ink jet printer.

| | (Name of ink combination) |
|---|---|
| Selection from Example 1 → | M1, C1 and Y1 (Example (1)) |
| Selection from Example 2 → | M1, C1 and Y2 (Example (2)-2) |
| Selection from Example 3 → | Lm1, Lc1 and Y2 (Example (3)-1) |
| Selection from Comparative Example 1 → | M2, C1 and Y1 (Comparative Example (1)) |
| Selection from Comparative Example 2 → | M2, C1 and Y1 (Comparative Example (2)-2) |
| Selection from Comparative Example 3 → | Lm2, Lc1 and Y2 (Comparative Example (3)-4) |

Figure 2:
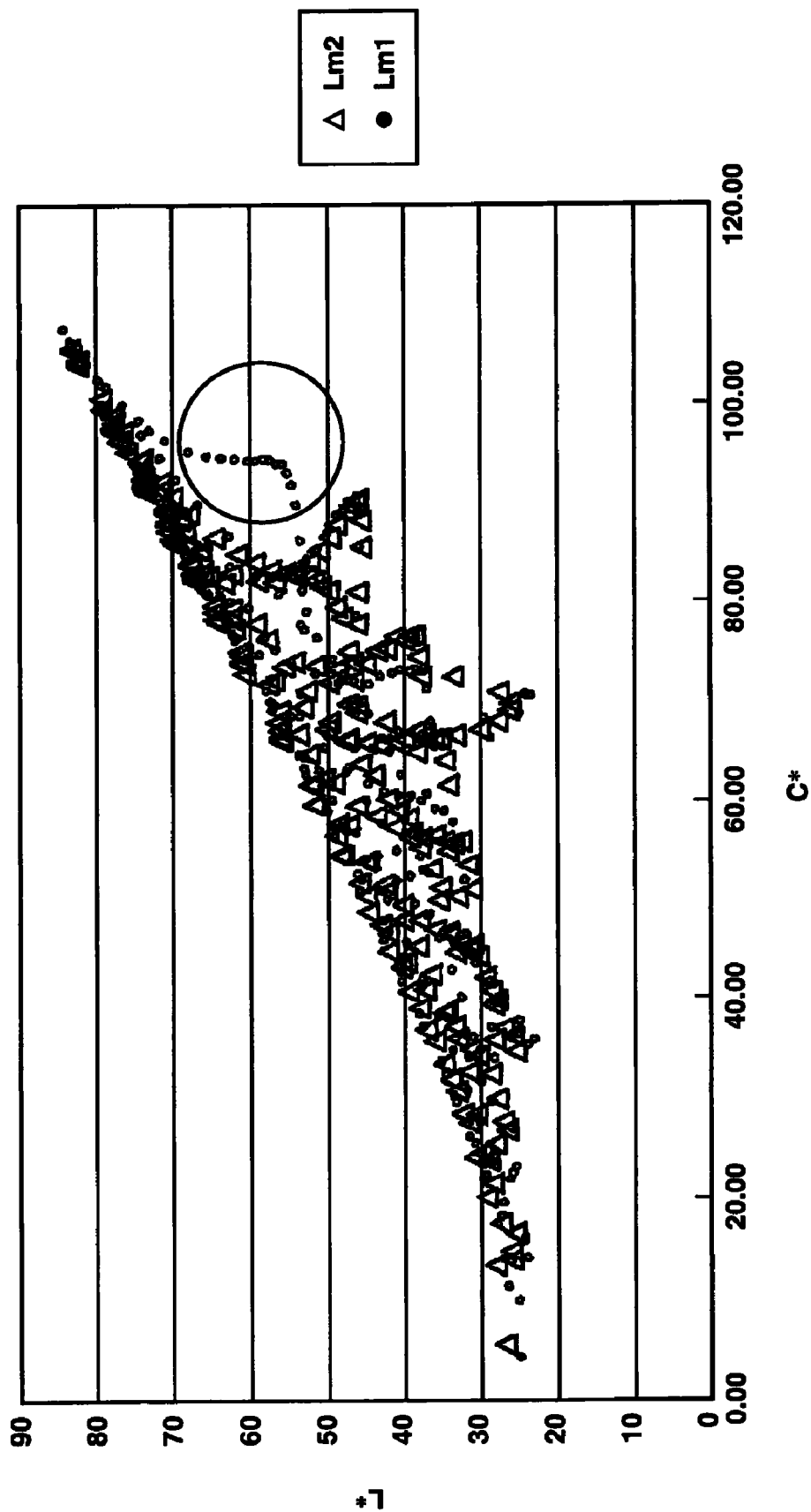
FIG. 2 is a graph which shows the relationship between $C^*$ and $L^*$ of recorded matter using light magenta inks (Lm1 and Lm2) in order to evaluate the color reproducibility of the ink set.
Figure 3:
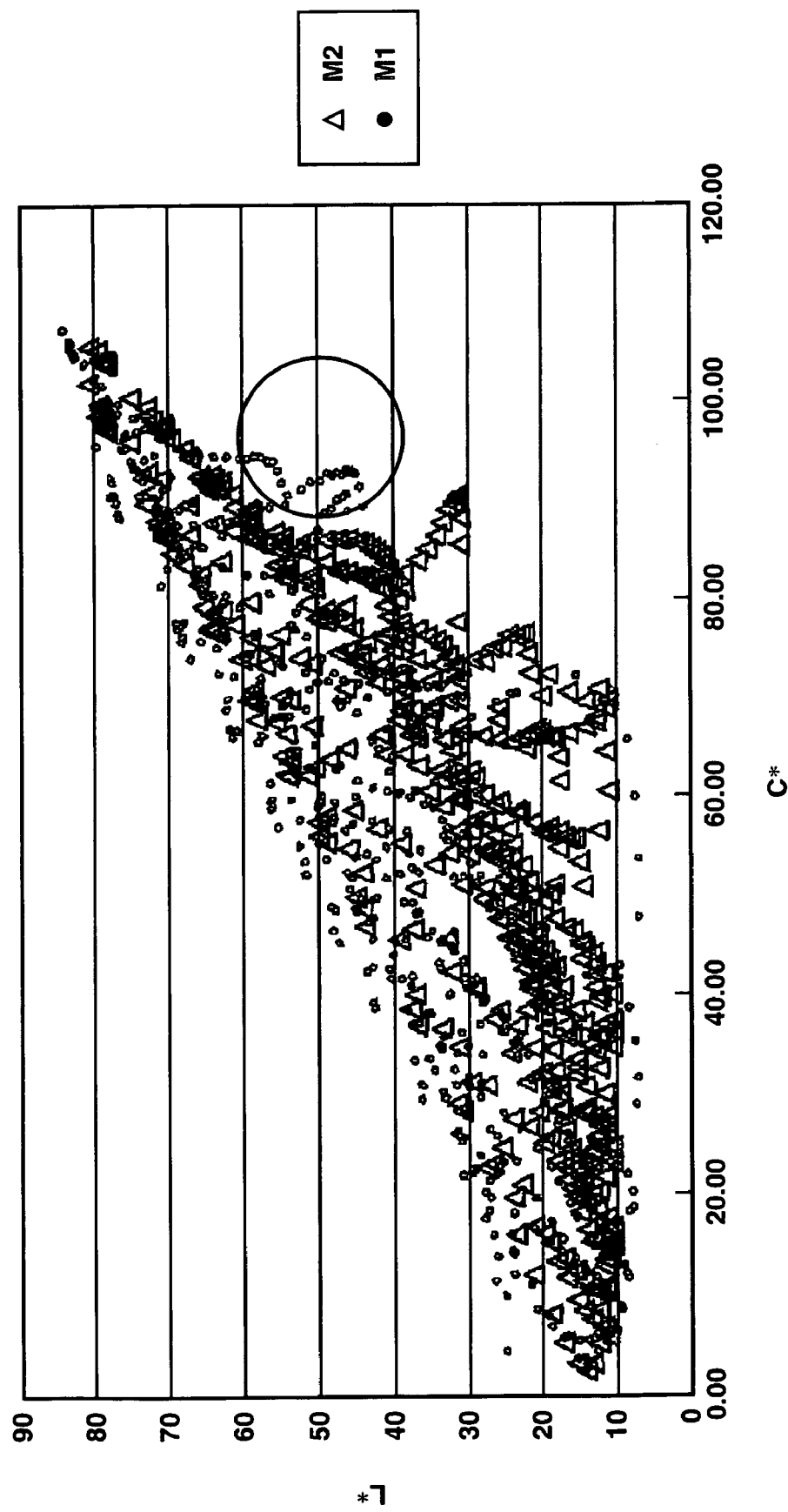
FIG. 3 is a graph which shows the relationships between $C^*$ and $L^*$ for the recorded matter using both dark and light magenta inks in FIGS. 1 and 2.

The recorded matter thus obtained was measured under a D50 light source at a visual angle of 2 degrees using a Gretag Macbeth SPM50 manufactured by Gretag Co., and the Lab values stipulated by the CIE were obtained. C* was determined from these values, and was plotted in a graph with C* on the horizontal axis and L* on the vertical axis. As examples of the graphs thus obtained, a graph for the dark magenta inks (M1 and M2) is shown in FIG. 1, and the a graph for the light magenta inks (Lm1 and Lm2) is shown in FIG. 2. Furthermore, a graph combining both graphs for the light and dark magenta inks is shown in FIG. 3. A judgement was made as follows from these graphs.

Equation: $C^* = (a^{*2} + b^{*2})^{1/2}$ (Evaluation Criteria for Low-Lightness High-Saturation Colors)

A: Colors with a saturation of around 95 and a lightness of around 55 can be shown without using black inks.

B: Colors with a saturation of around 95 and a lightness of around 55 cannot be shown without using black inks.

(Evaluation Results for Color Reproducibility)

The evaluation results for gamut volume and low-lightness high-saturation colors are shown in Table 7.

TABLE 7

|  | Color reproducibility | |
| --- | --- | --- |
|  | Gamut volume | Low-lightness high-saturation |
| Example (1) | C | A |
| Example (2) | C | — |
| Example (3) | A | — |
| Example (2)-2 | — | A |
| Example (3)-1 | — | A |
| Comparative Example (1) | D | B |
| Comparative Example (2) | D | — |
| Comparative Example (3) | B | — |
| Comparative Example (2)-2 | — | B |
| Comparative Example (3)-1 | — | B |

(Comprehensive Evaluation Results)

The abovementioned evaluation results are summarized, and the evaluations for the ink sets of Examples 1 through 3 and Comparative Examples 1 through 3 are combined with these results, and shown as comprehensive evaluation results in Table 8. Furthermore, in regard to graininess, the results shown are results obtained by a comprehensive evaluation from the abovementioned results for graininess (I) and (II).

TABLE 8

|  | Graininess | Metamerism | Gamut volume | Low-lightness high-saturation |
| --- | --- | --- | --- | --- |
| Example 1 | B | A | C | A |
| Example (2)-1 | A | B | — | — |
| Example (2)-2 | — | — | — | A |
| Example (2) | A | B | C | A |
| Example (3)-1 | A | C | — | A |
| Example (3)-2 | B | — | — | — |
| Example (3)-3 | B | — | — | — |
| Example (3) | A | C | A | A |
| Comparative Example (1) | C | B | D | B |
| Comparative Example (2)-1 | B | C | — | — |
| Comparative Example (2)-2 | — | — | — | B |
| Comparative Example (2) | B | C | D | B |
| Comparative Example (3)-1 | B | D | — | B |
| Comparative Example (3)-2 | C | — | — | — |
| Comparative Example (3)-3 | C | — | — | — |
| Comparative Example (3) | B | D | B | B |

As is shown in the above evaluation results, the use of M1 or Lm1 makes it possible to reproduce low-lightness high-saturation colors, and the gamut volume is also increased. Thus, the effect of the present invention can be obtained by using the ink sets of the respective examples, and controlling the method of use of the respective inks in these ink sets.

As is clear from the above results, the ink sets of the present invention make it possible to obtain superior color reproducibility of recorded images even if special color inks other than YMC inks are not used; furthermore it is seen that metamerism can be reduced without conspicuous graininess caused by dot expression.

Embodiment B (Preparation of Inks)

Ink sets comprising the respective inks shown in Table 9 were prepared. The compositions of the inks used in the respective ink sets are shown in Table 10.

Below, furthermore, BYK-348 is a polysiloxane type surfactant manufactured by BYK-Chemie Japan K.K.

TABLE 9

|  | Ink No. | | | | | | | |
| --- | --- | --- | --- | --- | --- | --- | --- | --- |
|  | Y | M | C | Lm | Lc | High-concentration Bk | Medium-concentration Bk | Low-concentration Bk |
| Ink set A (Example 1) | 1 | 2 | 4 | | | | | |
| Ink set B (Example 2) | 1 | 2 | 4 | 5 | 7 | | | |
| Ink set C (Example 3) | 1 | 2 | 4 | | | 8 | 9 | 10 |
| Ink set D (Example 4) | 1 | 2 | 4 | 5 | 7 | 8 | 9 | 10 |
| Ink set E (Comparative Example 1) | 1 | 3 | 4 | | | | | |
| Ink set F (Comparative Example 2) | 1 | 3 | 4 | 6 | 7 | | | |
| Ink set G (Comparative Example 3) | 1 | 3 | 4 | | | 8 | | |
| Ink set H (Comparative Example 4) | 1 | 3 | 4 | 5 | 7 | 8 | | |
| Ink set I (Comparative Example 5) | 1 | 3 | 4 | 5 | 7 | 8 | 9 | |

TABLE 10

|  | Y | M | C | Lm | Lc | High-concentration Bk | Medium-concentration Bk | Low-concentration Bk |
| --- | --- | --- | --- | --- | --- | --- | --- | --- |
| Ink No. | 1 | 2 | 3 | 4 | 5 | 6 | 7 | 8 | 9 | 10 |
| Carbon black | | | | | | | 1.50 | 0.84 | 0.22 |
| PV19 | | 6.00 | | | 1.00 | | | | |
| PR122 | | | 6.00 | | | 1.00 | | | |

TABLE 10-continued

| | Y | M | | C | Lm | | Lc | High-concentration Bk | Medium-concentration Bk | Low-concentration Bk |
|---|---|---|---|---|---|---|---|---|---|---|
| Ink No. | 1 | 2 | 3 | 4 | 5 | 6 | 7 | 8 | 9 | 10 |
| PY74 | 6.00 | | | | | | | | | |
| PB15:3 | | | | 4.00 | | | 1.00 | | | |
| Dispersing agent | 1.50 | 1.80 | 1.80 | 1.20 | 0.30 | 0.30 | 0.30 | 0.80 | 0.45 | 0.12 |
| Glycerol | 16.00 | 11.00 | 17.00 | 13.00 | 22.00 | 17.50 | 20.00 | 14.00 | 19.00 | 17.00 |
| 1,2-Hexanediol | 4.00 | 4.00 | 4.00 | 4.00 | 5.00 | 5.00 | 5.00 | 8.00 | 5.00 | 5.00 |
| Ethylene glycol | | | | | 4.00 | 7.00 | 3.00 | | | |
| Triethylene glycol | | | | | | 5.00 | | | | |
| HS-500 | | | | | | | | | 4.00 | 5.00 |
| BYK348 | 0.50 | 0.40 | 0.40 | 0.50 | 0.50 | 0.50 | 0.50 | 0.30 | 0.50 | 0.50 |
| EDTA | 0.02 | 0.02 | 0.02 | 0.02 | 0.02 | 0.02 | 0.02 | 0.02 | 0.02 | 0.02 |
| Triethanol amine | 0.90 | 0.90 | 0.90 | 0.90 | 0.90 | 0.90 | 0.90 | 0.90 | 0.90 | 0.90 |
| Resin emulsion (1) | 0.30 | 0.30 | | 0.30 | 0.30 | 0.30 | 0.30 | 1.33 | 0.30 | 0.30 |
| Resin emulsion (2) | 0.20 | 0.20 | | 0.20 | 0.20 | | 0.20 | 0.33 | 2.00 | 3.00 |
| Resin emulsion (3) | 0.30 | 0.30 | | 0.30 | 0.30 | | 0.30 | 2.00 | | 2.00 |
| Pure water | Balance | Balance | Balance | Balance | Balance | Balance | Balance | Balance | Balance | Balance |

(Units: wt %)

In each of the above examples, the pigment, dispersing agent and pure water were mixed, and were dispersed for 2 hours together with glass beads in a sand mill (manufactured by Yasukawa Seisakusho); then, the glass beads (diameter 1.7 mm, 1.5 times amount of mixture (by weight)) were removed, thus producing respective pigment dispersions.

Furthermore, the resin emulsion (1) was prepared as follows:

(1) 100 g of dioxane was placed in a glass reaction vessel. 11.8 g of sulfuric anhydride was added to this while the internal temperature was maintained at 25° C., and this mixture was agitated for 2 hours, thus producing a sulfuric anhydride-dioxane complex.

(2) Next, all of the complex obtained in the abovementioned (1) was added to a THF solution (concentration=15%) of 100 g of a styrene/isoprene/styrene tertiary block copolymer (10/80/10 weight ratio, Mw=100,000) while the internal temperature was maintained at 25° C., and agitation was continued for an additional 2 hours.

(3) 1200 g of water, 7.1 g of sodium hydroxide and 1 g of sodium dodecylbenzenesulfonate were placed in a flask, and the internal temperature was maintained at 40° C. All of the solution obtained in (2) was added to this dropwise for one hour while the internal temperature was maintained at 40° C. Following this dropwise addition, the mixture was agitated for 2 hours at 40° C.; then the solvent was removed (while leaving the water) by distillation under reduced pressure, thus producing a sulfonated emulsion C with a concentration of 15%. The sulfonic acid content in the solid matter was 1.2 mmol/g.

The resin emulsion (2) was a 30% aq solution of a nonionic aqueous emulsion of a modified polypropylene wax, i. e., AQUACER593 (commercial name of product manufactured by BYK-Chemie Japan K.K.).

Furthermore, the resin emulsion (3) was prepared as follows:

55 parts of ethyl acrylate, 37 parts of methyl acrylate, 6 parts of methacrylic acid, 3 parts of octyl thioglycolate used as a molecular weight adjusting agent, 2.5 parts of polyvinyl alcohol and 280 parts of ion exchange water were agitated and mixed, thus producing a dispersion of a monomer mixture.

Next, 130 parts of ion exchange water and 2 part of potassium peroxide were placed in a reaction vessel equipped with an agitator, the temperature was elevated to 80° C., and the abovementioned monomer mixture dispersion was continuously added and polymerized over a period of 4 hours. Following the completion of this continuous addition, a reaction was performed for 30 minutes at 80° C.

Next, an amount of a 10% aqueous solution of sodium hydroxide corresponding to an amount of sodium hydroxide that was equimolar with the amount of methacrylic acid used was added to the reaction vessel, and this mixture was heat-treated for 1 hour at 80° C. An appropriate amount of ion exchange water was then added, thus producing a resin with a solid concentration of 15%. The acid value of this resin was 40 mgKOH/g, and the pH was 9.2. For the resin in the alkali-soluble emulsion thus obtained, the Mw was 11,000, the glass transition temperature (measured according to JIS K6900) was 25° C., the mean particle size was 50 nm or less, the minimum film formation temperature was 15° C., and the turbidity (measured at a cell width of 10 mm using a WATER-ANALYZER 2000 manufactured by Nippon Denko Kogyo K.K.) was 30 g/L or less.

The solvent (excluding the pigment and dispersing agent) and the resin emulsion prepared as described above were mixed to produce an ink solvent. The respective pigment dispersions prepared as described above were respectively added, and the resulting mixtures were agitated for 20 minutes at ordinary temperature. The resulting products were filtered with a 5 μm membrane filter, thus producing respective inks, so that the ink sets A through H were obtained.

(1) Evaluation of Graininess

Using the respective ink sets, recorded matter was obtained by performing image printing at a resolution of 720×720 and a resolution of 720×360 on a special ink jet recording paper (PM photographic paper manufactured by Seiko-Epson K.K.) using a PM-4000PX ink jet printer (commercial name of printer manufactured by Seiko-Epson K.K.). Furthermore, since this printer could print only up to 7 colors, printing was performed in two operations in the case of ink sets that exceeded 7 colors. This recorded matter was judged as follows by visual inspection.

<Judgement Criteria>

A Recorded matter with a resolution of 720×360 was not conspicuously inferior in terms of graininess compared to recorded matter with a resolution of 720×720.

B Recorded matter with a resolution of 720×360 was inferior in terms of graininess compared to recorded matter with a resolution of 720×720.

C Recorded matter with a resolution of 720×360 was conspicuously inferior in terms of graininess compared to recorded matter with a resolution of 720×720.

(2) Evaluation of Metamerism

Using the respective ink sets, recorded matter was obtained by performing image printing at a resolution of 720×720 on a special ink jet recording paper (PM photographic paper manufactured by Seiko-Epson K.K.) using a PM-4000PX ink jet printer (commercial name of printer manufactured by Seiko-Epson K.K.). Furthermore, since this printer could print only up to 7 colors, printing was performed in two operations in the case of ink sets that exceeded 7 colors. In the recording matter thus obtained, the same portions were measured under a D50 light source and an F11 light source at a visual field angle of 2 degrees using a Gretag Macbeth SPM50 manufactured by Gretag Co., and the Lab values stipulated by the CIE were obtained. Next, $\Delta L^*$, $\Delta a^*$ and $\Delta b^*$ of the same portions were determined using the equations shown below. $\Delta E^*$ was determined from these values using the equation shown below, and the results were judged as shown below.

$\Delta L^* = L^*$ in the case of the $F11$ light source $-L^*$ in the case of the D50 light source $\Delta a^* = a^*$ in the case of the $F11$ light source $-a^*$ in the case of the D50 light source $\Delta b^* = b^*$ in the case of the $F11$ light source $-b^*$ in the case of the D50 light source $\Delta E^* = (\Delta L^{*2} + \Delta a^{*2} + \Delta b^{*2})^{1/2}$ <Evaluation Criteria>
A: $\Delta E^*$ is 4.0 or less.
B: $\Delta E^*$ is greater than 4.0 but no greater than 5.0.
C: $\Delta E^*$ is greater than 5.0 but no greater than 7.0.
D: $\Delta E^*$ is greater than 7.0.

(3) Evaluation of Color Reproducibility

Using the respective ink sets of the examples and comparative examples, recorded matter was obtained by performing image printing at a resolution of 720×720 on a special ink jet recording paper (MC photographic paper manufactured by Seiko-Epson K.K.) using a PM4000PX ink jet printer (commercial name of printer manufactured by Seiko-Epson K.K.). Furthermore, since this printer could print only up to 7 colors, printing was performed in two operations in the case of ink sets that exceeded 7 colors. In this case, the monochromatic duty of 100% was set at 13 mg/inch², and the mixed color duty was set at 120%, 16 mg/inch². These respective duty values were taken as the maximum duty values, and the reproducible colors of the respective ink sets were all printed by varying the duty values 3% at a time within a duty range of 0% to 100% for the respective monochromatic inks, and combining all of the respective inks, so that respective samples of recorded matter were obtained.

The respective colors of these respective samples of recorded matter were measured under a D50 light source at a visual field angle of 2 degrees using a Gretag Macbeth SPM50 manufactured by Gretag Co., and the Lab values stipulated by the CIE were obtained.

The gamut volume (=color reproducibility) was determined from the values thus obtained, with the gamut volume in a case where the Lab values stipulated by the CIE were all 1 taken as a gamut volume of 1. A judgement was performed as shown below on the basis of these values.

<Evaluation Criteria>
A: Gamut volume greater than 680.000.
B: Gamut volume 650.000 to 680.000.
C: Gamut volume less than 650.000.

(4) Stability of Gray Balance (Evaluation of Color Variation)

Using the respective ink sets, recorded matter was obtained by performing printing at a resolution of 1440×720 on a special ink jet recording paper (PM photographic paper manufactured by Seiko-Epson K.K.) using a PM-4000PX ink jet printer (commercial name of printer manufactured by Seiko-Epson K.K.). Furthermore, since this printer could print only up to 7 colors, printing was performed in two operations in the case of ink sets that exceeded 7 colors. In the printed patterns, the respective output colors appropriately adjusted so that gray colorless patterns were output with gradation patches divided into 10 stages ranging from absolute white (data 0) to absolute black (data 255). In the ink sets C and D, since the ink 12 in particular had a low output density (patch 1), this ink was output to an intermediate density (patch 5) up to a maximum 40% duty; furthermore, the ink 11 was output from patch 4 to the high-density patch 10 up to a maximum 40% duty. This limitation was not encountered in the ink sets G and H, and appropriate output colors were controlled.

Furthermore, in the respective inks, respectively similar gray colorless patterns were output in 10-stage patches with the ink weight varied 10% at a time (printing during fluctuation). The colors of the respective patches that were output were measured for standard printing and printing during fluctuation in the Lab color display system of the color difference display method stipulated by the CIE using a Gretag Macbeth SPM50 manufactured by Gretag Co. The color measurement conditions were as follows: light source D50, no light source filter, white reference=absolute white, visual field angle 2 degrees.

The color difference $\Delta E$ between standard printing and printing during fluctuation was calculated, and an evaluation was performed using the following criteria:
A $\Delta E$ 2 or less in all patches.
B $\Delta E$ exceeds 2 in 3 or fewer patches, and is 2 or less in all other patches.
C $\Delta E$ exceeds 2 in 6 or fewer patches, and is 2 or less in all other patches.
D $\Delta E$ exceeds 2 in 7 or more patches.

The results of an evaluation performed according to the abovementioned evaluation criteria are shown in Table 11.

TABLE 11

| Ink set | Graininess | Metamerism | Color reproducibility | Color variation |
|---------|------------|------------|----------------------|-----------------|
| Ink set A | C | A | A | — |
| Ink set B | A | A | A | — |
| Ink set C | C | A | A | A |
| Ink set D | A | A | A | A |
| Ink set E | C | C | B | — |
| Ink set F | B | C | B | — |
| Ink set G | C | C | B | C |
| Ink set H | B | C | B | C |
| Ink set I | B | C | B | B |

As is shown in Table 11, in the ink sets E and F (comparative examples) using PR-122 as the pigment of the magenta and light magenta inks, the evaluation results for graininess, metamerism and color reproducibility were not good. On the other hand, in the ink sets A and B (examples) using PV-19 as the pigment of the magenta and light magenta inks, all of the evaluation results were superior. Furthermore, good results that were even further improved were obtained in the ink set B that further comprised light magenta and light cyan inks.

Furthermore, in the case of the ink sets G, H and I (comparative examples) comprising 1 or 2 black inks, color variation was seen. On the other hand, in the case of the ink sets C and D (examples) comprising three types of black inks with different pigment concentrations, it is seen that there was little color variation, so that these ink sets were superior.

As was described above, the present invention makes it possible to achieve monochromatic or color output with a high quality, to provide superior color reproducibility of recorded images, to reduce metamerism without conspicuous graininess caused by dot expression, and to obtain the same output at all times without being affected by external environmental factors such as temperature or the like.

The present invention has possibilities for industrial utilization as an ink set, recording method, recording apparatus, recording system and recorded matter that realize superior color reproducibility and a reduction in metamerism.

We claim:

1. An ink set comprising a magenta ink, a yellow ink, and a cyan ink, wherein each of the magenta, yellow and cyan inks comprises pigment in an amount of at least 3 wt % but not more than 10 wt %, wherein the magenta ink (M) comprises C.I. pigment violet 19 and is such that, in a case where the Y value of this ink in the XYZ display system stipulated by the CIE is 55 as calculated from the ultraviolet-visible transmission spectrum of a dilute aqueous solution of the ink with a coloring material concentration of 0.01 wt % or less, the Z value of this ink in the same system is 83 or less, wherein the magenta ink has an L* value in the CIE-stipulated Lab display system of an aqueous solution of this ink diluted 1000 times by weight of 70 or less, the yellow ink has an L* value in the CIE-stipulated Lab display system of an aqueous solution of this ink diluted 1000 times by weight of 95 or less, and the cyan ink has an L* value in the CIE-stipulated Lab display system of an aqueous solution of the ink diluted 1000 times by weight of 70 or less, and wherein the ink set further comprises a light magenta ink (Lm) comprising C.I. pigment violet 19 in which the L* value in the CIE-stipulated Lab display system of an aqueous solution of the ink diluted 1000 times by weight exceeds 70, and a light cyan ink (Lc) in which the L* value in the CIE-stipulated Lab system of an aqueous solution of the ink diluted 1000 times by weight exceeds 70.

2. The ink set according to claim 1, wherein, the pigment of said yellow ink is C.I. pigment yellow 74, and the pigment of said cyan ink is C.I. pigment blue 15:3.

3. The ink set according to claim 1, wherein said light magenta ink (Lm) is such that in a case where the Y value in the CIE-stipulated XYZ display system of the ink, as calculated from the ultraviolet-visible spectrum of a dilute aqueous solution of the ink with a coloring material concentration of 0.01 wt % or less, is 55, the Z value of the ink in the same display system is 83 or less.

4. The ink set according to claim 1, wherein said light magenta ink and said light cyan ink respectively include pigments at the rate of less than 3 wt %.

5. The ink set according to claim 1, which further comprises an ink (A) in which the L* value in the CIE-stipulated Lab display system of an aqueous solution of the ink diluted 1000 times by weight is 50 to 80, the a* value of this aqueous solution is 35 to 85, and the b* value is −5 to 55, and an ink (B) in which the L* value in the CIE-stipulated Lab display system of an aqueous solution of the ink diluted 1000 times by weight is 20 to 60, the a* value of this aqueous solution 50 to 90 and the b* value of this aqueous solution is −90 to −50.

6. The ink set according to claim 1, wherein said inks contain dispersing agents to disperse said pigments at the rate of 10 to 140 wt % relative to said pigments.

7. The ink set according to claim 1, wherein said inks contain a high-boiling-point organic solvent at the rate of 0.1 to 30 wt %.

8. The ink set according to claim 1, wherein said inks contain permeation promoting agents at the rate of 1 to 20 wt %.

9. The ink set according to claim 1, wherein said inks contain acetylene glycol type compounds and/or silicone type compounds at the rate of 0.1 to 5 wt %.

10. An ink set comprising a plurality of inks that contain pigments as coloring materials, wherein said plurality of inks comprise at least a yellow ink (Y), magenta ink (M) and cyan ink (C), the pigment contained in said yellow ink is C.I. pigment yellow 74, the pigment contained in said magenta ink is C.I. pigment violet 19, and the pigment contained in said cyan ink is C.I. pigment blue 15:3, and wherein the ink set further comprises a light magenta ink (Lm) and a light cyan ink (Lc) that contain the same types of pigments as said magenta ink and cyan ink, but have different color densities, wherein the pigment contained in said light magenta ink is C.I. pigment violet 19, and the pigment contained in said light cyan ink is C.I. pigment blue 15:3.

11. The ink set according to claim 10, wherein the pigment content contained in said yellow ink is 4 to 7 wt %, the pigment content contained in said magenta ink is 4 to 7 wt %, and the pigment content contained in said cyan ink is 3 to 6 wt %.

12. The ink set according to claim 11, wherein the pigment content contained in said light magenta ink is 0.5 to 2 wt %, and the pigment content contained in said light cyan ink is 0.5 to 2 wt %.

13. An ink set comprising a plurality of inks that contain pigments as coloring materials, wherein said plurality of inks comprise at least a yellow ink (Y), magenta ink (M) and cyan ink (C), the pigment contained in said yellow ink is C.I. pigment yellow 74, the pigment contained in said magenta ink is C.I. pigment violet 19, and the pigment contained in said cyan ink is C.I. pigment blue 15:3, the ink set further comprising three or more types of black inks with different pigment concentrations.

14. The ink set according to claim 13, wherein the pigment contained in said black inks is carbon black.

15. The ink set according to claim 13, wherein said three or more types of black inks with different pigment concentrations are a high-concentration black ink with a pigment concentration of 1.5 wt % or greater, a medium-concentration black ink with a pigment concentration of 0.4 wt % or greater but less than 1.5 wt %, and a low-concentration black ink with a pigment concentration of 0.01 wt % or greater but less than 0.4 wt %.

16. An ink set comprising at least a magenta ink, yellow ink and cyan ink which is used in an ink jet printer, wherein said magenta ink comprises C.I. pigment violet 19 and has characteristics that the spectroscopic reflectance of this ink is 0.4 or less at least at the wavelength where the spectroscopic reflectance of said yellow ink and the spectroscopic reflectance of said cyan ink intersect.

17. The ink set according to claim 16, wherein said magenta ink has characteristics that a wavelength region in which the spectroscopic reflectance is 0.4 or less is formed at least in the range extending from said intersection wavelength to a wavelength of 550 nm.

18. An ink set comprising at least a magenta ink, yellow ink and cyan ink which is used in an ink jet printer, wherein said magenta ink comprises C.I. pigment violet 19 and has characteristics that at the wavelength where the spectroscopic distributions of said yellow ink and said cyan ink intersect, a spectroscopic reflectance that is 0.4 or less relative to the spectroscopic reflectance values of the yellow ink and cyan ink at the same wavelength is defined.

19. The ink set according to claim 18, wherein said magenta ink has characteristics that a spectroscopic reflectance that is 0.4 or less relative to the spectroscopic reflectance of said yellow ink is defined at least in the range extending from said intersection wavelength to a wavelength of 550 nm.

20. The ink set according to claim 16, wherein said magenta ink contains a styrene-acrylic acid copolymer at the rate of at least 0.7 wt %, glycerol at the rate of at least 15 wt %, ethylene glycol at the rate of at least 5 wt %, 2-pyrrolidone at the rate of at least 2 wt %, 1,2-hexanediol at the rate of at least 5 wt %, and an acetylene glycol type compound at the rate of at least 0.5 wt %.

21. The ink set according to claim 16, wherein said magenta ink contains one or more high-boiling-point compounds selected from among polyhydric alcohol type compounds and saccharides at the rate of 5% or greater.

22. The ink set according to claim 16, wherein said magenta ink contains one or more polar solvents selected from among glycol ether type compounds and alkyldiol type compounds at the rate of 1% or greater.

23. The ink set according to claim 16, wherein said magenta ink contains one or more surfactants selected from among acetylene glycol type compounds, acetylene alcohol type compounds and polysiloxane type compounds at the rate of 0.1% or greater.

24. The ink set according to claim 16, wherein said magenta ink contains one or more high-boiling-point compounds selected from among polyhydric alcohol type compounds and saccharides at the rate of 5% or greater, one or more polar solvents selected from among glycol ether type compounds and alkyldiol type compounds at the rate of 1% or greater, and one or more surfactants selected from among acetylene glycol type compounds, acetylene alcohol type compounds and polysiloxane type compounds at the rate of 0.1% or greater.

25. The ink set according to claim 16, wherein said magenta ink contains a resin at the rate of 0.1% or greater.

26. The ink set according to claim 20, wherein said yellow ink contains a styrene-acrylic acid copolymer at the rate of at least 1 wt %, glycerol at the rate of at least 15 wt %, ethylene glycol at the rate of at least 5 wt %, 2-pyrrolidone at the rate of at least 2 wt %, 1,2-hexanediol at the rate of at least 5 wt %, and an acetylene glycol type compound at the rate of at least 0.5 wt %, and said cyan ink contains a styrene-acrylic acid copolymer at the rate of at least 0.5 wt %, glycerol at the rate of at least 15 wt %, ethylene glycol at the rate of at least 5 wt %, 2-pyrrolidone at the rate of at least 2 wt %, 1,2-hexanediol at the rate of at least 5 wt %, and an acetylene glycol type compound at the rate of at least 0.5 wt %.

27. The ink set according to claim 16, wherein the coloring material of said cyan ink is constituted by "C. I. pigment blue 15:3", and the coloring material of said yellow ink is constituted by "C. I. pigment yellow 74", and the coloring material of said magenta ink is constituted by "C. I. pigment violet 19".

28. A recording method comprising forming images using the ink set described in claim 1.

29. An ink jet recording method comprising forming mixed color portions with the magenta ink, yellow ink and cyan ink in the ink set according to claim 1.

30. A recording apparatus comprising means for realizing the recording method according to claim 28.

31. An ink jet recording apparatus comprising the ink set according to claim 1.

32. A recording system for forming images comprising the ink set according to claim 1.

33. Recorded matter in which images are formed by deposition of the ink set according to claim 1 onto a recording medium.

* * * * *